US012794143B2

(12) United States Patent
Kishigami

(10) Patent No.: US 12,794,143 B2
(45) Date of Patent: Nov. 10, 2026

(54) RADAR APPARATUS USING TRANSMITTING ARRAY ANTENNA AND RECEIVING ARRAY ANTENNA

(71) Applicant: Panasonic Automotive Systems Co., Ltd., Kanagawa (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 107 days.

(21) Appl. No.: 19/016,541

(22) Filed: Jan. 10, 2025

(65) Prior Publication Data

US 2025/0149801 A1 May 8, 2025

Related U.S. Application Data

(63) Continuation of application No. 18/307,721, filed on Apr. 26, 2023, now Pat. No. 12,230,882, which is a (Continued)

(30) Foreign Application Priority Data

Oct. 10, 2017 (JP) ................................ 2017-197194

(51) Int. Cl.
*H01Q 21/00* (2006.01)
*G01S 7/03* (2006.01)
(Continued)

(52) U.S. Cl.
CPC ......... *H01Q 21/0025* (2013.01); *G01S 7/032* (2013.01); *G01S 7/2813* (2013.01); (Continued)

(58) Field of Classification Search
CPC ............. H01Q 21/0025; H01Q 21/061; H01Q 21/065; G01S 7/032; G01S 7/2813; (Continued)

(56) References Cited

U.S. PATENT DOCUMENTS 8,248,298 B2 8/2012 Lalezari
9,568,600 B2 2/2017 Alland
(Continued)

FOREIGN PATENT DOCUMENTS

EP 3244231 A1 11/2017
JP 2017003498 A 1/2017
JP 2017040477 A 2/2017

OTHER PUBLICATIONS

Li et al., "MIMO Radar with Colocated Antennas," Signal Processing Magazine, IEEE 24(5): 106-114, Sep. 2007. (9 pages).
(Continued)

*Primary Examiner* — Donald HB Braswell
(74) *Attorney, Agent, or Firm* — Seed Intellectual Property Law Group LLP

(57) ABSTRACT

A transmitting array antenna includes a second antenna group placed in a position inside a first antenna group in a first direction and a position different from the first antenna group in a second direction. A receiving array antenna includes a fourth antenna placed in a position outside a third antenna group arranged in the first direction and a position different from the third antenna group in the second direction. An interelement spacing between a receiving antenna of the third antenna group located at an end on a second side is identical to an interelement spacing in the first direction between a transmitting antenna of the first antenna group on the first side and each of the second antenna group. In a case where the first antenna group and the third antenna group are identical in position in the second direction, positions of antennas are different.

10 Claims, 32 Drawing Sheets

Related U.S. Application Data continuation of application No. 17/184,126, filed on Feb. 24, 2021, now Pat. No. 11,670,866, which is a continuation of application No. 16/154,034, filed on Oct. 8, 2018, now Pat. No. 10,965,038.

(51) Int. Cl.

| | |
|---|---|
| ***G01S 7/28*** | (2006.01) |
| ***G01S 7/52*** | (2006.01) |
| ***G01S 13/02*** | (2006.01) |
| ***G01S 13/28*** | (2006.01) |
| ***G01S 13/42*** | (2006.01) |
| ***H01Q 21/06*** | (2006.01) |

(52) U.S. Cl.

CPC ........ *G01S 7/52047* (2013.01); *G01S 13/284* (2013.01); *G01S 13/42* (2013.01); *H01Q 21/061* (2013.01); *H01Q 21/065* (2013.01); *G01S 2013/0245* (2013.01)

(58) Field of Classification Search

CPC .... G01S 7/52047; G01S 13/284; G01S 13/42; G01S 2013/0245; G01S 13/003

See application file for complete search history.

(56) References Cited

U.S. PATENT DOCUMENTS

| | | | |
|---|---|---|---|
| 10,254,396 | B2 | 4/2019 | Heumphreus et al. |
| 2013/0162475 | A1 | 6/2013 | Blech et al. |
| 2015/0061926 | A1 | 3/2015 | Ranney et al. |
| 2016/0282450 | A1 | 9/2016 | Kishigami et al. |
| 2016/0285172 | A1* | 9/2016 | Kishigami ............ G01S 13/325 |
| 2017/0307744 | A1* | 10/2017 | Loesch ................ H01Q 21/296 |
| 2019/0058262 | A1 | 2/2019 | Maruyama et al. |
| 2020/0003884 | A1* | 1/2020 | Arkind .................. G01S 13/106 |
| 2020/0217944 | A1 | 7/2020 | Giere et al. |
| 2020/0227812 | A1* | 7/2020 | Sun ........................ H01Q 15/14 |

OTHER PUBLICATIONS

Vaidyanathan et al., "MIMO Radar with Broadband waveforms: Smearing Filter Banks and 2D Virtual Arrays," IEEE Asilomar Conference on Signals, Systems and Computers, pp. 188-192, Oct. 26, 2008. (5 pages).

Wenger, "Automotive mm-wave radar: status and trends in system design and technology," IEEE Colloquium on Automotive Radar and Navigation Techniques (Ref. No. 1998/230), Feb. 9, 1998. (7 pages).

* cited by examiner

RADAR APPARATUS USING TRANSMITTING ARRAY ANTENNA AND RECEIVING ARRAY ANTENNA

BACKGROUND

1. Technical Field

The present disclosure relates to a radar apparatus.

2. Description of the Related Art

In recent years, a radar apparatus has been under consideration which uses short-wavelength radar transmission signals including microwaves or millimeter waves that yield high resolution. Further, for improvement in outdoor safety, there has been a demand for the development of a radar apparatus (wide-angle radar apparatus) that detects objects (targets) including pedestrians, as well as vehicles, in a wide angular range.

For example, as a radar apparatus, a pulse radar apparatus has been known which repeatedly emits pulse waves. A signal that is received by a wide-angle pulse radar that detects a vehicle or a pedestrian in a wide angular range is one obtained by mixing a plurality of reflected waves from a target (e.g. a vehicle) that is present at a short distance and from a target (e.g. a pedestrian) that is present at a long distance. This requires (1) a radar transmitter to be configured to transmit a pulse wave or a pulse-modulated wave having an autocorrelation characteristic that forms a low-range side lobe (such a characteristic being hereinafter referred to as "low-range side lobe characteristic") and requires (2) a radar receiver to be configured to have a wide reception dynamic range.

Examples of how a wide-angle radar apparatus is configured include the following two configurations.

In the first configuration, radar waves are transmitted by mechanically or electronically scanning pulse waves or modulated waves with narrow-angle directional beams (with beams width of approximately several degrees), and reflected waves are received with narrow-angle directional beams. The first configuration requires much scanning for high resolution and, as such, is less capable of tracking a fast-moving target.

The second configuration employs a technique (direction-of-arrival (DOA) estimation) in which reflected waves are received by an array antenna constituted by a plurality of antennas (antenna elements) and the angles of arrival of the reflected waves are estimated by a signal-processing algorithm based on a phase difference in reception due to interelement spacings (inter-antenna spacings). The second configuration, which allows the angles of arrival to be estimated at a receiving branch even if scan intervals between transmission beams at a transmitting branch are skipped, achieves a reduction in scanning time and, as such, is higher in tracking capability than the first configuration. Examples of direction-of-arrival estimation methods include a Fourier transform based on a matrix operation, a Capon method based on an inverse matrix operation, an LP (linear prediction) method based on an inverse matrix operation, MUSIC (Multiple Signal Classification) based on an eigenvalue operation, and ESPRIT (estimation of signal parameters via rotational invariance techniques) based on an eigenvalue operation.

Further, as a radar apparatus, a configuration (sometimes referred to as "MIMO radar") has been proposed which includes a plurality of antennas (array antenna) at a transmitting branch as well as at a receiving branch and performs beam scanning by signal processing with the transmitting and receiving array antennas (see, for example, J. Li, P. Stoica, "MIMO Radar with Colocated Antennas," Signal Processing Magazine, IEEE Vol. 24, Issue: 5, pp. 106-114, 2007).

Further, in the MIMO radar, at most as many virtual receiving array antennas (hereinafter referred to as "virtual receiving array") as the product of the number of transmitting antenna elements and the number of receiving antenna elements are configured by devising an arrangement of antenna elements in the transmitting and receiving array antennas. This makes it possible, with a small number of elements, to bring about an effect of increasing an effective aperture length of the array antenna and improve angular resolution.

Further, a MIMO radar is also applicable in a case where two-dimensional vertical and horizontal beam scanning is performed as well as a case where one-dimensional vertical or horizontal scanning (angle measuring) is performed (see, for example, P. P. Vaidyanathan, P. Pal, Chun-Yang Chen, "MIMO radar with broadband waveforms: Smearing filter banks and 2D virtual arrays," IEEE Asilomar Conference on Signals, Systems and Computers, pp. 188-192, 2008).

However, depending on the antenna arrangement of transmitting and receiving branches in the MIMO radar, there may occur deterioration in detection performance of the radar.

SUMMARY

One non-limiting and exemplary embodiment provides a radar apparatus that makes it possible to maximally enlarge an aperture length of a virtual receiving array without deterioration in detection performance of a radar.

In one general aspect, the techniques disclosed here feature a radar apparatus including: a radar transmitter that transmits a radar signal through a transmitting array antenna; and a radar receiver that receives, through a receiving array antenna, a reflected-wave signal produced by the radar signal being reflected by a target, wherein the transmitting array antenna is composed of a first antenna group including a plurality of transmitting antennas arranged in a first direction and a second antenna group including at least one transmitting antenna placed in a position inside at least one pair of adjacent transmitting antennas of the first antenna group in the first direction and a position different from the first antenna group in a second direction orthogonal to the first direction, the receiving array antenna is composed of a third antenna group including a plurality of receiving antennas arranged in the first direction and a fourth antenna that is one receiving antenna placed in a position outside an end of the third antenna group in the first direction and a position different from the third antenna group in the second direction, an interelement spacing between the adjacent transmitting antennas in the first direction is a sum of an aperture length of the third antenna group and a spacing between the third antenna group and the fourth antenna in the first direction, an interelement spacing in the first direction between a receiving antenna of the third antenna group located at an end on a second side opposite to a first side close to the position in which the fourth antenna is placed and each of the other antennas of the third antenna group is identical to an interelement spacing in the first direction between a transmitting antenna of the adjacent transmitting antennas located on the same side as the first side and each of the transmitting antennas of the second antenna group, and in a case where the first antenna group and the third antenna group are identical in position in the second direction, a position of each of the transmitting antennas of the second antenna group in the second direction and a position of the fourth antenna in the second direction are different.

An aspect of the present disclosure makes it possible to maximally enlarge an aperture length of a virtual receiving array without deterioration in detection performance of a radar.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

As mentioned above, a MIMO radar constituting a virtual receiving array is also applicable in a case where two-dimensional vertical and horizontal beam scanning is performed as well as a case where one-dimensional vertical or horizontal scanning (angle measuring) is performed.

Figure 1A:
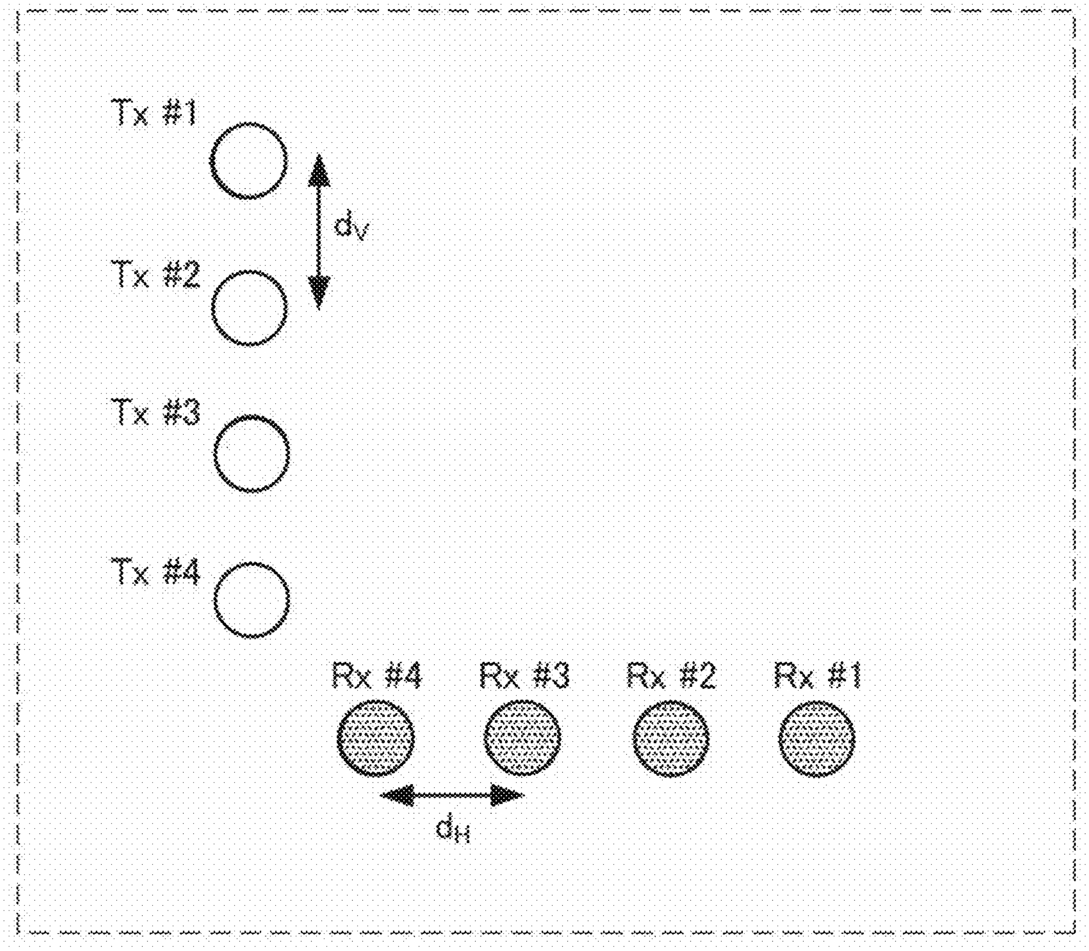
FIG. 1A is a diagram showing an example arrangement of transmitting and receiving antennas.

As an example, FIG. 1A shows a transmitting array antenna including four transmitting antennas (Tx #1 to Tx #4) arranged in a vertical direction and a receiving array antenna including four receiving antennas (Rx #1 to Rx #4) arranged in a horizontal direction. In FIG. 1A, the transmitting antennas are placed at regular spacings ($d_V$) in a vertical direction and the receiving antennas are placed at regular spacings ($d_H$) in a horizontal direction.

Figure 1B:
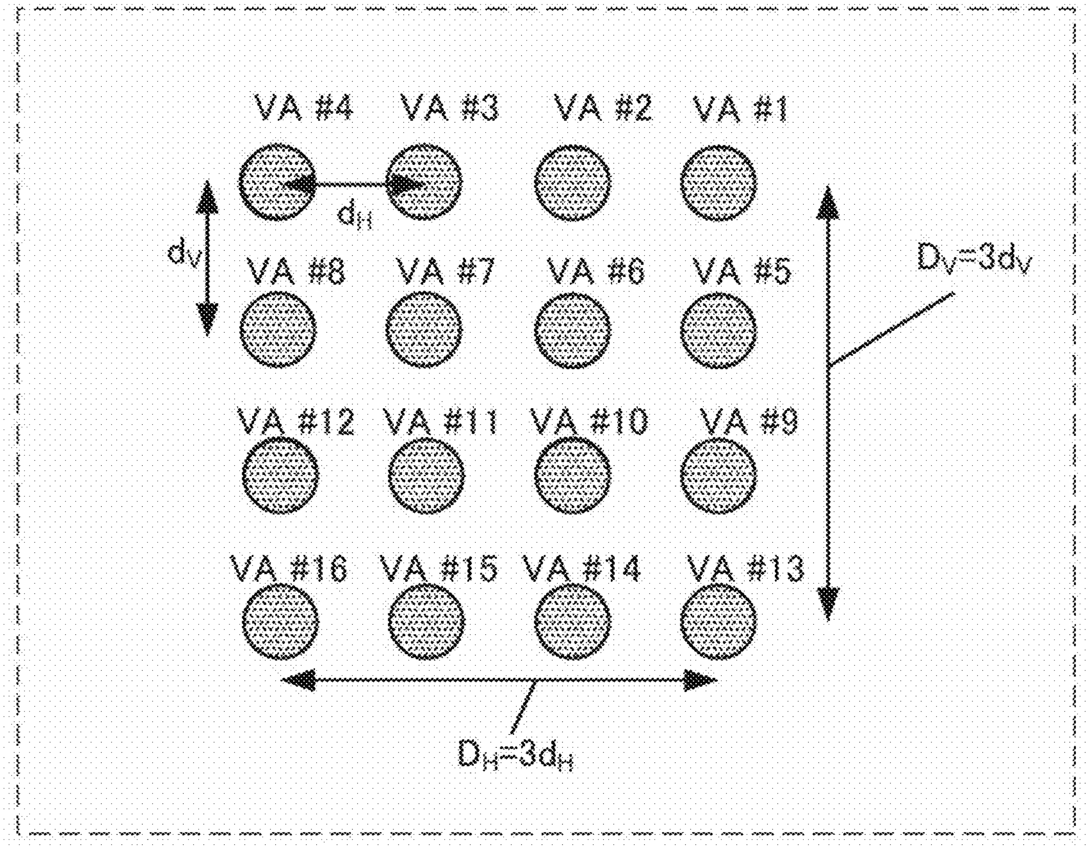
FIG. 1B is a diagram showing an example arrangement of a virtual receiving array.

FIG. 1B shows a virtual receiving array including transmitting and receiving array antennas of an antenna arrangement shown in FIG. 1A. The virtual receiving array shown in FIG. 1B is composed of sixteen virtual receiving antenna elements (VA #1 to VA #16), i.e. a four-by-four rectangular matrix of antennas arranged in vertical and horizontal directions. In FIG. 1B, the horizontal and vertical interelement spacings of the virtual receiving array are $d_H$ and $d_V$, respectively. That is, the horizontal and vertical aperture lengths $D_H$ and $D_V$ of the virtual receiving array are $3d_H$ and $3d_V$, respectively.

Figure 2A:
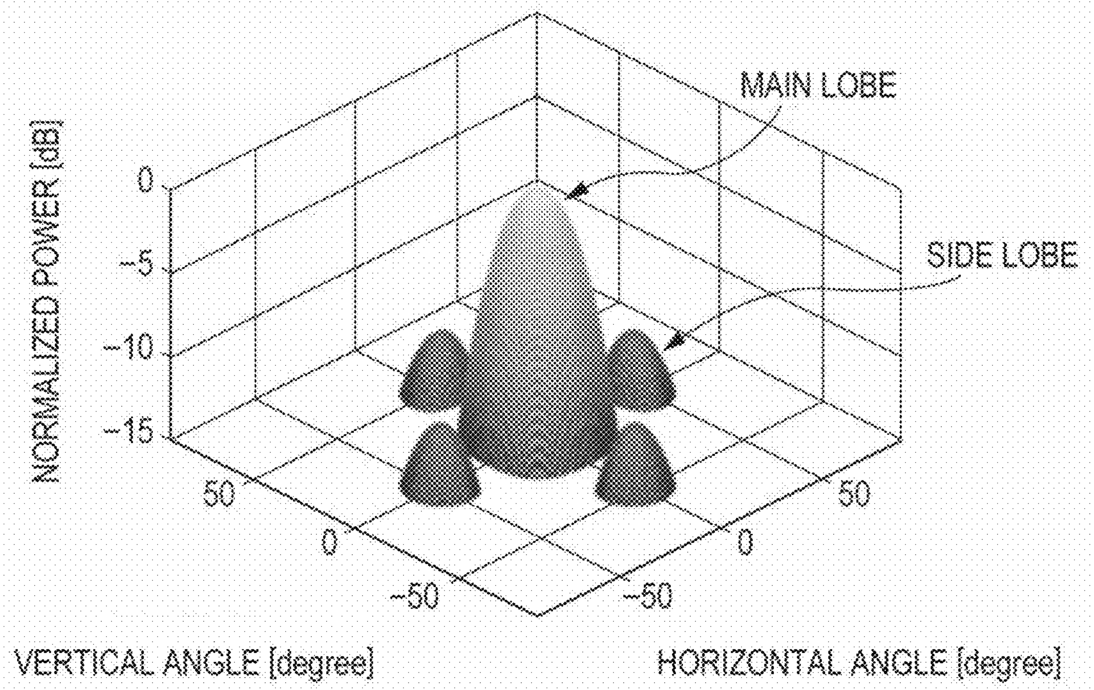
FIG. 2A is a diagram showing a directivity pattern based on a virtual receiving array ($d_V=0.5\lambda$)
Figure 2B:
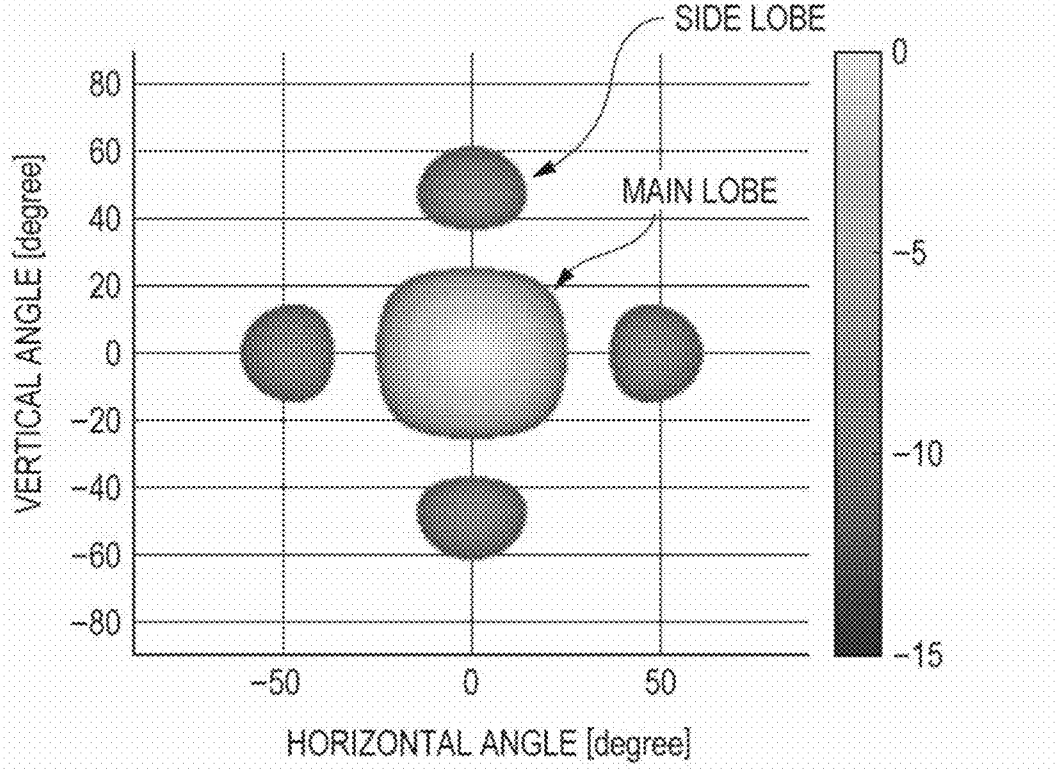
FIG. 2B is a diagram showing a directivity pattern based on a virtual receiving array ($d_V=0.5\lambda$)

FIGS. 2A and 2B show a Fourier beam pattern directed in horizontal 0-degree and vertical 0-degree directions in a case where the horizontal interelement spacing is given as $d_H=0.5\lambda$ and the vertical interelement spacing is given as $d_V=0.5\lambda$ in an antenna arrangement of a MIMO radar shown in FIGS. 1A and 1B. It should be noted that λ denotes the wavelength of a radar carrier wave.

As shown in FIGS. 2A and 2B, a main beam (main lobe) is formed in the horizontal 0-degree and vertical 0-degree directions. Note here that a narrower beam width of the main beam means higher angular separation performance with respect to a plurality of targets. For example, in FIGS. 2A and 2B, the 3 dB beam width is approximately 26 degrees. Further, as shown in FIGS. 2A and 2B, there are side lobes generated around the main beam. In a radar apparatus, a side lobe causes false detection as a virtual image. For this reason, a lower peak level of a side lobe means a lower probability of false detection of the side lobe as a virtual image in the radar apparatus. In FIGS. 2A and 2B, the power ratio (peak side lobe ratio) to the peak level of a side lobe normalized by the peak level of the main beam is approximately −13 dB.

For the radar apparatus to have a wider range of detection, it is effective to use a high-gain antenna. For example, antenna gain can be improved by narrowing the directivity (beam width) of an antenna. Further, for an antenna to have narrower directivity, it is necessary to widen the aperture plane of the antenna. This makes the antenna larger in size.

Further, for an antenna to have narrower directivity, a sub-array antenna (sub-arrayed antenna elements) of a configuration in which a plurality of antenna elements are serially fed is sometimes used as an antenna configuration. For example, in a radar apparatus (on-board radar) that is situated on board a vehicle or the like, a sub-array antenna configured by lining up a plurality of antenna elements in a vertical direction is used for narrow vertical directivity (see, for example, J. Wenger, "Automotive mm-wave radar: status and trends in system design and technology," IEE Colloquium on Automotive Radar and Navigation Techniques (Ref. No. 1998/230), 1998). This makes it possible to improve vertical antenna gain, bringing about an effect of reducing waves that are reflected on a road surface or the like in directions in which they do not need to be reflected.

However, in a case where such a sub-array antenna is used as an antenna element that constitutes a transmitting array antenna or a receiving array antenna, the interelement spacing of the array antenna is hardly made narrower than the size of the sub-array antenna. For example, a sub-array antenna constituted by antenna elements arranged in a vertical direction has a size of one wavelength or longer. For example, in a case of using a sub-array antenna in a vertical direction in the MIMO radar shown in FIG. 1A, it is necessary to widen the vertical interelement spacing $d_V$ to one wavelength or longer.

Figure 3A:
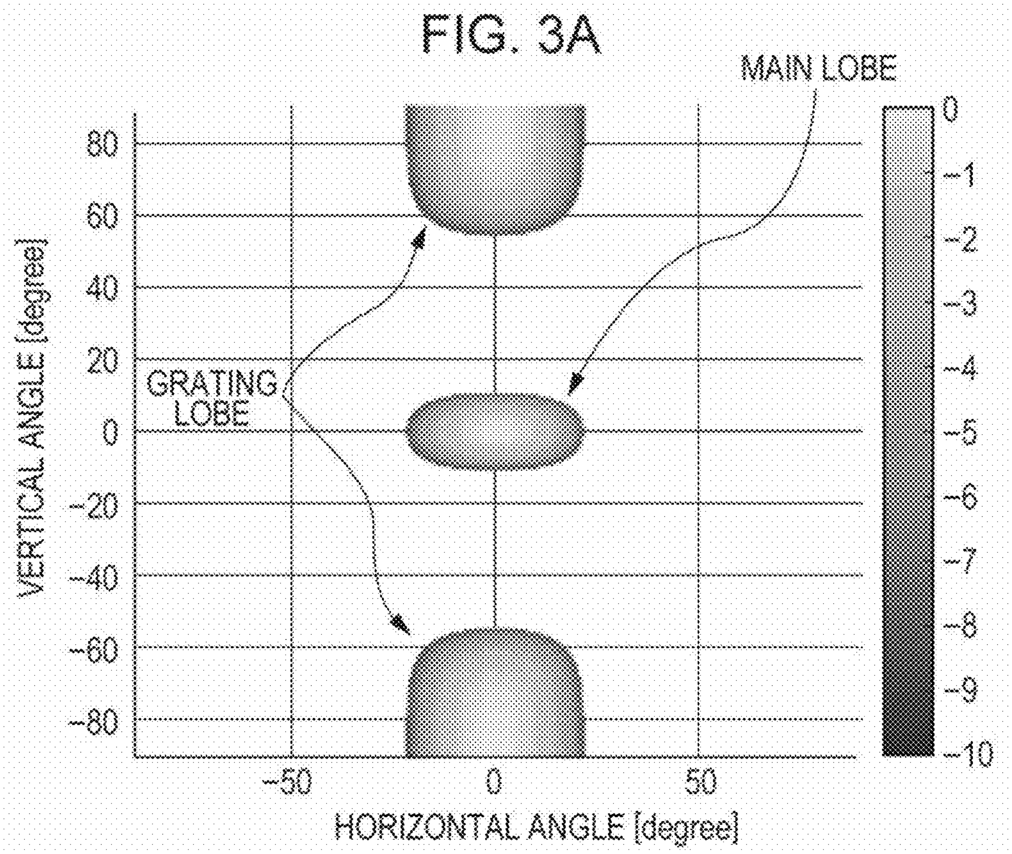
FIG. 3A is a diagram showing a directivity pattern based on a virtual receiving array ($d_V=\lambda$)
Figure 3B:
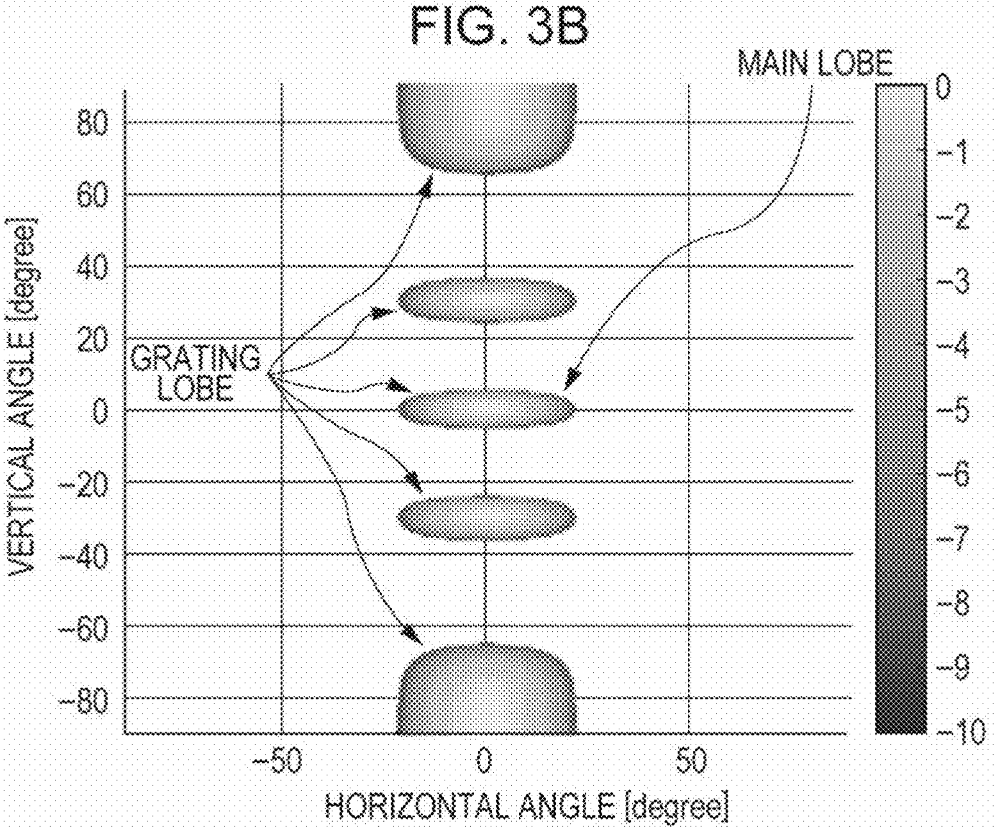
FIG. 3B is a diagram showing a directivity pattern based on a virtual receiving array ($d_V=2\lambda$)

FIGS. 3A and 3B show an example of a Fourier beam pattern directed in horizontal 0-degree and vertical 0-degree directions in a case where the vertical interelement spacing $d_V$ is one wavelength (λ) or longer in a transmitting and receiving antenna arrangement of the MIMO radar shown in FIG. 1A. It should be noted that FIGS. 3A and 3B do not take into account the directivity of single antenna elements sub-arrayed in a vertical direction.

Further, in FIG. 3A, the vertical interelement spacing is given as $d_V=\lambda$ and the horizontal interelement spacing is given as $d_H=0.5\lambda$, and in FIG. 3B, the vertical interelement spacing is given as $d_V=2\lambda$ and the horizontal interelement spacing is given as $d_H=0.5\lambda$.

As shown in FIGS. 3A and 3B, a main beam (main lobe) is directed in the horizontal 0-degree and vertical 0-degree directions, and there are vertically high-level side lobes (grating lobes) generated around the main beam. In FIGS. 3A and 3B, the peak side lobe ratio is 0 dB. Further, in FIG. 3B ($d_V=2\lambda$), the vertically high-level side lobes (grating lobes) are generated at narrower angular intervals than in FIG. 3A ($d_V=\lambda$). That is, such a propensity is shown that the wider the vertical interelement spacing $d_V$ becomes, the narrower angular intervals the side lobes (grating lobes) are generated at.

In this way, the radar apparatus requires a wider vertical interelement spacing with an increase in vertical antenna size, so that it becomes easy for a grating lobe to be generated at such an angle as to be comparatively close to the main beam. For this reason, in a case where the angular range of detection assumed by the radar apparatus is wider than the angles at which the grating lobes are generated, the radar apparatus has a higher probability of erroneously detecting a false peak attributed to a grating lobe as a target in the angular range of detection, so that there arises a problem of deterioration in detection performance of the radar apparatus.

An aspect of the present disclosure maximally enlarges the vertical and horizontal aperture lengths of a virtual receiving array without deterioration in detection performance of a radar apparatus in performing two-dimensional vertical and horizontal beam scanning with use of a MIMO radar. Using such a virtual receiving array makes it possible to improve angular resolution with a small number of antenna elements.

An embodiment of the present disclosure is described in detail below with reference to the drawings. It should be noted that, in the embodiment below, the same constituent elements are given the same reference numerals, and duplication of description is omitted.

The following describes, as a radar apparatus, a configuration in which a transmitting branch sends out different time-division multiplexed transmission signals through a plurality of transmitting antennas and a receiving branch demultiplexes each of the transmission signals and performs a receiving process. However, without being limited to this configuration, the radar apparatus may alternatively be configured such that the transmitting branch sends out different frequency-division multiplexed transmission signals through the plurality of transmitting antennas and the receiving branch demultiplexes each of the transmission signals and performs a receiving process. Similarly, the radar apparatus may alternatively be configured such that the transmitting branch sends out time-division multiplexed transmission signals through the plurality of transmitting antennas and the receiving branch performs a receiving process.

Embodiment 1

Configuration of Radar Apparatus

Figure 4:
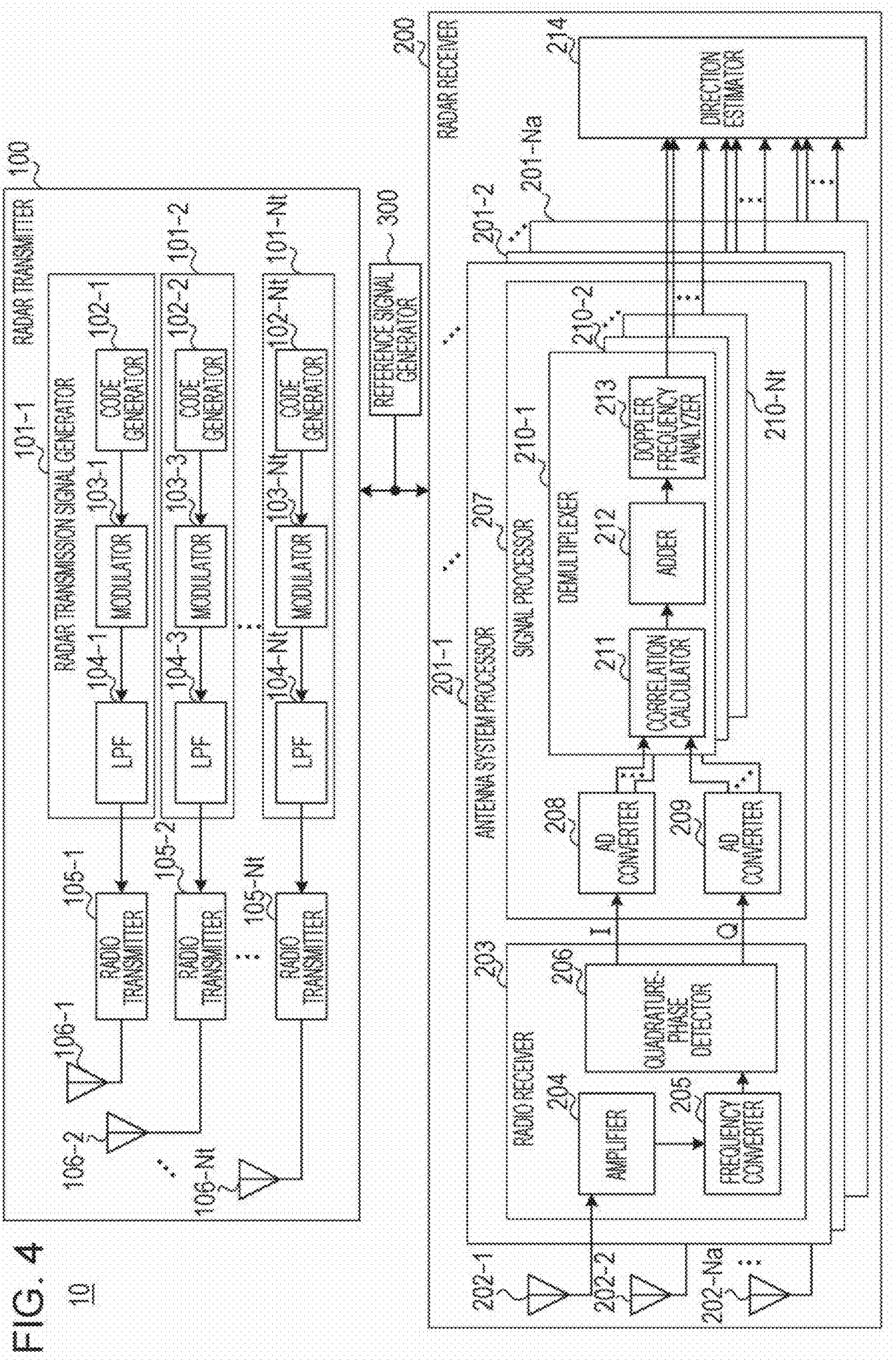
FIG. 4 is a block diagram showing a configuration of a radar apparatus according to Embodiment 1.

FIG. 4 is a block diagram showing a configuration of a radar apparatus 10 according to Embodiment 1.

The radar apparatus 10 includes a radar transmitter (transmitting branch) 100, a radar receiver (receiving branch) 200, and a reference signal generator 300.

The radar transmitter 100 generates high-frequency (radio-frequency) radar signals (radar transmission signals) in accordance with reference signals received from the reference signal generator 300. Then, the radar transmitter 100 transmits the radar transmission signals with predetermined radar transmission periods through a transmitting array antenna including a plurality of transmitting antennas 106-1 to 106-Nt.

The radar receiver 200 receives, through a receiving array antenna including a plurality of receiving antennas 202-1 to 202-Na, reflected-wave signals produced by the radar transmission signals being reflected by a target (not illustrated). The radar receiver 200 performs synchronous processing with the radar transmitter 100 by performing the following processing operation with reference to the reference signals received from the reference signal generator 300. That is, the radar receiver 200 processes the reflected-wave signals received through each separate receiving antenna 202 and at least detects the presence or absence of a target and estimates the direction of the target. It should be noted that the target is an object to be detected by the radar apparatus 10 and examples of the target include vehicles (including four-wheel and two-wheel vehicles) or persons.

The reference signal generator 300 is connected to both the radar transmitter 100 and the radar receiver 200. The reference signal generator 300 supplies the reference signals to the radar transmitter 100 and the radar receiver 200 to synchronize processes in the radar transmitter 100 and the radar receiver 200.

Configuration of Radar Transmitter 100

The radar transmitter 100 includes radar transmission signal generators 101-1 to 101-Nt, radio transmitters 105-1 to 105-Nt, and the transmitting antennas 106-1 to 106-Nt. That is, the radar transmitter 100 has the Nt transmitting antennas 106, each of which is connected to a corresponding one of the radar transmission signal generators 101 and a corresponding one of the radio transmitters 105.

Each of the radar transmission signal generators 101 receives reference signals from the reference signal generator 300, generates timing clocks by multiplying the reference signals by a predetermined number, and generates radar transmission signals in accordance with the timing clocks thus generated. Then, the radar transmission signal generator 101 repeatedly outputs the radar transmission signals with predetermined radar transmission periods (Tr). A radar transmission signal is represented by $r_z(k, M)=I_z(k, M)+j\ Q_z(k, M)$. Note here that z denotes a number corresponding to each transmitting antenna 106 and z=1, . . . , Nt. Note also that j denotes the imaginary unit, k denotes discrete time, and M denotes the ordinal number of a radar transmission period.

Each of the radar transmission signal generators 101 includes a code generator 102, a modulator 103, and an LPF (low-pass filter) 104. The following describes each component of the radar transmission signal generator 101-*z*, which corresponds to the zth (where z=1, . . . , Nt) transmitting antenna 106.

Specifically, for each radar transmission period Tr, the code generator 102 generates a code $a(z)_n$ (n=1, . . . , L) (pulse code) of a code sequence of a code length L. Used as the codes $a(z)_n$ (z=1, . . . , Nt) generated by the respective code generators 102-1 to 102-Nt are codes that are lowly correlated or uncorrelated with one another. Examples of the code sequence include a Walsh-Hadamard code, an M sequence code, and a Gold code.

The modulator 103 performs pulse modulation (amplitude modulation, ASK (amplitude shift keying), pulse shift keying) or phase modulation (phase shift keying) on the code $a(z)_n$ received from the code generator 102 and outputs a modulated signal to the LPF 104.

The LPF 104 outputs a signal component of the modulated signal received from the modulator 103 which is below a predetermined limited bandwidth to the transmission switcher 105 as a baseband radar transmission signal.

The zth (where z=1, . . . , Nt) radio transmitter 105 generates a radar transmission signal in a carrier-frequency (radio-frequency: RF) band by performing a frequency conversion on a baseband radar transmission signal outputted from the zth radar transmission signal generator 101, amplifies the radar transmission signal thus generated to a predetermined transmission power P [dB], and outputs the radar transmission signal thus amplified to the zth transmitting antenna 106.

The zth (where z=1, . . . , Nt) transmitting antenna 106 emits, into a space, the radar transmission signal outputted from the zth radio transmitter 105.

Figure 5:
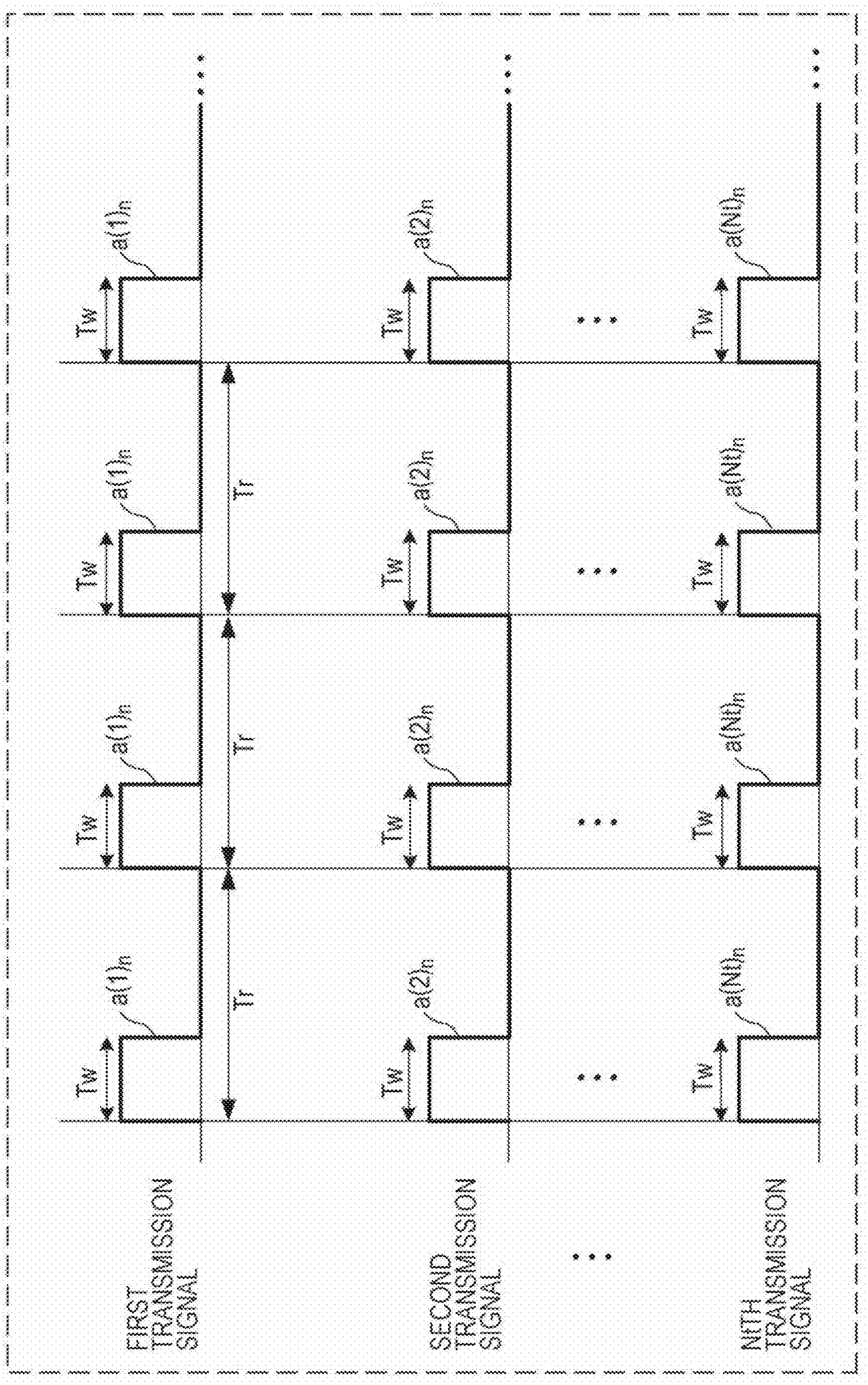
FIG. 5 is a diagram showing examples of radar transmission signals according to Embodiment 1.

FIG. 5 shows radar transmission signals that are transmitted from the Nt transmitting antennas 106 of the radar transmitter 100. A code transmission section Tw includes a pulse code sequence of a code length L. A pulse code sequence is transmitted during a code transmission section Tw of each radar transmission period Tr, and the remaining section (Tr−Tw) is a no-signal section. One pulse code ($a(z)_n$) is subjected to pulse modulation with No samples, whereby each code transmission section Tw includes Nr (=No×L) samples. That is, the modulator 103 has a sampling rate of (No×L)/Tw. Further, the no-signal section (Tr−Tw) includes Nu samples.

Figure 6:
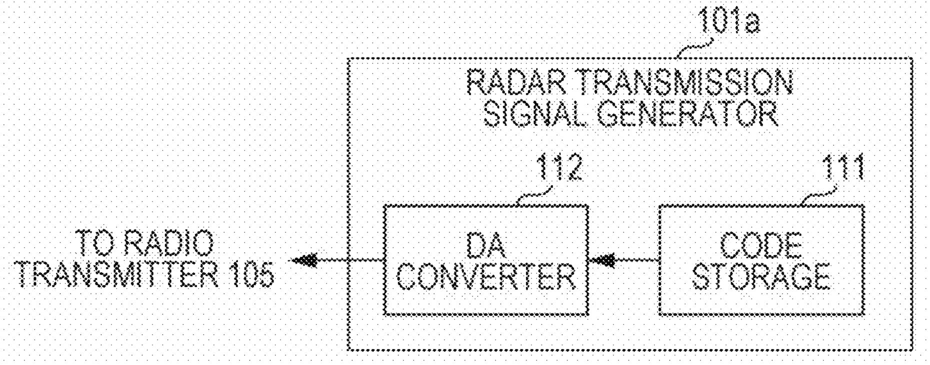
FIG. 6 is a block diagram showing another configuration of a radar transmission signal generator according to Embodiment 1.

It should be noted that the radar transmitter 100 may include a radar transmission signal generator 101*a*, which is shown in FIG. 6, instead of including the radar transmission signal generator 101. The radar transmission signal generator 101*a* includes a code storage 111 and a DA converter 112 instead of including the code generator 102, the modulator 103, or the LPF 104, which are shown in FIG. 4. The code storage 111 stores in advance code sequences generated by the code generator 102 (FIG. 4) and cyclically and sequentially reads out the code sequences thus stored. The DA converter 112 converts, into an analog signal, a code sequence (digital signal) outputted from the code storage 111.

Configuration of Radar Receiver 200

As shown in FIG. 4, the radar receiver 200 includes the Na receiving antennas 202, which constitute an array antenna. Further, the radar receiver 200 includes Na antenna system processors 201-1 to 201-Na and a direction estimator 214.

Each of the receiving antennas 202 receives a reflected-wave signal produced by a radar transmission signal being reflected by a target (object) and outputs the reflected-wave signal thus received to a corresponding one of the antenna system processors 201 as a received signal.

Each of the antenna system processors 201 includes a radio receiver 203 and a signal processor 207.

The radio receiver 203 includes an amplifier 204, a frequency converter 205, and a quadrature-phase detector 206. The radio receiver 203 receives reference signals from the reference signal generator 300, generates timing clocks by multiplying the reference signals by a predetermined number, and operates in accordance with the timing clocks thus generated. Specifically, the amplifier 204 amplifies a received signal received from the receiving antenna 202 to a predetermined level, the frequency converter 205 converts the frequency of the received signal from a high-frequency band into a baseband, and the quadrature-phase detector 206 converts the baseband received signal into a baseband received signal including an I signal and a Q signal.

The signal processor 207 includes AD converters 208 and 209 and demultiplexers 210-1 to 210-Nt.

The AD converter 208 receives the I signal from the quadrature-phase detector 206, and the AD converter 209 receives the Q signal from the quadrature-phase detector 206. The AD converter 208 takes discrete-time samples of the baseband signal including the I signal and thereby converts the I signal into digital data. The AD converter 209 takes discrete-time samples of the baseband signal including the Q signal and thereby converts the Q signal into digital data.

Note here that each of the AD converters 208 and 209 takes Ns discrete samples for the duration Tp (=Tw/L) of each subpulse of a radar transmission signal. That is, the oversampling number per subpulse is Ns.

In the following description, with use of an I signal Ir(k, M) and a Q signal Qr(k, M), a baseband received signal that is outputted from the AD converters 208 and 209 at discrete time k in the Mth radar transmission period Tr[M] is expressed as a complex signal x(k, M)=Ir(k, M)+j Qr(k, M). Further, in the following, discrete time k has its basis (k=1) at the timing of the start of a radar transmission period (Tr), and the signal processor 207 periodically operates until a sample point k=(Nr+Nu)Ns/No preceding the end of the radar transmission period Tr. That is, k=1, . . . , (Nr+Nu) Ns/No. Note here that j is the imaginary unit.

The signal processor 207 includes the Nt demultiplexers 210. Nt is equal to the number of systems that corresponds to the number of transmitting antennas 106. Each of the demultiplexers 210 includes a correlation calculator 211, an adder 212, and a Doppler frequency analyzer 213. The following describes a configuration of the zth (where z=1, . . . , Nt) demultiplexer 210.

For each radar transmission period Tr, the correlation calculator 211 performs a correlation calculation between a discrete sample value x(k, M) including the discrete sample values Ir(k, M) and Qr(k, M) received from the AD converters 208 and 209 and the pulse code $a(z)_n$ (where z=1, . . . , Nt and n=1, . . . , L) transmitted by the radar transmitter 100. For example, the correlation calculator 211 performs a sliding correlation calculation between the discrete sample value x(k, M) and the pulse code $a(z)_n$. For example, the correlation calculation value $AC_{(z)}(k, M)$ of a sliding correlation calculation at discrete time k in the Mth radar transmission period Tr[M] is calculated according to the following equation:

$$AC_{(z)}(k, M) = \sum_{n=1}^{L} x(k + N_s(n-1), M)a(z)_n^* \quad (1)$$

where the asterisk (*) denotes a complex conjugate operator.

The correlation calculator 211 performs correlation calculations according to Eq. (1), for example, over the duration of k=1, . . . , (Nr+Nu)Ns/No.

Figure 7:
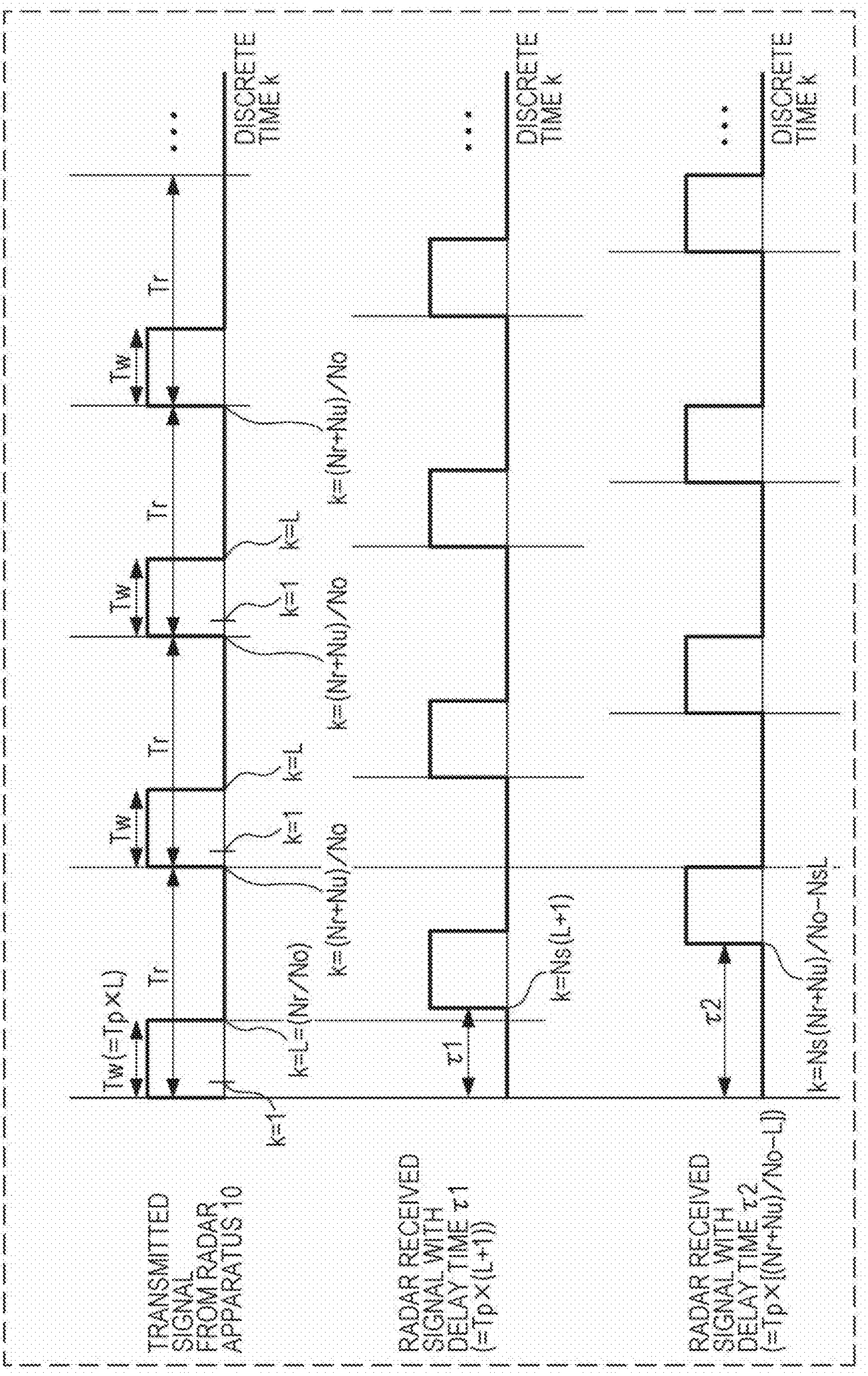
FIG. 7 is a diagram showing examples of timings of transmission of radar transmission signals and examples of measuring ranges according to Embodiment 1.

It should be noted that the correlation calculator 211 is not limited to the case of performing correlation calculations over the duration of k=1, . . . , (Nr+Nu)Ns/No, but may limit a measuring range (i.e. the range of k) according to the range of presence of a target to be measured by the radar apparatus 10. This enables the radar apparatus 10 to reduce the amount of arithmetic processing that is performed by the correlation calculator 211. For example, the correlation calculator 211 may limit the measuring range to k=Ns(L+1), . . . , (Nr+Nu)Ns/No−NsL. In this case, as shown in FIG. 7, the radar apparatus 10 does not perform measurements in time sections corresponding to code transmission sections Tw.

With this, even in such a case where a radar transmission signal sneaks directly to the radar receiver 200, the radar apparatus 10 can perform measurements to the exclusion of the influence of sneaking, as the correlation calculator 211 does not execute processing during a period in which the radar transmission signal sneaks (i.e. a period of at least less than 11). Further, in a case where the measuring range (range of k) is limited, the radar apparatus 10 may apply processing in a similarly limited measuring range (range of k) to processes in the adder 212, the Doppler frequency analyzer 213, and the direction estimator 214, which will be described below. This makes it possible to reduce the amount of processing in each component, allowing the radar receiver 200 to consume less electricity.

The adder 212 performs addition (coherent integration) of correlation calculation values $AC_{(z)}(k, M)$, which are received from the correlation calculator 211 for each discrete time k of the Mth radar transmission period Tr, over the duration (Tr×Np) of a predetermined number (Np) of radar transmission periods Tr. The addition (coherent integration) process over the duration (Tr×Np) is expressed by the following equation:

$$CI_{(z)}(k, m) = \sum_{g=1}^{N_p} AC_{(z)}(k, N_p(m-1) + g) \quad (2)$$

Note here that $Cl_{(z)}(k, m)$ denotes the value of addition (hereinafter referred to as "correlation additional value") of correlation calculation values, Np is an integer of not less than 1, m is an integer of not less than 1 that indicates the ordinal number of the number of additions in a case where the number of additions Np that the adder 212 performs is a single unit. Further, z=1, . . . , Nt.

The adder 212 performs Np additions by using, as a single unit, an output from the correlation calculator 211 obtained with a radar transmission period Tr as a unit. That is, the adder 212 adds correlation calculation values $AC_{(z)}$ (k, Np (m−1)+1) to $AC_{(z)}$(k, Np×m) as a single unit at uniform timings of discrete time k and thereby calculates a correlation additional value $Cl_{(z)}(k, m)$ every discrete time k. As a result, the effect of Np additions of correlation calculation values allows the adder 212 to improve the SNR of reflected-wave signals in a range where reflected-wave signals from a target have high correlation. This allows the radar receiver 200 to improve measurement performance regarding the estimation of the distance of arrival of the target.

It should be noted that, in order for an ideal gain of addition to be achieved, it is necessary that the phase components of correlation calculation values have a certain level of uniformity in as many sections of addition as the number of additions Np of correlation calculation values.

That is, it is preferable that the number of additions Np be set according to an assumed maximum moving velocity of a target to be measured. A reason for this is that an increase in the assumed maximum velocity of the target leads to an increase in amount of variation in the Doppler frequencies of reflected waves from the target. For this reason, there is a reduction in duration of time for which the correlation is high. Therefore, the number of additions Np takes on a smaller value, with the result that the addition performed by the adders 212 brings about a smaller gain improvement effect.

The Doppler frequency analyzer 213 performs coherent integration at uniform timings of discrete time k with $Cl_{(z)}$(k, Nc(w−1)+1) to $Cl_{(z)}$(k, Nc×w), which are Nc outputs from the adder 212 obtained for each discrete time k, as a unit. For example, the Doppler frequency analyzer 213 performs coherent integration after correcting a phase variation Φ(fs) =2πfs(Tr×Np)ΔΦ depending on 2Nf different Doppler frequencies fsΔΦ according to the following equation:

$$\mathrm{FT\_CI}_{(z)}^{Nant}(k, f_s, w) = \sum_{q=0}^{N_c-1} CI_{(z)}(k, N_c(w-1)+q+1)\exp[-j\phi(f_s)q] = \sum_{q=0}^{N_c-1} CI_{(z)}(k, N_c(w-1)+q+1)\exp[-j2\pi f_s T_r N_p q\Delta\phi] \tag{3}$$

Note here that $$\mathrm{FT\_CI}_{(z)}^{Nant}(k, fs, w)$$

is the wth output from the Doppler frequency analyzer 213 and represents a result of the coherent integration of Doppler frequencies fsΔΦ at discrete time k in the Nantth antenna system processor 201. Note, however, that Nant=1 to Na, fs=−Nf+1, . . . , 0, . . . , Nf, k=1, . . . , (Nr+Nu)Ns/No, w is an integer of not less than 1, and ΔΦ is the phase rotation unit.

This allows each of the antenna system processors 201 to yield $$\mathrm{FT\_CI}_{(z)}^{Nant}(k, -Nf+1, w), \ldots, \mathrm{FT\_CI}_{(z)}^{Nant}(k, Nf-1, w),$$

which are results of coherent integration according to 2Nf Doppler frequency components for each discrete time k, for the duration (Tr×Np×Nc) of every Np×Nc radar transmission periods Tr. It should be noted that j is the imaginary unit and z=1, . . . , Nt.

In a case where ΔΦ=1/Nc, the aforementioned process in the Doppler frequency analyzer 213 is equivalent to performing a discrete Fourier transform (DFT) operation on outputs from the adder 212 at a sampling frequency fm=1/Tm at sampling intervals Tm=(Tr×Np).

Further, setting Nf to a power-of-two number allows the Doppler frequency analyzer 213 to apply a fast Fourier transform (FFT) operation and reduce the amount of arithmetic processing. It should be noted that when Nf>Nc, performing zero filling such that $Cl_{(z)}$(k, Nc(w−1)+q)=0 in a region where q>Nc makes it possible to similarly apply an FFT operation and reduce the amount of arithmetic processing.

Alternatively, instead of performing an FFT operation, the Doppler frequency analyzer 213 may perform a process of serially performing product-sum operations according to Eq. (3) above. That is, in response to $Cl_{(z)}$(k, Nc(w−1)+q+1), which are Nc outputs from the adder 212 obtained for each discrete time k, the Doppler frequency analyzer 213 may generate a coefficient $\exp[-j2\pi f_s T_r N_p q\Delta\Phi]$ corresponding to fs=−Nf+1, . . . , 0, . . . , Nf−1 and serially perform product-sum operations. Note here that q=0 to Nc−1.

It should be noted that, in the following description, the wth outputs $$\mathrm{FT\_CI}_{(z)}^{1}(k, fs, w), \mathrm{FT\_CI}_{(z)}^{2}(k, fs, w), \ldots, \mathrm{FT\_CI}_{(z)}^{Na}(k, fs, w)$$

obtained by performing the same processes in the Na antenna system processors 201 are denoted as a virtual receiving array correlation vector h(k, fs, w) in the following equations. The virtual receiving array correlation vector h(k, fs, w) includes as many elements as Nt×Na, which is the product of the number of transmitting antennas Nt and the number of receiving antennas Na. The virtual receiving array correlation vector h(k, fs, w) is used in the following description of a process of making a direction estimate based on a phase difference between receiving antennas 202 in response to reflected-wave signals from a target. Note here that z=1, . . . , Nt and b=1, . . . , Na.

$$h(k, fs, w) = \begin{bmatrix} \mathrm{FT\_CI}_{(1)}^{1}(k, fs, w) \\ \mathrm{FT\_CI}_{(2)}^{1}(k, fs, w) \\ \vdots \\ \mathrm{FT\_CI}_{(Nt)}^{1}(k, fs, w) \\ \mathrm{FT\_CI}_{(1)}^{2}(k, fs, w) \\ \mathrm{FT\_CI}_{(2)}^{2}(k, fs, w) \\ \vdots \\ \mathrm{FT\_CI}_{(Nt)}^{2}(k, fs, w) \\ \vdots \\ \mathrm{FT\_CI}_{(1)}^{Na}(k, fs, w) \\ \mathrm{FT\_CI}_{(2)}^{Na}(k, fs, w) \\ \vdots \\ \mathrm{FT\_CI}_{(Nt)}^{Na}(k, fs, w) \end{bmatrix} = \begin{bmatrix} h^1(k, fs, w) \\ h^2(k, fs, w) \\ \vdots \\ h^{Na}(k, fs, w) \end{bmatrix} \tag{4}$$

$$h^b(k, fs, w) = \begin{bmatrix} \mathrm{FT\_CI}_{(1)}^{b}(k, fs, w) \\ \mathrm{FT\_CI}_{(2)}^{b}(k, fs, w) \\ \vdots \\ \mathrm{FT\_CI}_{(Nt)}^{b}(k, fs, w) \end{bmatrix} \tag{5}$$

The foregoing has described processes in the components of the signal processor 207.

The direction estimator 214 calculates a virtual receiving array correlation vector $h_{\_after\_cal}$(k, fs, w) with corrections made to a phase deviation and an amplitude deviation between antenna system processors 201 with use of an array correction value $h\_cal_{[y]}$ for the virtual receiving array correlation vector h(k, fs, w) of the wth Doppler frequency analyzer 213 outputted from the antenna system processors 201-1 to 201-Na. The virtual receiving array correlation vector $h_{\_after\_cal}$(k, fs, w) is expressed by the following equation. It should be noted that y=1, . . . , (Nt×Na).

$$h_{\_after\_cal}(k, fs, w) = CA\,h(k, fs, w) = \begin{bmatrix} h_1(k, fs, w) \\ h_2(k, fs, w) \\ \vdots \\ h_{Na\times Nr}(k, fs, w) \end{bmatrix} \tag{6}$$

$$CA = \begin{bmatrix} \text{h\_cal}_{[1]} & 0 & \dots & 0 \\ 0 & \text{h\_cal}_{[2]} & \ddots & \dots \\ \vdots & \ddots & \ddots & 0 \\ 0 & \dots & 0 & \text{h\_cal}_{[Nt\times Na]} \end{bmatrix}$$

The virtual receiving array correlation vector $h_{\_after\_cal}$(k, fs, w) with corrections made to the inter-antenna deviations is a column vector composed of Na×Nr elements. In the following, the elements of the virtual receiving array correlation vector $h_{\_after\_cal}$(k, fs, w) are denoted as $h_1$(k, fs, w), . . . , $h_{Na\times Nr}$(k, fs, w) for use in the description of the direction estimation process.

Antenna Arrangement in Radar Apparatus 10

Arrangements of the Nt transmitting antennas 106 and the Na receiving antennas 202 in the radar apparatus 10 thus configured are described.

The Nt transmitting antennas 106 (transmitting array antenna) include a "first antenna group" including a plurality of transmitting antennas 106 that are identical in position in a vertical direction (called vertical position) and different in position in a horizontal direction (called horizontal position) (i.e. a plurality of transmitting antennas 106 arranged in a horizontal direction) and a "second antenna" that is a transmitting antenna 106 placed in a position different from the vertical and horizontal positions of the plurality of transmitting antennas 106 of the first antenna group.

Further, the Na receiving antennas 202 (receiving array antenna) include a "third antenna group" including a plurality of receiving antennas 202 that are identical in vertical position and different in horizontal position (i.e. a plurality of receiving antennas 202 arranged in a horizontal direction) and a "fourth antenna" that is a receiving antenna 202 placed in a position different from the vertical and horizontal positions of the plurality of receiving antennas 202 of the third antenna group.

The following describes example arrangements of transmitting and receiving antennas according to Embodiment 1.

Figure 8A:
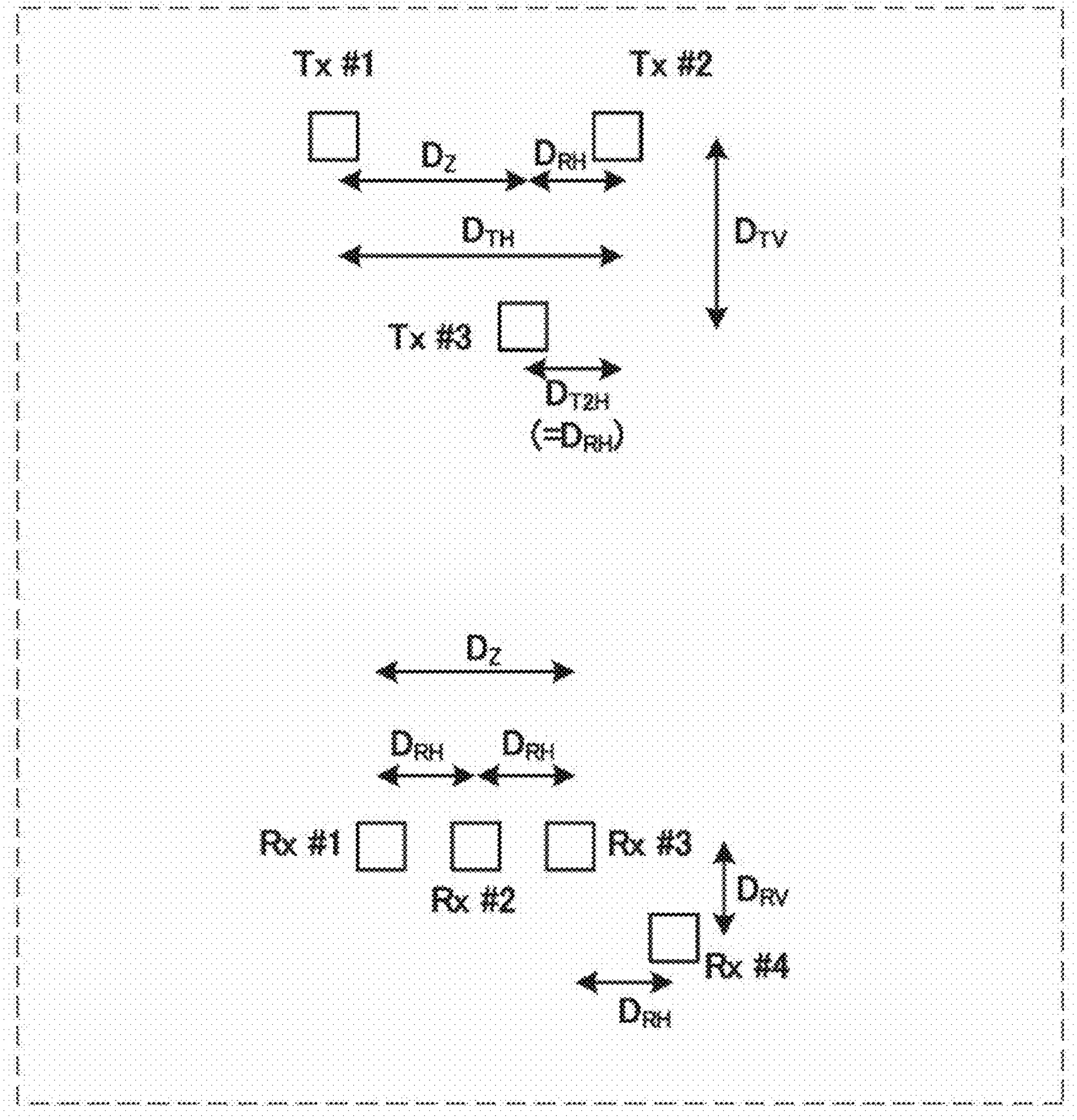
FIG. 8A is a diagram showing an example arrangement of transmitting and receiving antennas according to Embodiment 1.
Figure 8B:
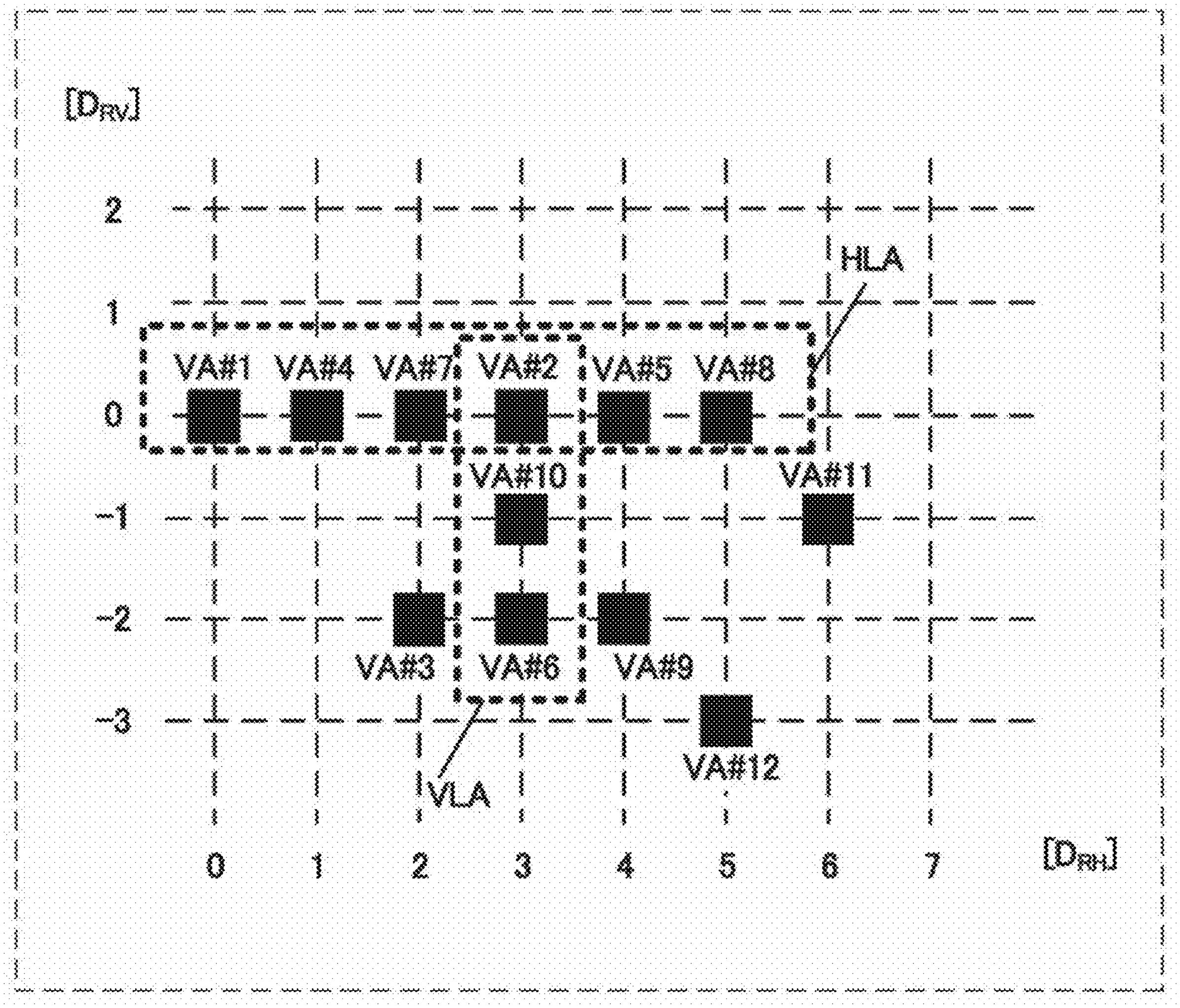
FIG. 8B is a diagram showing an example arrangement of a virtual receiving array according to Embodiment 1.

FIG. 8A shows an example arrangement of transmitting antennas 106 and receiving antennas 202. Further, FIG. 8B shows an arrangement of a virtual receiving array that is obtained by the antenna arrangement shown in FIG. 8A.

(1) Arrangement of Transmitting and Receiving Antennas

FIG. 8A assumes that the number Nt of transmitting antennas 106 is 3 and the number Na of receiving antennas 202 is 4. Further, the three transmitting antennas 106 are denoted by Tx #1 to Tx #3, and the four receiving antennas 202 are denoted by Rx #1 to Rx #4.

In FIG. 8A, the receiving antennas Rx #1 to Rx #3 constitute a third antenna group of receiving antennas that are identical in vertical position and different in horizontal position. Specifically, in FIG. 8A, the horizontal interelement spacings $D_{RH}$ between the receiving antennas Rx #1 to Rx #3 of the third antenna group are constant (regular spacings).

Further, in FIG. 8A, the receiving antenna Rx #4 is a fourth antenna placed in a position different from both the horizontal and vertical positions in which the third antenna group is placed. Specifically, in FIG. 8A, the horizontal position of the receiving antenna Rx #4, which is the fourth antenna, is a position that is at a spacing $D_{RH}$ outward (rightward) in a horizontal direction from the horizontal position of a receiving antenna at one end of the third antenna group (the leftmost antenna Rx #1 or the rightmost antenna Rx #3. In the example shown in FIG. 8A, the rightmost antenna Rx #3).

Further, in FIG. 8A, the vertical position of the fourth antenna (Rx #4) is a position that is at a spacing $D_{RV}$ from the vertical position of the third antenna group (Rx #1 to Rx #3).

Meanwhile, in FIG. 8A, the transmitting antennas Tx #1 and Tx #2 constitute a first antenna group of transmitting antennas that are identical in vertical position and different in horizontal position. Further, in FIG. 8A, the transmitting antenna Tx #3 is a second antenna placed in a position different from both the horizontal and vertical positions in which the first antenna group is placed.

Specifically, in FIG. 8A, the horizontal interelement spacing $D_{TH}$ between the transmitting antennas Tx #1 and Tx #2 of the first antenna group is a spacing ($D_Z$+$D_{RH}$) obtained by adding the spacing $D_{RH}$ to the horizontal antenna aperture length $D_Z$ of the third antenna group (Rx #1, Rx #2, and Rx #3). For example, in the interelement spacing $D_{TH}$ of the first antenna group, the spacing $D_{RH}$ that is added to the antenna aperture length $D_z$ is equal to the aforementioned horizontal spacing between the third antenna group and the fourth antenna (in FIG. 8A, the spacing $D_{RH}$ between Rx #3 and Rx #4).

Further, in FIG. 8A, the horizontal position of the transmitting antenna Tx #3, which is the second antenna, is a position inside the transmitting antennas Tx #1 and Tx #2 of the first antenna group. Specifically, the horizontal position of the transmitting antenna Tx #3 is a position displaced by a spacing $D_{T2H}$ in a horizontal direction within the range of horizontal aperture of the first antenna group (in FIG. 8A, within the range inside the horizontal positions of the end-point antennas Tx #1 and Tx #2) from the horizontal position of either antenna of the first antenna group (Tx #1 and Tx #2).

For example, as shown in FIG. 8A, in a case where the horizontal position of the fourth antenna (Rx #4) is on the outer side (right side) of the horizontal position of the rightmost antenna Rx #3 of the third antenna group, the interelement spacing between antennas in the third antenna group based on the leftmost antenna Rx #1 of the third antenna group (in the case of FIG. 8A, the spacing $D_{RH}$ between Rx #1 and Rx #2 or the spacing $2D_{RH}$ between Rx #1 and Rx #3) may be used as the spacing $D_{T2H}$ from the horizontal position of the rightmost antenna Tx #2 of the first antenna group.

Further, in a case (not illustrated) where the horizontal position of the fourth antenna (Rx #4) is on the outer side (left side) of the horizontal position of the leftmost antenna Rx #1 of the third antenna group, the interelement spacing between antennas in the third antenna group based on the rightmost antenna Rx #3 of the third antenna group (for example, in the case of the third antenna group shown in FIG. 8A, the spacing $D_{RH}$ between Rx #3 and Rx #2 or the spacing $2D_{RH}$ between Rx #3 and Rx #1) may be used as the spacing $D_{T2H}$ from the horizontal position of the leftmost antenna Tx #1 of the first antenna group.

That is, the horizontal interelement spacing (in FIG. 8A, $D_{RH}$ or $2D_{RH}$) between a receiving antenna (in FIG. 8A, Rx #1) of the third antenna group (in FIG. 8A, Rx #1 to Rx #3) located at an end on a side opposite (second side; in FIG. 8A, the left side) to a side (first side; in FIG. 8A, the right side) close to the position in which the fourth antenna (Rx #4) is placed and each of the other antennas (in FIG. 8A, Rx #2 and Rx #3) of the third antenna group is identical to the horizontal interelement spacing (in FIG. 8A, $D_{RH}$) between the transmitting antenna Tx #2, of the adjacent transmitting antennas Tx #1 and Tx #2 of the first antenna group, that is located on the same side (in FIG. 8A, the right side) as the first side and the transmitting antenna (Tx #3) of the second antenna.

In other words, the horizontal interelement spacing (in FIG. 8A, $D_{T2H}=D_{RH}$) between a transmitting antenna (in FIG. 8A, the rightmost antenna Tx #2), of the transmitting antennas (in FIG. 8A, Tx #1 and Tx #2) of the first antenna group, that is located on a first side (in FIG. 8A, the right side) and the second antenna (Tx #3) is identical to the interelement spacing (in FIG. 8A, $D_{RH}$ or $2D_{RH}$) between a receiving antenna (in FIG. 8A, the leftmost antenna Rx #1) of the receiving array antenna located at an end on a side opposite (in FIG. 8A, the left side) to the first side of the first antenna group and each of the other receiving antennas (in FIG. 8A, Rx #2 and Rx #3).

Further, in FIG. 8A, the vertical position of the second antenna (Tx #3) is a position that is at a spacing $D_{TV}$ from the vertical position of the first antenna group (Tx #1 and Tx #2).

Note here that the spacing $D_{TV}$ is a spacing that is different from the vertical spacing $D_{RV}$ between the third antenna group and the fourth antenna. In other words, the spacing $D_{TV}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of the second antenna, and the vertical position of the fourth antenna are different positions (i.e. do not overlap).

As shown in FIG. 8A, the arrangement of the transmitting antennas Tx #1 to Tx #3 that constitute the transmitting array antenna is an arrangement in which the antennas do not overlap in a vertical direction. For this reason, the vertical size of the transmitting antennas Tx #1 to Tx #3 that constitute the transmitting array antenna can be an arbitrary size. Similarly, as shown in FIG. 8A, the arrangement of the receiving antennas Rx #1 to Rx #4 that constitute the receiving array antenna is an arrangement in which the antennas do not overlap in a vertical direction. For this reason, the vertical size of the receiving antennas Rx #1 to Rx #4 that constitute the receiving array antenna can be an arbitrary size.

(2) Arrangement of Virtual Receiving Array

The arrangement of the virtual receiving array (virtual antennas VA #1 to VA #12) shown in FIG. 8B, which is constituted by the antenna arrangement shown in FIG. 8A described above, has the following characteristics.

Note here that the arrangement of the virtual receiving array can be expressed by the following equation from the position of a transmitting antenna that constitutes a transmitting array antenna (position of a feeding point) and the position of a receiving antenna that constitutes a receiving array antenna (position of a feeding point). Note here that mod (x, y) is an operator for calculation of a reminder after division (modulo arithmetic) and returns a remainder of division of x by y. Further, ceil(x) is an operator that returns a value rounded to the closest integer of not less than x.

$$\begin{cases} X_{V\_\#k} = (X_{T\_\#[mod(k-1,Nt)+1]} - X_{T\_\#1}) + \left(X_{R\#[ceil(k/Na)]} - X_{R\_\#1}\right) \\ Y_{V\_\#k} = (Y_{T\_\#[mod(k-1,Nt)+1]} - Y_{T\_\#1}) + \left(Y_{R\#[ceil(k/Na)]} - Y_{R\_\#1}\right) \end{cases} \quad (7)$$

Assume here that the position coordinates of a transmitting antenna that constitutes the transmitting array antenna is $(X_{T\_\#n}, Y_{T\_\#n})$ (where n=1, . . . , Nt), that the position coordinates of a receiving antenna that constitutes the receiving array antenna is $(X_{R\_\#m}, Y_{R\_\#m})$ (where m=1, . . . , Na), and that the position coordinates of a virtual antenna that constitutes a virtual receiving array antenna is $(X_{V\_\#k}, Y_{V\_\#k})$ (where k=1, . . . , Nt×Na). It should be noted that Eq. (7) expresses VA #1 as a position reference (0, 0) of the virtual receiving array.

The virtual receiving array shown in FIG. 8B is configured to include a horizontal virtual linear array antenna HLA composed of six virtual antennas (VA #1, VA #4, VA #7, VA #2, VA #5, and VA #8 surrounded by dashed lines shown in FIG. 8B) arranged in a straight line at interelement spacings $D_{RH}$ (regular spacings) in a horizontal direction. The HLA shown in FIG. 8B is obtained from a horizontal positional relationship between the two transmitting antennas Tx #1 and TX #2 of the first antenna group placed at an interelement spacing $D_{TH}$ in a horizontal direction in FIG. 8A and the three receiving antennas Rx #1, Rx #2, and Rx #3 of the third antenna group placed at interelement spacings $D_{RH}$ in a horizontal direction in FIG. 8A. Specifically, the number of virtual antennas that are lined up in a straight line in a horizontal direction has such a relationship as to be the product (in FIG. 8B, 6) of the number of antennas (in FIG. 8A, 2) of the first antenna group and the number of antennas (in FIG. 8A, 3) of the third antenna group.

Further, in FIG. 8A, the interelement spacings $D_{RH}$ between the plurality of receiving antennas (Rx #1 to Rx #3) of the third antenna group are equal. Further, the interelement spacings ($D_{RH}$) between the plurality of receiving antennas of the third antenna group and the spacing ($D_{RH}$) between the third antenna group and the fourth antenna (Rx #4) in a horizontal direction are equal. This causes the six virtual antennas to be placed at regular spacings in a straight line in a horizontal direction in the HLA of the virtual receiving array shown in FIG. 8B.

Further, the virtual receiving array shown in FIG. 8B is configured to include a vertical virtual linear array antenna VLA composed of three virtual antennas (VA #2, VA #10, and VA #6 surrounded by dashed lines shown in FIG. 8B) arranged in a straight line in a vertical direction. The number of virtual antennas that are lined up in a straight line in a vertical direction has such a relationship as to be "(Number of Antennas of Second Antenna)+ (Number of Antennas of Fourth Antenna)+1" (in FIG. 8B, 3).

The VLA has an arrangement of virtual antennas lined up in ascending order of $D_{TV}$ and $D_{RV}$ from the vertical position of the first antenna group (Tx #1 and Tx #2). For example, in a case where $D_{TV}>D_{RV}$, the interelement spacings between the virtual antennas within the VLA are $D_{RV}$ and $(D_{TV}-D_{RV})$. Further, in a case where $D_{TV}<D_{RV}$, the interelement spacings between the virtual antennas within the VLA are $D_{TV}$ and $(D_{RV}-D_{TV})$.

Further, when $D_{TV}=2D_{RV}$, the VLA has an arrangement of virtual antennas lined up in a straight line in a vertical direction at regular spacings ($D_{RV}$). Further, when $2D_{TV}=D_{RV}$, the VLA has an arrangement of virtual antennas lined up in a straight line in a vertical direction at regular spacings ($D_{TV}$).

FIG. 8B shows, as an example, an example where $D_{TV}=2D_{RV}$ (i.e. a case where $D_{TV}>D_{RV}$). That is, in FIG. 8B, the VLA has an arrangement of VA #2, VA #10, and VA #6 lined up in a straight line in a vertical direction at regular spacings ($D_{RV}$). This makes it possible to reduce a peak side lobe ratio in a vertical direction.

It should be noted that neither $D_{TV}=2D_{RV}$ nor $2D_{TV}=D_{RV}$ is intended to impose any limitation. That is, in a case where it is assumed that the first antenna group and the third antenna group are identical in position in a vertical direction, the interelement spacings between vertically adjacent antennas in the first antenna group (Tx #1 and TX #2) (or the third antenna group (Rx #1 to Rx #3)), the second antenna (Tx #3), and the fourth antenna (Rx #4) may be equal spacings or unequal spacings. In the case of unequal spacings (in a case other than $D_{TV}=2D_{RV}$ or $2D_{TV}=D_{RV}$), the VLA is an unequally-spaced array and can have an enlarged aperture length. This brings about a narrower main lobe and an effect of improving vertical angular separation performance.

Note here that, as shown in Eq. (4), Eq. (7), and FIG. 8B, the virtual antenna VA #1 is obtained from a relationship between the receiving antenna Rx #1 and the transmitting antenna Tx #1. Further, with the position (vertical position, horizontal position) of VA #1 as the reference position (0, 0), the virtual antenna VA #2 of the VLA is obtained from a relationship between the receiving antenna Rx #1 and the transmitting antenna Tx #2, the virtual antenna VA #6 of the VLA is obtained from a relationship between the receiving antenna Rx #2 and the transmitting antenna Tx #3, and the virtual antenna VA #10 of the VLA is obtained from a relationship between the receiving antenna Rx #4 and the transmitting antenna Tx #1.

As mentioned above, the interelement spacing $D_{TH}$ of the first antenna group is equal to the sum of the aperture length $D_Z$ of the third antenna group and the spacing $D_{RH}$ between the third antenna group and the fourth antenna in a horizontal direction, i.e. the horizontal aperture length of the receiving array antenna. As a result, the horizontal position of VA #2 (virtual antenna obtained from the relationship between Rx #1 and Tx #2) placed in a position that is at the interelement spacing $D_{TH}$ of the first antenna group in a horizontal direction from the reference position VA #1 and the horizontal position of VA #10 (virtual antenna obtained from the relationship between Rx #4 and Tx #1) placed in a position that is at the aperture length ($D_Z+D_{RH}$) of the receiving array antenna in a horizontal direction from the reference position VA #1 become identical (in FIG. 8B, a position that is at a spacing $3D_{RH}$ from the reference position). Further, since the third antenna group and the fourth antenna are different in vertical position by $D_{RH}$, VA #2 and VA #10 are also different in vertical position by $D_{RV}$. As a result, VA #2 and VA #10 are placed in an identical horizontal position and lined up side by side in a vertical direction.

Further, the interelement spacing $D_{T2H}$ between the right end (in FIG. 8A, Tx #2) of the first antenna group and the second antenna (Tx #3) in a horizontal direction is equal to the interelement spacing $D_{RH}$ from the leftmost antenna Rx #1 of the third antenna group to another receiving antenna (e.g. Rx #2) of the third antenna group. As a result, the horizontal position of the virtual antenna VA #2 obtained from the relationship between Rx #1 and Tx #2 and the horizontal position of the virtual antenna VA #6 obtained from the relationship between Rx #2 and Tx #3 become identical (in FIG. 8B, a position that is at a spacing $3D_{RH}$ from the reference position). Further, since the first antenna group and the second antenna are different in vertical position, VA #2 and VA #6 are also different in vertical position by $D_{TV}$. As a result, VA #2 and VA #6 are placed in an identical horizontal position and lined up side by side in a vertical direction.

Further, the reference position (i.e. the vertical position of the first antenna group and the vertical position of the third antenna group), the position (spacing $D_{TV}$) of the second antenna, and the position (spacing $D_{RV}$) of the fourth antenna are different in a vertical direction. As a result, the virtual receiving array has its VA #2 placed in a reference position in a vertical direction and has its VA #10 and VA #6 placed in different vertical positions.

Thus, VA #2, VA #10, and VA #6, which constitute the VLA, are placed in an identical horizontal position and different vertical positions.

In this way, with the limited number Nt of transmitting antennas being 3 and the limited number Na of receiving antennas being 4, the arrangement of antennas that constitute a transmitting array antenna and a receiving array antenna shown in FIG. 8A allows the arrangement of the virtual receiving array (VA #1, . . . , VA #12) shown in FIG. 8B to be an arrangement of six antennas (HLA) in a straight line in a horizontal direction and three antennas (VLA) in a straight line in a vertical direction, thus making it possible to maximally enlarge the aperture lengths of the virtual receiving array.

The direction estimator 214 performs horizontal and vertical direction-of-arrival estimation processes in the following manner with use of signals received by a virtual receiving array (see FIG. 8B) obtained from the aforementioned arrangement of transmitting and receiving antennas (see FIG. 8A).

The element numbers (numbers of VA #) of the virtual receiving array correspond to the element numbers of a column vector of the virtual receiving array correlation vector $h_{\_after\_cal}(k, fs, w)$ of Eq. (6) with corrections made to the inter-antenna deviations. For example, VA #1 corresponds to the first element $h_1(k, fs, w)$ of the column vector element of $h_{\_after\_cal}(k, fs, w)$. The same applies to VA #2 to VA #12.

In the horizontal and vertical direction-of-arrival estimation, the direction estimator 214 calculates a spatial profile with variations in azimuth direction θ and elevation direction ϕ in a direction estimation evaluation function value P(θ, ϕ, k, fs, w) within a predetermined angular range, extracts a predetermined number of maximal peaks of the calculated spatial profile in descending order, and outputs the azimuth and elevation directions of the maximal peaks as direction-of-arrival estimate values.

It should be noted that the direction estimation evaluation function value P(θ, ϕ, k, fs, w) can be obtained by various methods depending on direction-of-arrival estimation algorithms. For example, a usable example of a method for estimation with an array antenna is disclosed in Direction-of-arrival estimation using signal subspace modeling Cadzow, J. A.; Aerospace and Electronic Systems, IEEE Transactions on Volume: 28, Issue: 1 Publication Year: 1992, Page(s): 64-79.

For example, a beamformer method can be expressed by equations below. Other techniques such as Capon and MUSIC are similarly applicable.

$$P(\theta_u, \phi_v k, fs, w) = \left|a(\theta_u, \phi_v)^H h_{\_after\_cal}(k, fs, w)\right|^2 \tag{8}$$

Note here that the superscript H is the Hermitian transposed operator. Further, $a(\theta_u, \phi_v)$ denotes the directional vector of the virtual receiving array with respect to an incoming wave in the azimuth direction θ and the elevation direction ϕ.

As noted above, the direction estimator 214 outputs, as radar measurement results, the direction-of-arrival estimate values thus calculated and the discrete time k and Doppler frequency fsΔΦ at which the direction-of-arrival estimate values were calculated.

Further, the azimuth direction $\theta_u$ is a vector obtained by changing, by a predetermined azimuth interval $\beta_1$, an azimuth range within which a direction-of-arrival estimate is made. For example, $\theta_u$ is set as follows:

$$\theta_u = \theta\min + u\beta_1,\ u = 0, \ldots , NU$$

$$NU = \text{floor}\left[(\theta\max - \theta\min)/\beta_1\right] + 1$$

where floor (x) is a function that returns the a maximum integer value that does not exceed the real number x.

Further, $\phi_v$ is obtained by changing, by a predetermined azimuth interval $\beta_2$, an elevation range within which a direction-of-arrival estimate is made. For example, $\phi_v$ is set as follows:

$$\phi_v = \phi\min + v\beta_2,\ v = 0, \ldots , NV$$

$$NV = \text{floor}\left[(\phi\max - \phi\min)/\beta_2\right] + 1$$

In Embodiment 1, the directional vector $a(\theta_u, \phi_v)$ of the virtual receiving array is calculated in advance on the basis of the virtual receiving array arrangement VA #1, . . . , VA #(Nt×Na). Note here that the directional vector $a(\theta_u, \phi_v)$ is a (Nt×Na)th column vector whose element is a complex response of the virtual receiving array in the case of arrival of radar reflected waves from the azimuth direction θ and the elevation direction ϕ. Further, the complex response $a(\theta_u, \phi_v)$ of the virtual receiving array represents a phase difference that is geometrical-optically calculated at the interelement spacing between antennas.

Further, the aforementioned time information k may be converted into distance information to be outputted. The time information k may be converted into distance information R(k) according to equation below. Note here that Tw denotes the code transmission section, L denotes the pulse code length, and $C_0$ denotes the velocity of light.

$$R(k) = k\frac{T_w C_0}{2L} \tag{9}$$

Further, the Doppler frequency information (fsΔΦ) may be converted into a relative velocity component to be outputted. The Doppler frequency fsΔΦ can be converted into a relative velocity component $v_d$(fs) according to equation below. Note here that λ is the wavelength of the carrier frequency of an RF signal that is outputted from a radio transmitter 105.

$$v_d(f_s) = \frac{\lambda}{2} f_s \Delta\theta \tag{10}$$

As noted above, using the array arrangement shown in FIG. 8A prevents antennas from overlapping in a vertical direction in the radar apparatus 10 (MIMO radar), thus making it possible to use sub-array antennas of an arbitrary size in a vertical direction. Further, using the array arrangement shown in FIG. 8A makes it possible to maximize an aperture plane constituted by the horizontal and vertical directions of the virtual receiving array shown in FIG. 8B.

Therefore, according to Embodiment 1, the radar apparatus 10 can maximally enlarge the vertical and horizontal aperture lengths of a virtual receiving array in performing two-dimensional vertical and horizontal beam scanning with use of a MIMO radar, thus allowing high-resolution angle measuring in vertical and horizontal directions. That is, Embodiment 1 makes it possible to maximally enlarge the vertical and horizontal aperture lengths of a virtual receiving array without deterioration in detection performance of a radar apparatus and improve angular resolution with a small number of antenna elements.

In FIG. 8A, the spacings between the transmitting antennas Tx #1 to Tx #3 and the receiving antennas Rx #1 to Rx #4 do not affect the arrangement of the virtual receiving array. Note, however, that since the proximity of the transmitting antennas Tx #1 to Tx #3 and the receiving antennas Rx #1 to Rx #4 enhances the degree of coupling between the transmitting and receiving antennas, it is preferable that they be arranged as far from one another as possible within the allowable antenna size. The same applies to the after-mentioned other antenna arrangements.

Further, in FIG. 8A, the vertical position of the second antenna (Tx #3) is a position that is at a spacing $D_{TV}$ downward from the vertical position of the first antenna group (Tx #1 and Tx #2), and the vertical position of the fourth antenna (Rx #4) is a position that is at a spacing $D_{RV}$ downward from the vertical position of the third antenna group (Rx #1, Rx #2, and Rx #3). However, in Embodiment 1, the vertical position of the second antenna (Tx #3) may be a position that is at a spacing $D_{TV}$ upward from the vertical position of the first antenna group (Tx #1 and Tx #2), and the vertical position of the fourth antenna (Rx #4) is a position that is at a spacing $D_{RV}$ upward from the vertical position of the third antenna group (Rx #1, Rx #2, and Rx #3).

Further, although Embodiment 1 has been described by taking, as an example, a case where the number Nt of transmitting antennas is 3 and the number Na of receiving antennas is 4, the number Na of receiving antennas is not limited to 4. For example, the first antenna group needs only include at least two transmitting antennas 106, and the third antenna group needs only include at least two receiving antennas 202. Therefore, it is possible to arrange a virtual receiving antenna in a manner similar to Embodiment 1 and bring about effects which are similar to those of Embodiment 1, provided the number of transmitting antennas of the first antenna group is 2 or larger and the number of receiving antennas of the third antenna group is 2 or larger. That is, the minimum antenna configuration in Embodiment 1 is such that the number Nt of transmitting antennas is 3 and the number Na of receiving antennas is 3. Similarly, as for the after-mentioned other antenna arrangements, too, the minimum antenna configuration is such that the number Nt of transmitting antennas is 3 and the number Na of receiving antennas is 3.

For example, the number of virtual antennas that constitute the HLA in the virtual receiving array corresponds to the product of the number of transmitting antennas of the first antenna group and the number of receiving antennas of the third antenna group. Therefore, the larger the number of transmitting antennas of the first antenna group or the number of receiving antennas of the third antenna group becomes, the larger the number of virtual antennas that constitute the HLA becomes. This brings about a narrower horizontal main lobe and an effect of improving horizontal angular separation performance.

Figure 9A:
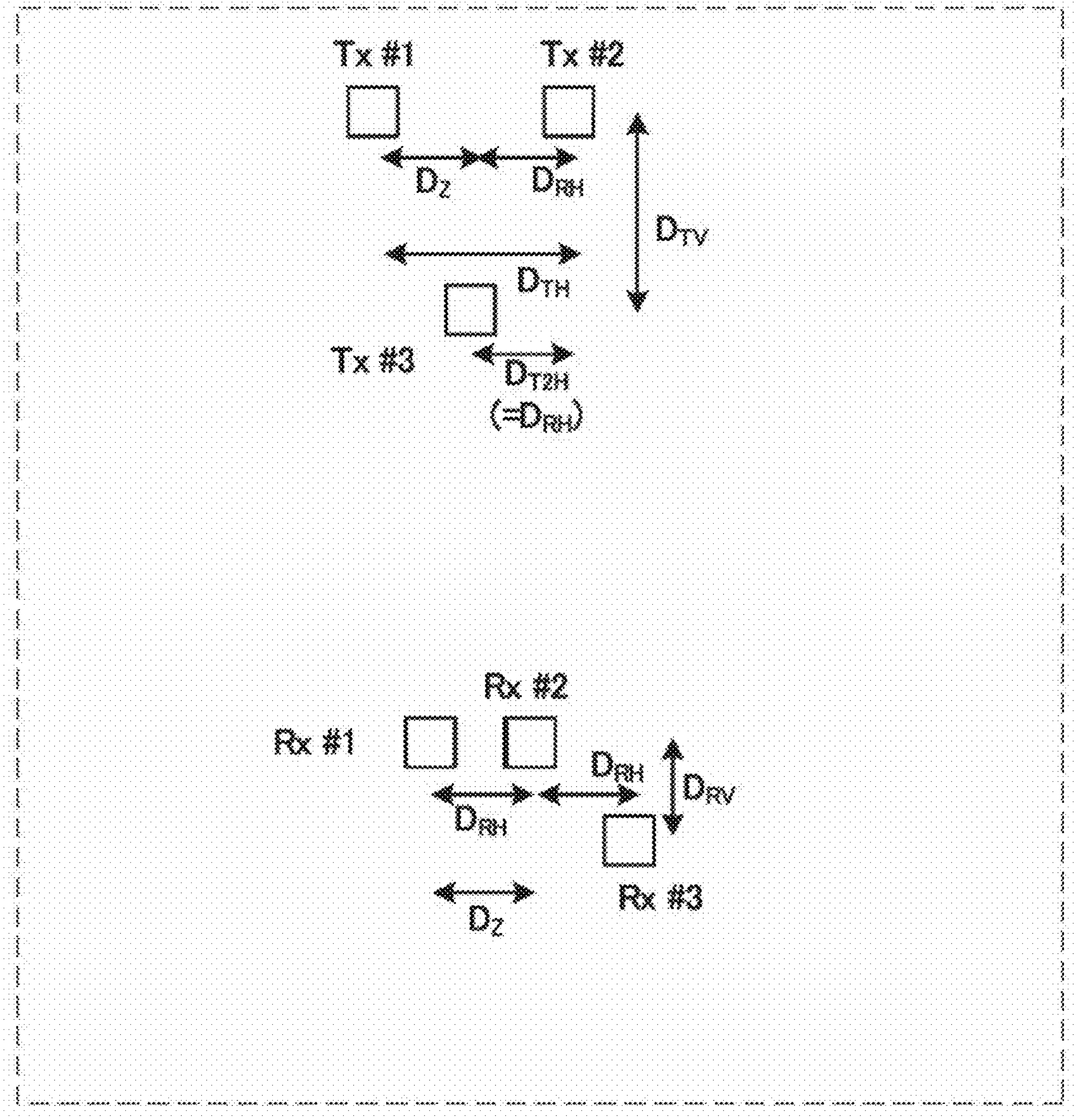
FIG. 9A is a diagram showing another example arrangement of transmitting and receiving antennas according to Embodiment 1.
Figure 9B:
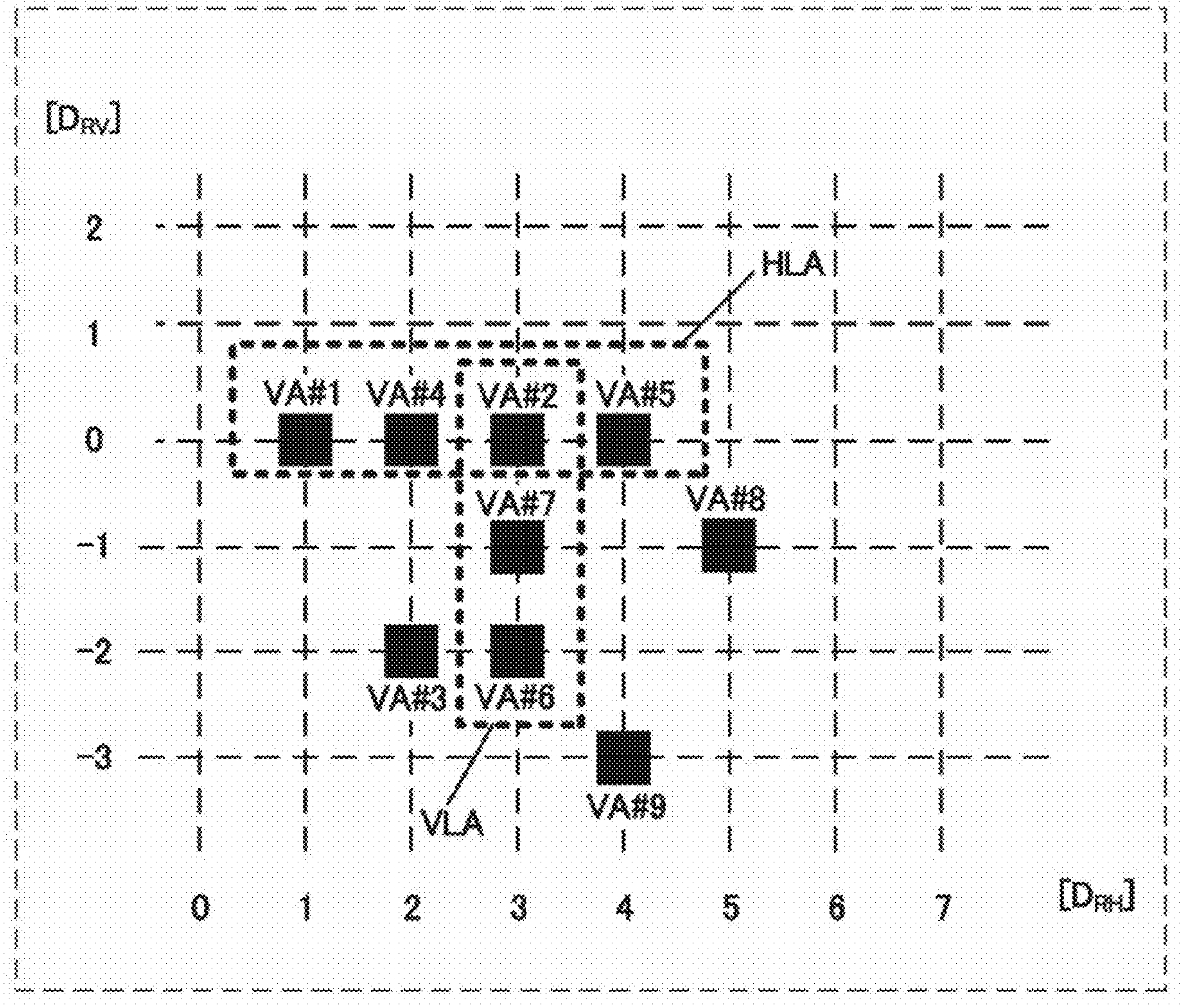
FIG. 9B is a diagram showing another example arrangement of a virtual receiving array according to Embodiment 1.

As an example, FIG. 9A shows an arrangement in which the minimum antenna configuration is such that the number Nt of transmitting antennas is 3 (Tx #1, Tx #2, and Tx #3) and the number Na of receiving antennas is 3 (Rx #1, Rx #2, and Rx #3), and FIG. 9B shows an arrangement of a virtual receiving array that is obtained by the antenna arrangement shown in FIG. 9A.

In FIG. 9A, the transmitting array antenna is composed of a first antenna group including a plurality of transmitting antennas (Tx #1 and Tx #2) that are identical in vertical position and different in horizontal position and a second antenna (Tx #3) placed in a position different from the vertical and horizontal positions of the transmitting antennas of the first antenna group.

Further, the receiving array antenna is composed of a third antenna group including a plurality of antennas (Rx #1 and Rx #2) that are identical in vertical position and different in horizontal position and a fourth antenna (Rx #3) placed in a position different from the vertical and horizontal positions of the antennas of the third antenna group.

Assume here that $D_{RH}$ is the horizontal interelement spacing between the plurality of antennas (Rx #1 and Rx #2) of the third antenna group and that the horizontal position of the fourth antenna (Rx #3) is a position that is at a spacing $D_{RH}$ outward (rightward) in a horizontal direction from the horizontal position of a receiving antenna at one end of the third antenna group (the leftmost antenna Rx #1 or the rightmost antenna Rx #2. In the example shown in FIG. 9A, the rightmost antenna Rx #2).

Further, in FIG. 9A, the horizontal interelement spacing $D_{TH}$ of the first antenna group (Tx #1 and Tx #2) is a spacing ($D_{TH}=D_Z+D_{RH}$) obtained by adding together the horizontal antenna aperture length $D_Z$ of the third antenna group (Rx #1 and Rx #2) and the spacing $D_{RH}$.

Further, the horizontal position of the second antenna (Tx #3) is a position displaced by a spacing $D_{T2H}$ in a horizontal direction within the range of horizontal aperture of the first antenna group (in FIG. 9A, within the range inside the horizontal positions of the end-point antennas Tx #1 and Tx #2) from the horizontal position of either antenna of the first antenna group (Tx #1 and Tx #2).

For example, as shown in FIG. 9A, in a case where the horizontal position of the fourth antenna (Rx #3) is on the outer side (right side) of the horizontal position of the rightmost antenna Rx #2 of the third antenna group, the interelement spacing between antennas in the third antenna group based on the leftmost antenna Rx #1 of the third antenna group (in the case of FIG. 9A, the spacing $D_{RH}$ between Rx #1 and Rx #2) may be used as the spacing from the horizontal position of the rightmost antenna Tx #2 of the first antenna group.

Further, in a case (not illustrated) where the horizontal position of the fourth antenna (Rx #3) is on the outer side (left side) of the horizontal position of the leftmost antenna Rx #1 of the third antenna group, the interelement spacing between antennas in the third antenna group based on the rightmost antenna Rx #2 of the third antenna group (in the case of the third antenna group shown in FIG. 9A, $D_{RH}$) may be used as the spacing $D_{T2H}$ from the horizontal position of the leftmost antenna Tx #1 of the first antenna group.

Further, in FIG. 9A, the vertical position of the second antenna (Tx #3) is a position that is at a spacing $D_{TV}$ from the vertical position of the first antenna group (Tx #1 and Tx #2), and the vertical position of the fourth antenna (Rx #3) is a position that is at a spacing $D_{RV}$, which is different from the spacing $D_{TV}$, from the vertical position of the third antenna group (Rx #1 and Rx #2).

The arrangement of the virtual receiving array (virtual antennas VA #1 to VA #9) shown in FIG. 9B, which is constituted by the antenna arrangement shown in FIG. 9A described above, has the following characteristics.

The virtual receiving array shown in FIG. 9B is configured to include a horizontal virtual linear array antenna HLA composed of four virtual antennas (VA #1, VA #4, VA #2, and VA #5) arranged in a straight line at interelement spacings $D_{RH}$ (regular spacings) in a horizontal direction. Further, the virtual receiving array shown in FIG. 9B is configured to include a vertical virtual linear array antenna VLA composed of three virtual antennas (VA #2, VA #7, and VA #6) arranged in a straight line in a vertical direction.

As shown in FIG. 9A, the arrangement of the transmitting antennas Tx #1 to Tx #3 that constitute the transmitting array antenna is an arrangement in which the antennas do not overlap in a vertical direction. For this reason, the vertical size of the transmitting antennas Tx #1 to Tx #3 that constitute the transmitting array antenna can be an arbitrary size. Similarly, as shown in FIG. 9A, the arrangement of the receiving antennas Rx #1 to Rx #3 that constitute the receiving array antenna is an arrangement in which the antennas do not overlap in a vertical direction. For this reason, the vertical size of the receiving antennas Rx #1 to Rx #3 that constitute the receiving array antenna can be an arbitrary size.

Furthermore, with the limited number Nt of transmitting antennas being 3 and the limited number Na of receiving antennas being 3, the arrangement of antennas that constitute a transmitting array antenna and a receiving array antenna shown in FIG. 9A allows the arrangement of the virtual receiving array (VA #1, . . . , VA #9) shown in FIG. 9B to be an arrangement of four antennas (HLA) in a straight line in a horizontal direction and three antennas (VLA) in a straight line in a vertical direction, thus making it possible to maximally enlarge the aperture lengths of the virtual receiving array.

Variation 1 of Embodiment 1

FIG. 8A or 9A has shown a case where there is agreement between the direction (downward) in which the vertical position of the second antenna is placed with respect to the vertical position of the first antenna group and the direction (downward) in which the vertical position of the fourth antenna is placed with respect to the vertical position of the third antenna group. However, there does not need to be agreement between the direction in which the vertical position of the second antenna is placed with respect to the vertical position of the first antenna group and the direction in which the vertical position of the fourth antenna is placed with respect to the vertical position of the third antenna group. The same applies to the after-mentioned other antenna arrangements.

Figure 10A:
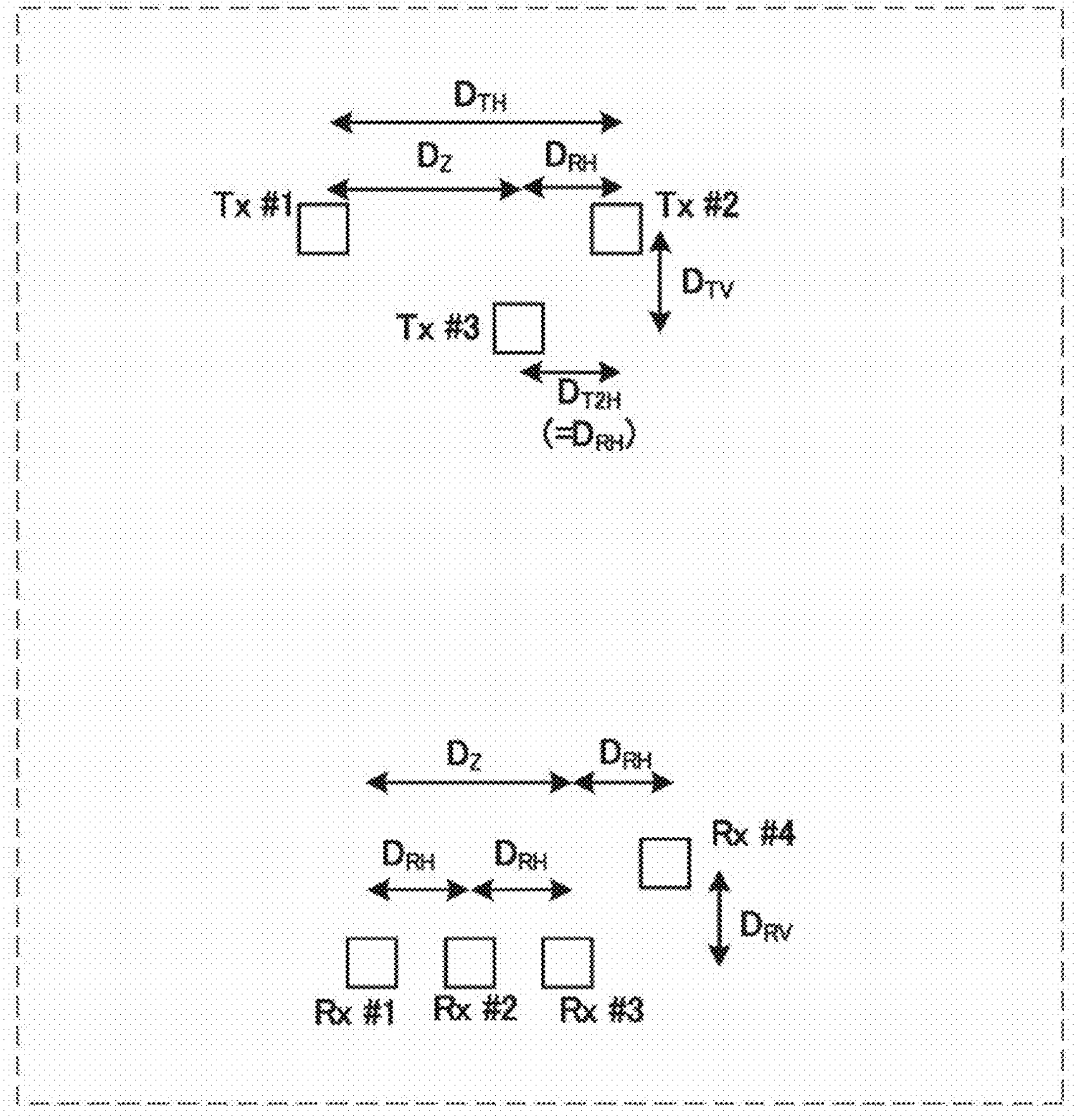
FIG. 10A is a diagram showing an example arrangement of transmitting and receiving antennas according to Variation 1 of Embodiment 1.
Figure 10B:
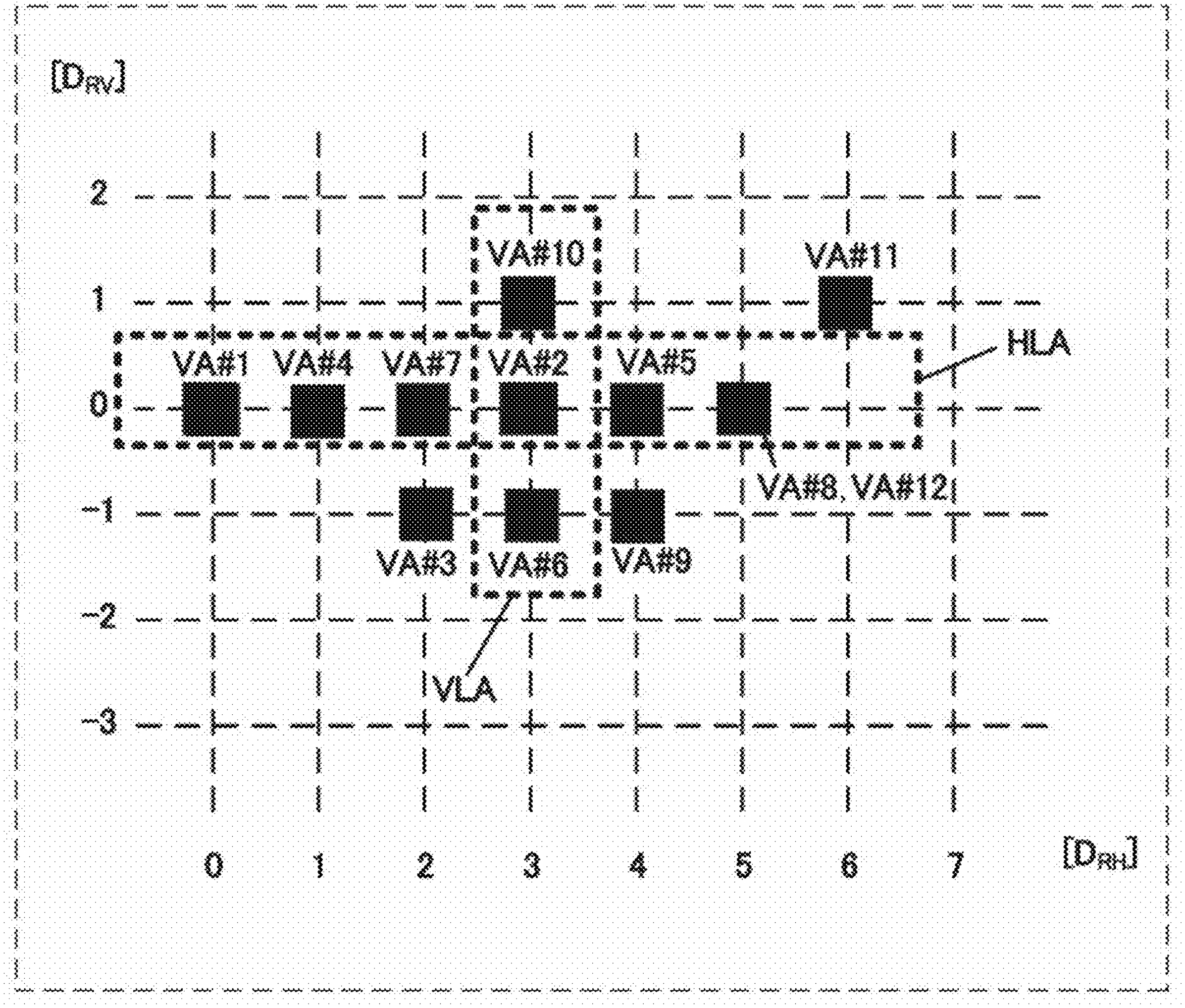
FIG. 10B is a diagram showing another example arrangement of a virtual receiving array according to Variation 1 of Embodiment 1.

FIG. 10A shows an example arrangement of transmitting antennas 106 and receiving antennas 202 according to Variation 1 of Embodiment 1. Further, FIG. 10B shows an arrangement of a virtual receiving array that is obtained by the antenna arrangement shown in FIG. 10A.

As with FIG. 8A, FIG. 10A assumes that the number Nt of transmitting antennas 106 is 3 and the number Na of receiving antennas 202 is 4. Further, the three transmitting antennas 106 are denoted by Tx #1 to Tx #3, and the four receiving antennas 202 are denoted by Rx #1 to Rx #4.

Further, in FIG. 10A, as in FIG. 8A, the horizontal interelement spacings $D_{RH}$ between the receiving antennas Rx #1 to Rx #3 of the third antenna group are constant (regular spacings), and the horizontal position of the receiving antenna Rx #4, which is the fourth antenna, is a position that is at a spacing $D_{RH}$ outward (rightward) in a horizontal direction from the horizontal position of a receiving antenna at one end of the third antenna group (the leftmost antenna Rx #1 or the rightmost antenna Rx #3. In the example shown in FIG. 10A, the rightmost antenna Rx #3).

Further, in FIG. 10A, as in FIG. 8A, the horizontal interelement spacing $D_{TH}$ between the transmitting antennas Tx #1 and Tx #2 of the first antenna group is a spacing ($D_Z$+$D_{RH}$) obtained by adding the spacing $D_{RH}$ to the horizontal antenna aperture length $D_Z$ of the third antenna group (Rx #1, Rx #2, and Rx #3), and the horizontal position of the transmitting antenna Tx #3, which is the second antenna, is a position that is at a spacing $D_{T2H}$=$D_{RH}$ inward in a horizontal direction from the horizontal position of a transmitting antenna at one end of the first antenna group (Tx #1 or Tx #2. In the example shown in FIG. 10A, Tx #2).

Further, in FIG. 10A, the vertical position of the second antenna (Tx #3) is a position that is at a spacing $D_{TV}$ downward from the vertical position of the first antenna group (Tx #1 and Tx #2). Meanwhile, in FIG. 10A, the vertical position of the fourth antenna (Rx #4) is a position that is at a spacing $D_{RV}$ upward from the vertical position of the third antenna group (Rx #1, Rx #2, and Rx #3). That is, the direction in which the vertical position of the second antenna is placed with respect to the vertical position of the first antenna group and the direction in which the vertical position of the fourth antenna is placed with respect to the vertical position of the third antenna group are different.

For example, in FIG. 10A, $D_{TV}$=$D_{RV}$. Assume here that, in FIG. 10A, an upward direction and a downward direction from the vertical position of the first antenna group (Tx #1 and Tx #2) are a "positive direction" and a negative direction", respectively. Similarly, assume that, in FIG. 10A, an upward direction and a downward direction from the vertical position of the third antenna group (Rx #1 to Rx #3) are a "positive direction" and a negative direction", respectively. In this case, in FIG. 10A, the second antenna (Tx #3) is placed in a position that is at a spacing $D_{TV}$ in the negative direction from the first antenna group, and the fourth antenna (Rx #4) is placed in a position that is at a spacing $D_{RV}$ in the positive direction from the third antenna group. That is, even if $D_{TV}$=$D_{RV}$, the spacing $D_{TV}$ and the spacing $D_{RV}$ are deemed as different spacings, as the positive direction and the negative direction are different.

Further, without being limited to $D_{TV}$=$D_{RV}$, the spacing $D_{TV}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of the second antenna, and the vertical position of the fourth antenna are different positions (i.e. do not overlap).

In this case, too, as in FIG. 8B, the virtual receiving array shown in FIG. 10B is configured to include an HLA composed of six virtual antennas (VA #1, VA #4, VA #7, VA #2, VA #5, and VA #8 surrounded by dashed lines shown in FIG. 10B) arranged in a straight line at interelement spacings $D_{RH}$ (regular spacings) in a horizontal direction. Further, as in FIG. 8B, the virtual receiving array shown in FIG. 10B is configured to include a VLA composed of three virtual antennas (VA #2, VA #10, and VA #6 surrounded by dashed lines shown in FIG. 10B) arranged in a straight line in a vertical direction.

It should be noted that FIG. 10B shows VA #12 in parentheses, as VA #8 and VA #12 are placed in an identical position. In the after-mentioned other antenna arrangements, too, virtual antennas placed overlappingly in an identical position in an arrangement of a virtual receiving array are shown in parentheses.

Further, when $D_{TV}$=$D_{RV}$, the VLA shown in FIG. 10B has an arrangement of virtual antennas lined up in a straight line in a vertical direction at regular spacings ($D_{RV}$). Further, when 2$D_{TV}$=$D_{RV}$, the VLA has an arrangement of virtual antennas lined up in a straight line in a vertical direction at irregular spacings (not illustrated).

Even such an antenna arrangement according to Variation 1 of Embodiment 1 can bring about effects which are similar to those of Embodiment 1.

Variation 2 of Embodiment 1

FIG. 8B has described a configuration including an HLA composed of six virtual antennas (VA #1, VA #4, VA #7, VA #2, VA #5, and VA #8) arranged in a straight line at interelement regular spacings ($D_{RH}$) in a horizontal direction. However, the HLA is not limited to a case of being composed of virtual antennas placed at regular spacings but may be composed of virtual antennas placed at irregular spacings.

Figure 11A:
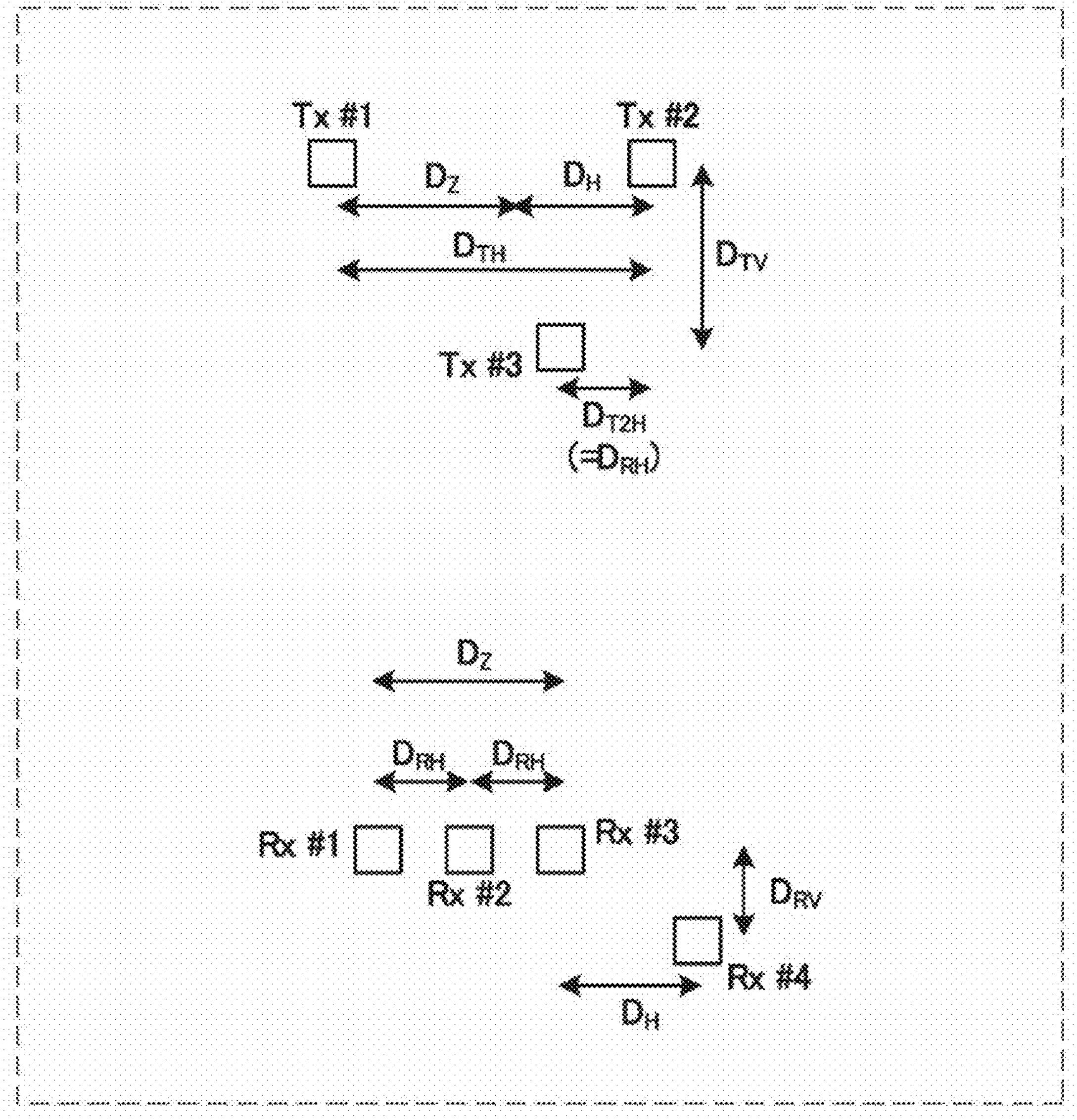
FIG. 11A is a diagram showing an example arrangement of transmitting and receiving antennas according to Variation 2 of Embodiment 1.
Figure 11B:
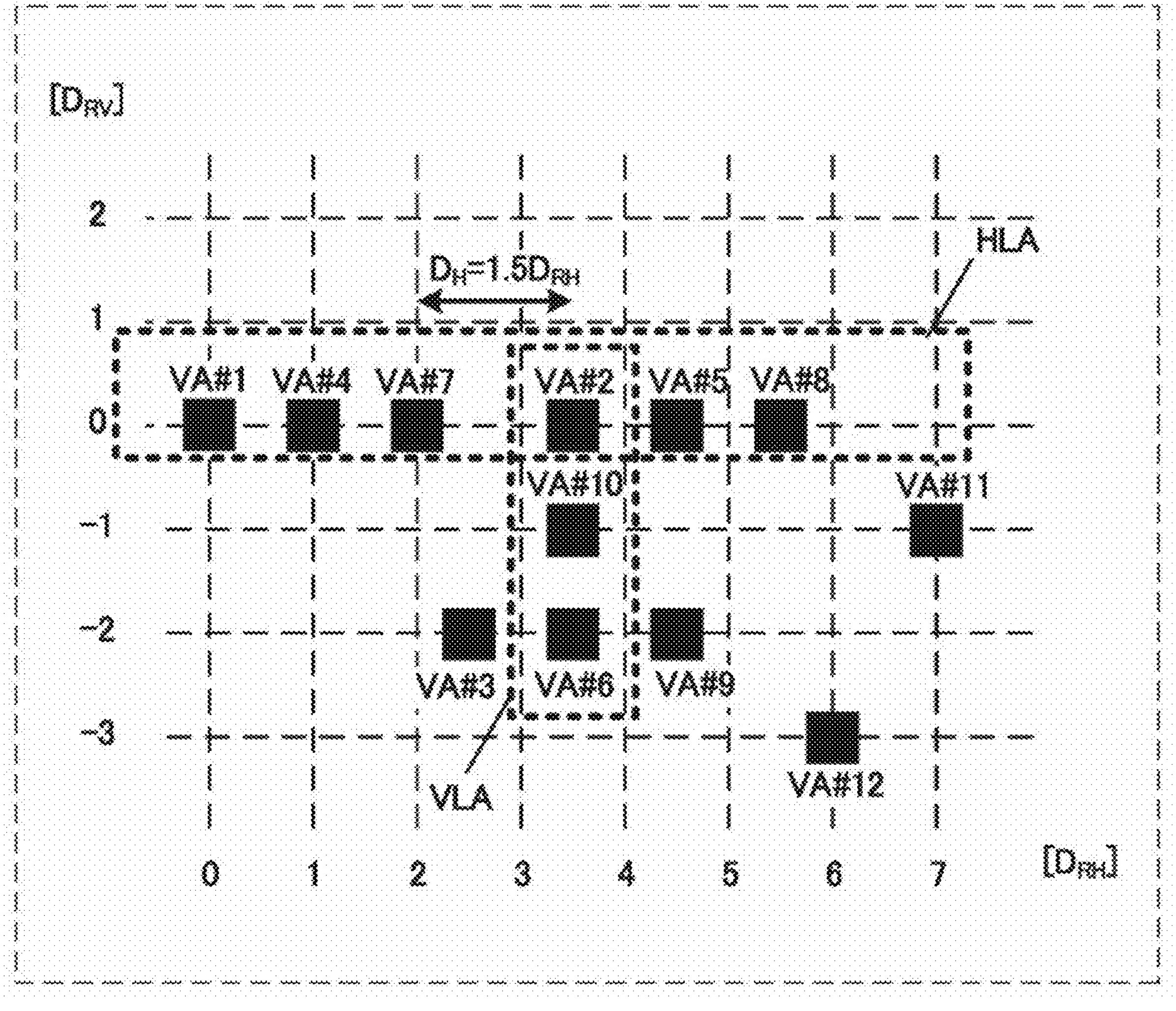
FIG. 11B is a diagram showing another example arrangement of a virtual receiving array according to Variation 2 of Embodiment 1.

FIG. 11A shows an example arrangement of transmitting antennas 106 and receiving antennas 202 according to Variation 2 of Embodiment 1. Further, FIG. 11B shows an arrangement of a virtual receiving array that is obtained by the antenna arrangement shown in FIG. 11A.

As with FIG. 8A, FIG. 11A assumes that the number Nt of transmitting antennas 106 is 3 and the number Na of receiving antennas 202 is 4. Further, the three transmitting antennas 106 are denoted by Tx #1 to Tx #3, and the four receiving antennas 202 are denoted by Rx #1 to Rx #4.

In FIG. 11A, as in FIG. 8A, the horizontal interelement spacings $D_{RH}$ between the receiving antennas Rx #1 to Rx #3 of the third antenna group are constant (regular spacings). Meanwhile, FIG. 11A assumes that the horizontal position of the receiving antenna Rx #4, which is the fourth antenna, is a position that is at a spacing $D_H$ outward (rightward) in a horizontal direction from the horizontal position of a receiving antenna at one end of the third antenna group (the leftmost antenna Rx #1 or the rightmost antenna Rx #3. In the example shown in FIG. 11A, the rightmost antenna Rx #3). Note here that the interelement spacing $D_H$ is a different value from the spacing $D_{RH}$.

Further, in FIG. 11A, as in FIG. 8A, the horizontal position of the second antenna Tx #3, which is the second antenna, is a position displaced by a spacing $D_{T2H}$ inward in a horizontal direction within the range of horizontal aperture of the first antenna group (in FIG. 11A, within the range inside the horizontal positions of the end-point antennas Tx #1 and Tx #2) from the horizontal position of either antenna of the first antenna group (Tx #1 and Tx #2).

For example, as shown in FIG. 11A, in a case where the horizontal position of the fourth antenna (Rx #4) is on the outer side (right side) of the horizontal position of the rightmost antenna Rx #3 of the third antenna group, the interelement spacing between antennas in the third antenna group based on the leftmost antenna Rx #1 of the third antenna group (in the case of FIG. 11A, the spacing $D_{RH}$ between Rx #1 and Rx #2 or the spacing 2$D_{RH}$ between Rx #1 and Rx #3) may be used as the spacing $D_{T2H}$ from the horizontal position of the rightmost antenna Tx #2 of the first antenna group.

Further, in a case (not illustrated) where the horizontal position of the fourth antenna (Rx #4) is on the outer side (left side) of the horizontal position of the leftmost antenna Rx #1 of the third antenna group, the interelement spacing between antennas in the third antenna group based on the rightmost antenna Rx #3 of the third antenna group (for example, in the case of the third antenna group shown in FIG. 11A, the spacing $D_{RH}$ between Rx #3 and Rx #2 or the spacing $2D_{RH}$ between Rx #3 and Rx #1) may be used as the spacing $D_{T2H}$ from the horizontal position of the leftmost antenna Tx #1 of the first antenna group.

Further, in FIG. 11A, the horizontal interelement spacing $D_{TH}$ between the transmitting antennas Tx #1 and Tx #2 of the first antenna group is a spacing ($D_Z$+$D_H$) obtained by adding the horizontal spacing ($D_H$) between the third antenna group and the fourth antenna to the horizontal antenna aperture length $D_Z$ of the third antenna group (Rx #1, Rx #2, and Rx #3).

Further, in FIG. 11A, the vertical position of the fourth antenna (Tx #4) is a position that is at a spacing $D_{RV}$ from the vertical position of the third antenna group (Rx #1 to Rx #3), and the vertical position of the second antenna (Tx #3) is a position that is at a spacing $D_{TV}$ from the vertical position of the first antenna group (Tx #1 and Tx #2). Note here that, as mentioned above, the spacing $D_{TV}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of the second antenna, and the vertical position of the fourth antenna are different positions (i.e. do not overlap).

FIG. 11B shows, as an example, an arrangement of a virtual receiving array in which $D_H$=1.5$D_{RH}$ and $D_{TV}$=2$D_{RV}$ in FIG. 11A. It should be noted that the relationship between $D_H$ and $D_{RH}$ and the relationship between $D_{TV}$ and $D_{RV}$ are not limited to these.

In the virtual receiving array shown in FIG. 11B, the HLA has an arrangement of six virtual antennas (VA #1, VA #4, VA #7, VA #2, VA #5, and VA #8 surrounded by dashed lines shown in FIG. 11B) in a straight line at irregular spacings ($D_H$ and $D_{RH}$) in a horizontal direction. Further, as in FIG. 8B, the VLA shown in FIG. 11B has an arrangement of three virtual antennas (VA #2, VA #10, and VA #6 surrounded by dashed lines shown in FIG. 11B) arranged in a straight line at regular spacings ($D_{RV}$) in a vertical direction.

Note here that in a case where $D_H$=$D_{RH}$, the HLA has its virtual antennas lined up at regular spacings ($D_{RH}$) as in FIG. 8B. This makes it possible to reduce the peak side lobe ratio.

Meanwhile, when $D_H$>$D_{RH}$, the HLA has an arrangement of virtual antennas lined up in a straight line at irregular spacings as shown in FIG. 11B, so that the HLA has an enlarged aperture length. For example, the HLA has an enlarged aperture length of 5.5$D_{RH}$ in FIG. 11B, whereas the HLA has an aperture length of 5$D_{RH}$ in FIG. 8B. This brings about a narrower horizontal main lobe and an effect of improving horizontal angular separation performance. It should be noted that enlarging the spacing $D_H$ brings about a trade-off between a narrower main lobe and an increased side lobe level.

Variation 3 of Embodiment 1

Although FIGS. 8A, 10A, and 11A have described cases where the horizontal interelement spacings between the receiving antennas (Rx #1, Rx #2, and Rx #3) of the third antenna group are constant ($D_{RH}$), the horizontal interelement spacings between the receiving antennas (Rx #1, Rx #2, and Rx #3) of the third antenna group may be irregular spacings. In this case, the HLA of the virtual receiving array is composed of virtual antennas placed at irregular spacings as in the case of Variation 2 of Embodiment 1.

Figure 12A:
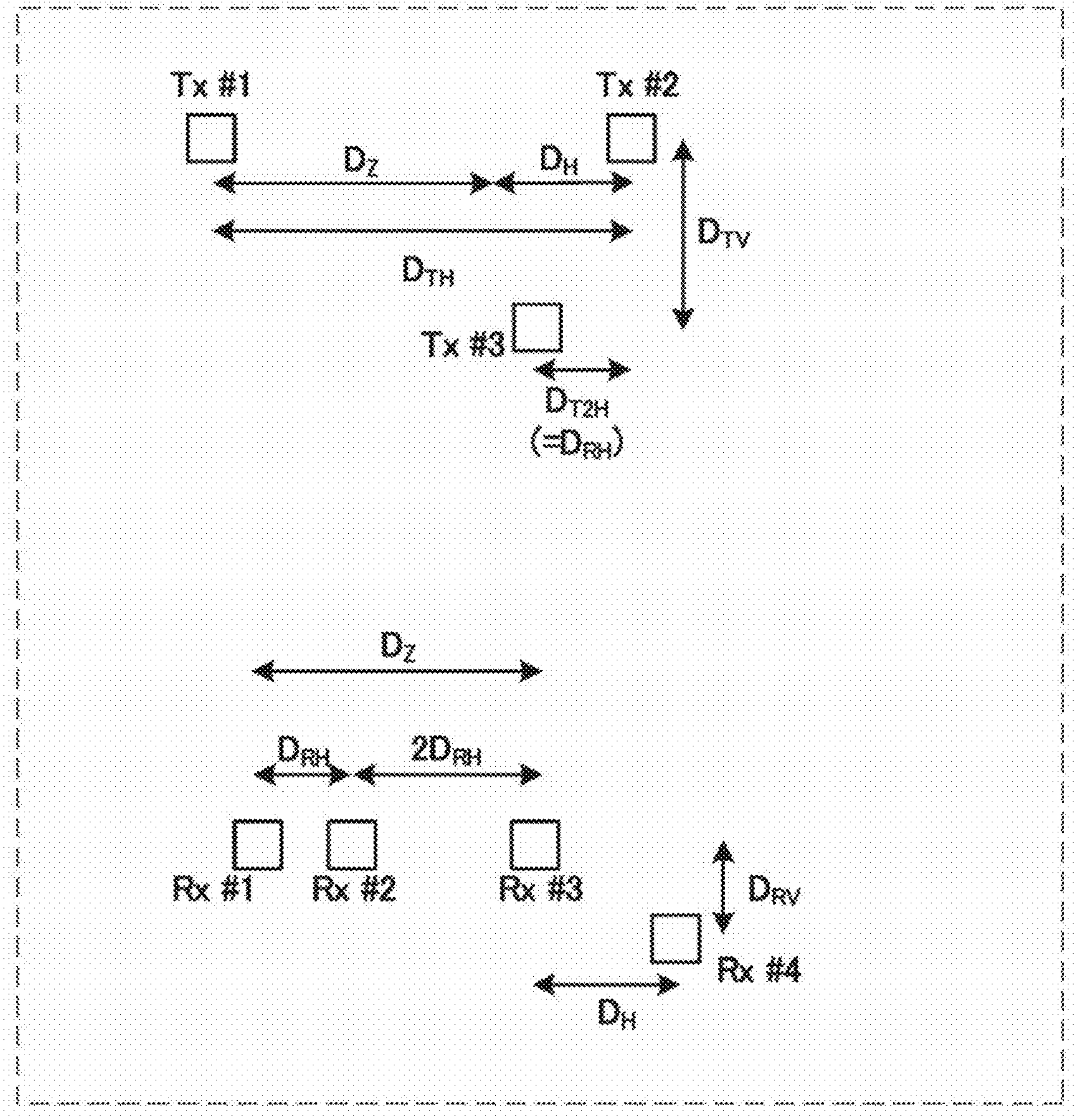
FIG. 12A is a diagram showing an example arrangement of transmitting and receiving antennas according to Variation 3 of Embodiment 1.
Figure 12B:
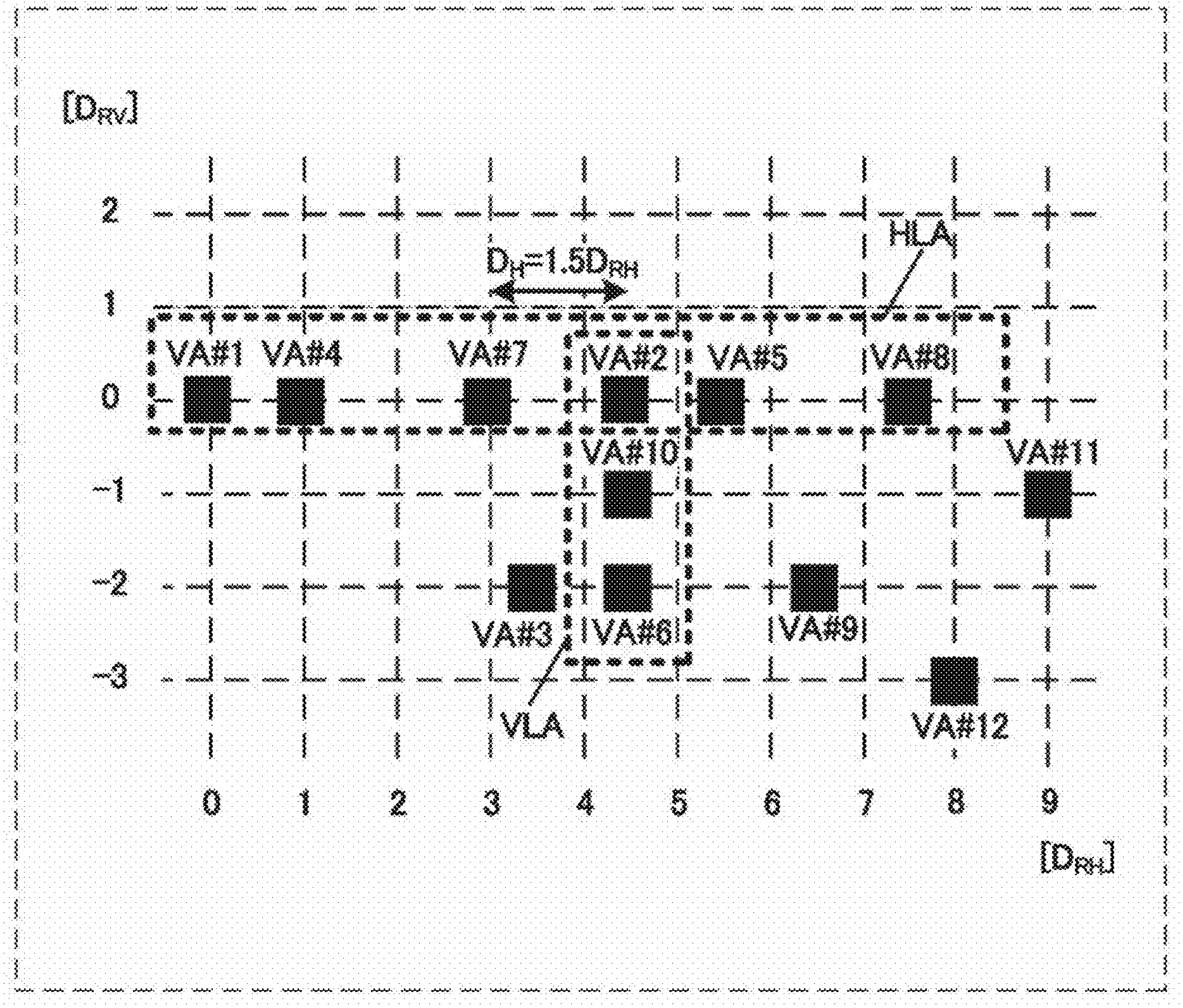
FIG. 12B is a diagram showing another example arrangement of a virtual receiving array according to Variation 3 of Embodiment 1.

FIG. 12A shows an example arrangement of transmitting antennas 106 and receiving antennas 202 according to Variation 3 of Embodiment 1. Further, FIG. 12B shows an arrangement of a virtual receiving array that is obtained by the antenna arrangement shown in FIG. 12A.

As with FIG. 8A, FIG. 12A assumes that the number Nt of transmitting antennas 106 is 3 and the number Na of receiving antennas 202 is 4. Further, the three transmitting antennas 106 are denoted by Tx #1 to Tx #3, and the four receiving antennas 202 are denoted by Rx #1 to Rx #4.

FIG. 12A assumes that $D_{RH}$ is the smallest value of the horizontal interelement spacings between the receiving antennas Rx #1 to Rx #3 of the third antenna group. In FIG. 12A, $D_{RH}$ is the interelement spacing between the receiving antennas Rx #1 and Rx #2, and 2$D_{RH}$ is the interelement spacing between the receiving antennas Rx #2 and Rx #3. That is, the interelement spacings between the receiving antennas Rx #1 to Rx #3 of the third antenna group are different. It should be noted that the interelement spacings in the third antenna group are not limited to these.

Further, FIG. 12A assumes that the horizontal position of the receiving antenna Rx #4, which is the fourth antenna, is a position that is at a spacing $D_H$ outward (rightward) in a horizontal direction from the horizontal position of a receiving antenna at one end of the third antenna group (the leftmost antenna Rx #1 or the rightmost antenna Rx #3. In the example shown in FIG. 12A, the rightmost antenna Rx #3). Note here that the interelement spacing $D_H$ may be the same or a different value as or from the spacings ($D_{RH}$ and 2$D_{RH}$) between the receiving antennas (Rx #1 to Rx #3) of the third antenna group.

Further, in FIG. 12A, the horizontal interelement spacing $D_{TH}$ between the transmitting antennas Tx #1 and Tx #2 of the first antenna group is a spacing ($D_Z$+$D_H$) obtained by adding the horizontal spacing ($D_H$) between the third antenna group and the fourth antenna to the horizontal antenna aperture length $D_Z$ of the third antenna group (Rx #1, Rx #2, and Rx #3).

Further, in FIG. 12A, as in FIG. 8A, the horizontal position of the second antenna Tx #3, which is the second antenna, is a position displaced by a spacing $D_{T2H}$ inward in a horizontal direction within the range of horizontal aperture of the first antenna group (in FIG. 12A, within the range inside the horizontal positions of the end-point antennas Tx #1 and Tx #2) from the horizontal position of either antenna of the first antenna group (Tx #1 and Tx #2).

For example, as shown in FIG. 12A, in a case where the horizontal position of the fourth antenna (Rx #4) is on the outer side (right side) of the horizontal position of the rightmost antenna Rx #3 of the third antenna group, the interelement spacing between antennas in the third antenna group based on the leftmost antenna Rx #1 of the third antenna group (in the case of FIG. 12A, the spacing $D_{RH}$ between Rx #1 and Rx #2 or the spacing 3$D_{RH}$ between Rx #1 and Rx #3) may be used as the spacing $D_{T2H}$ from the horizontal position of the rightmost antenna Tx #2 of the first antenna group.

Further, in a case (not illustrated) where the horizontal position of the fourth antenna (Rx #4) is on the outer side (left side) of the horizontal position of the leftmost antenna Rx #1 of the third antenna group, the interelement spacing between antennas in the third antenna group based on the rightmost antenna Rx #3 of the third antenna group (for example, in the case of the third antenna group shown in FIG. 12A, the spacing $2D_{RH}$ between Rx #3 and Rx #2 or the spacing $3D_{RH}$ between Rx #3 and Rx #1) may be used as the spacing $D_{T2H}$ from the horizontal position of the leftmost antenna Tx #1 of the first antenna group.

Further, in FIG. 12A, the vertical position of the fourth antenna (Tx #4) is a position that is at a spacing $D_{RV}$ from the vertical position of the third antenna group (Rx #1 to Rx #3), and the vertical position of the second antenna (Tx #3) is a position that is at a spacing $D_{TV}$ from the vertical position of the first antenna group (Tx #1 and Tx #2). Note here that, as mentioned above, the spacing $D_{TV}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of the second antenna, and the vertical position of the fourth antenna are different positions (i.e. do not overlap).

FIG. 12B shows, as an example, an arrangement of a virtual receiving array in which $D_H$=1.5$D_{RH}$ and $D_{TV}$=2$D_{RV}$ in FIG. 11A. It should be noted that the relationship between $D_H$ and $D_{RH}$ or the relationship between $D_{TV}$ and $D_{RV}$ are not limited to these.

In the virtual receiving array shown in FIG. 12B, the HLA has an arrangement of six virtual antennas (VA #1, VA #4, VA #7, VA #2, VA #5, and VA #8 surrounded by dashed lines shown in FIG. 12B) in a straight line at irregular spacings ($D_H$, $D_{RH}$, and $2D_{RH}$) in a horizontal direction. Further, as in FIG. 8B, the VLA shown in FIG. 12B has an arrangement of three virtual antennas (VA #2, VA #10, and VA #6 surrounded by dashed lines shown in FIG. 12B) arranged in a straight line at regular spacings ($D_{RV}$) in a vertical direction.

The HLA shown in FIG. 12B has an arrangement of virtual antennas lined up in a straight line at irregular spacings, so that the HLA has an enlarged aperture length. For example, the HLA has an enlarged aperture length of 7.5$D_{RH}$ in FIG. 12B, whereas the HLA has an aperture length of 5$D_{RH}$ in FIG. 8B. This brings about a narrower horizontal main lobe and an effect of improving horizontal angular separation performance. It should be noted that enlarging a spacing (in FIG. 12A, $2D_H$) in the third antenna group brings about a trade-off between a narrower main lobe and an increased side lobe level.

The foregoing has described Variations 1 to 3 of Embodiment 1.

It should be noted that even in a case where the transmitting antenna arrangement shown in any one of FIGS. 8A, 9A, 10A, 11A, and 12A is used as a receiving antenna arrangement and the receiving antenna arrangement shown in any one of FIGS. 8A, 9A, 10A, 11A, and 12A is used as a transmitting antenna arrangement, it is possible to achieve a configuration which is similar to that of the arrangement of the virtual receiving array shown in any one of FIGS. 8B, 9B, 10B, 11B, and 12B and bring about effects which are similar to those of the arrangement of the virtual receiving array shown in any one of FIGS. 8B, 9B, 10B, 11B, and 12B. The same applies to the after-mentioned other antenna arrangements. In this case, the number Nt of transmitting antennas is 3 or larger, and the number Na of receiving antennas is 3 or larger.

Further, although Embodiment 1 has described a case where transmitting antennas and receiving antennas are arranged so as not to overlap in a vertical direction, transmitting antennas and receiving antennas may be arranged so as not to overlap in a direction other than a vertical direction (e.g. in horizontal direction). For example, in FIGS. 8A, 10A, 11A, and 12A, the arrangement of the transmitting array antenna and the receiving array antenna may be rotated 90 degrees or −90 degrees. In this case, the arrangement of the antennas that constitute the transmitting array antenna and the receiving array antenna is an arrangement in which the antennas do not overlap in a horizontal direction. As a result, the horizontal size of the antennas that constitute the transmitting array antenna and the receiving array antenna can be an arbitrary size. Further, in this case, with the limited number Nt of transmitting antennas being 3 and the limited number Na of receiving antennas being 3, the virtual receiving array allows as many virtual antennas as (Number of Transmitting Antennas of Second Antenna+Number of Receiving Antennas of Fourth Antenna+1) to be lined up in a vertical direction and allows as many virtual antennas as the product of the number of transmitting antennas of the first antenna group and the number of receiving antennas of the third antenna group to be lined up in a straight line in a horizontal direction, thus making it possible to maximally enlarge the aperture lengths of the virtual receiving array.

Embodiment 2

A rider apparatus according to Embodiment 2 is described with continued reference to FIG. 4, as it shares a common basic configuration with the radar apparatus 10 according to Embodiment 1.

Embodiment 1 has described a case where a transmitting array antenna is constituted by a first antenna group and a second antenna composed of a single transmitting antenna 106. On the other hand, Embodiment 2 describes a case where a transmitting array antenna is constituted by a first antenna group and a "second antenna group" including a plurality of transmitting antennas 106.

That is, in Embodiment 2, the Nt transmitting antennas 106 (transmitting array antenna) include a "first antenna group" including a plurality of transmitting antennas 106 that are identical in vertical position and different in horizontal position and a "second antenna" including a plurality of transmitting antennas 106 placed in positions different from the vertical and horizontal positions of the transmitting antennas 106 of the first antenna group.

Further, in Embodiment 2, the Na receiving antennas 202 (receiving array antenna) include a "third antenna group" including a plurality of receiving antennas 202 that are identical in vertical position and different in horizontal position and a "fourth antenna" that is a receiving antenna 202 placed in a position different from the vertical and horizontal positions of the receiving antennas 202 of the third antenna group.

The following describes example arrangements of transmitting and receiving antennas according to Embodiment 2.

Figure 13A:
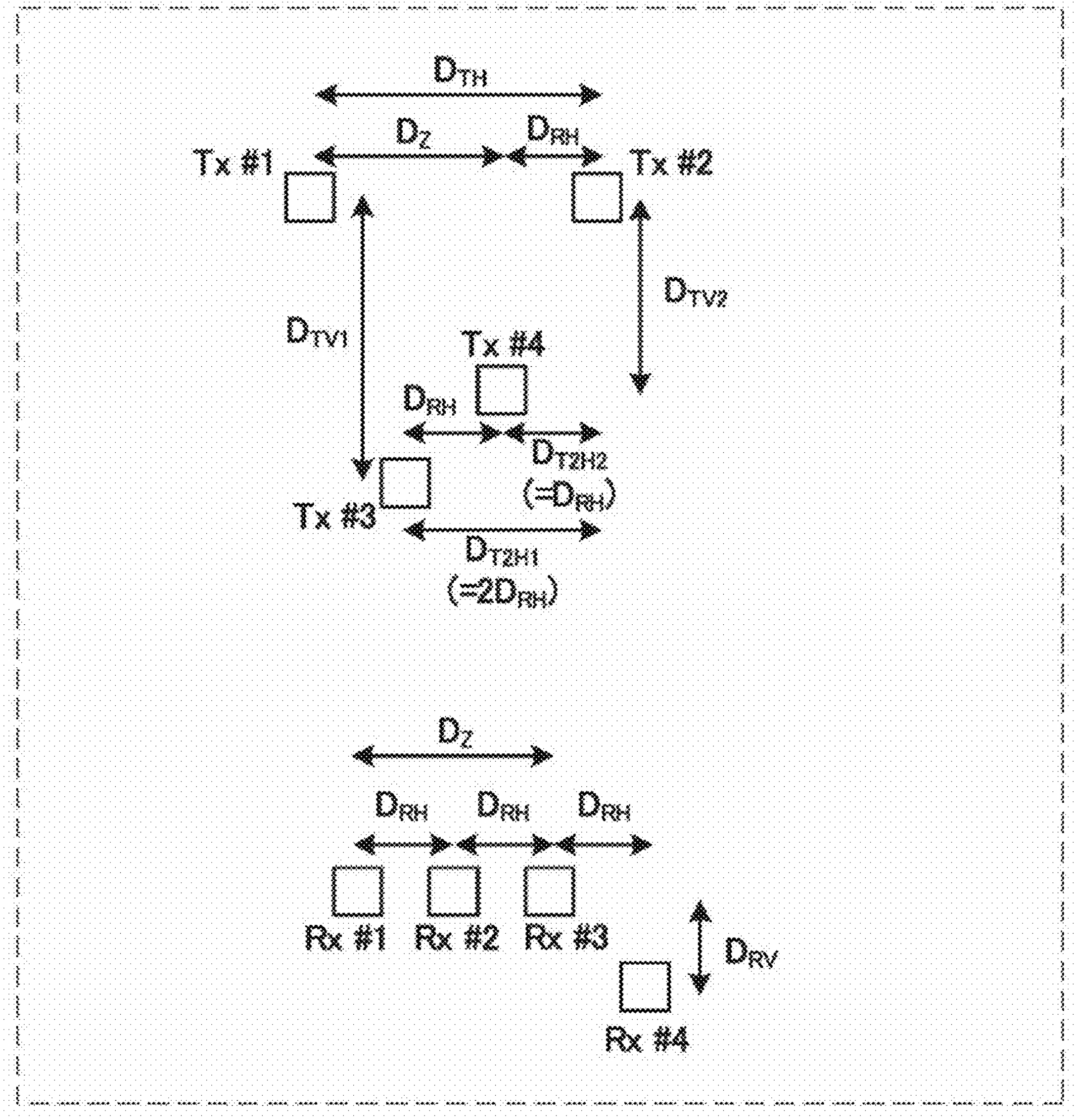
FIG. 13A is a diagram showing an example arrangement of transmitting and receiving antennas according to Embodiment 2.
Figure 13B:
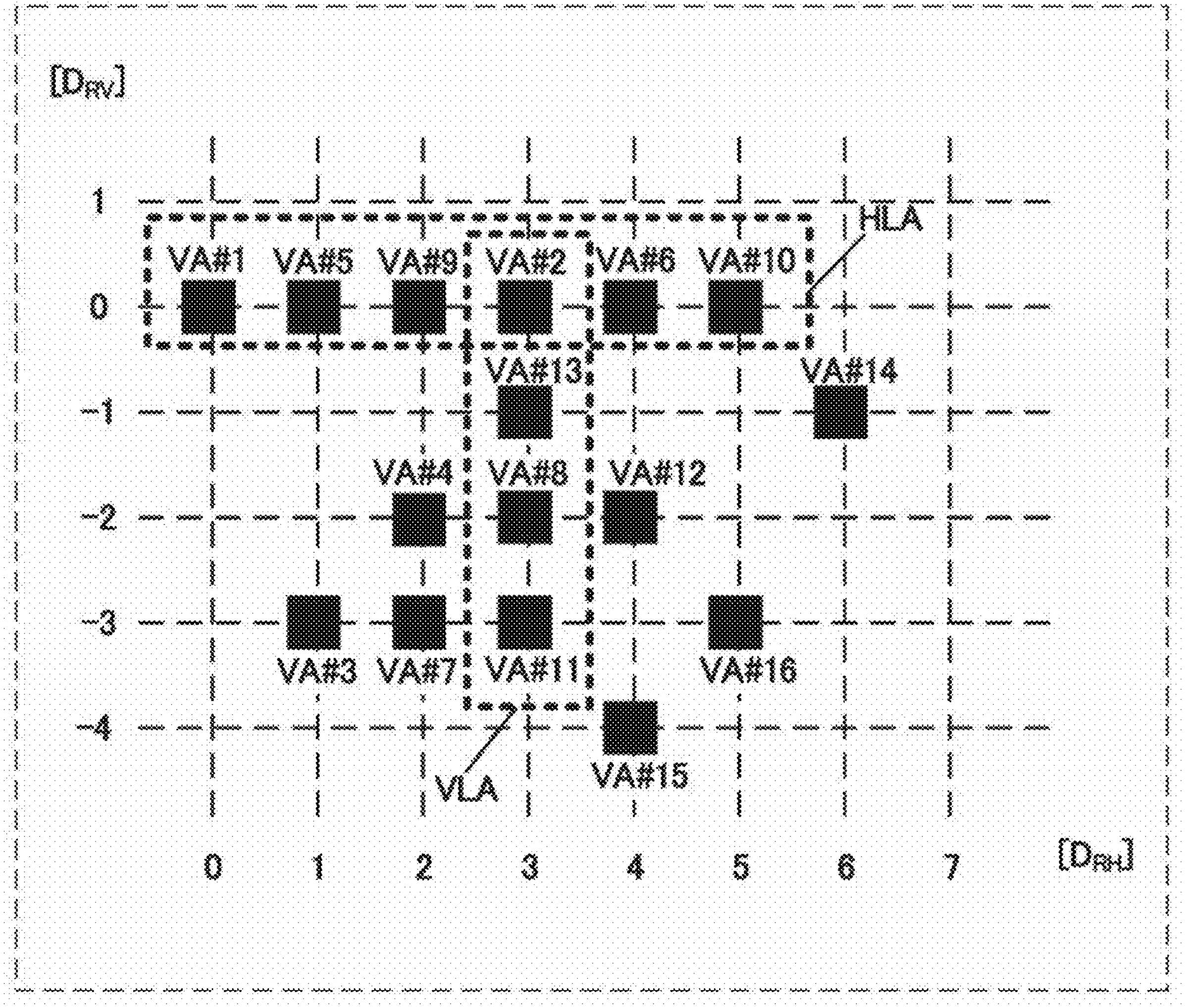
FIG. 13B is a diagram showing an example arrangement of a virtual receiving array according to Embodiment 2.

FIG. 13A shows an example arrangement of transmitting antennas 106 and receiving antennas 202. Further, FIG. 13B shows an arrangement of a virtual receiving array that is obtained by the antenna arrangement shown in FIG. 13A.

(1) Arrangement of Transmitting and Receiving Antennas

FIG. 13A assumes that the number Nt of transmitting antennas 106 is 4 and the number Na of receiving antennas 202 is 4. Further, the three transmitting antennas 106 are denoted by Tx #1 to Tx #4, and the four receiving antennas 202 are denoted by Rx #1 to Rx #4.

In FIG. 13A, the receiving antennas Rx #1 to Rx #3 constitute a third antenna group of receiving antennas that are identical in vertical position and different in horizontal position. Specifically, in FIG. 13A, the horizontal interelement spacings $D_{RH}$ between the receiving antennas Rx #1 to Rx #3 of the third antenna group are constant (regular spacings).

Further, in FIG. 13A, the receiving antenna Rx #4 is a fourth antenna placed in a position different from both the horizontal and vertical positions in which the third antenna group is placed. Specifically, in FIG. 13A, the horizontal position of the receiving antenna Rx #4, which is the fourth antenna, is a position that is at a spacing $D_{RH}$ outward (rightward) in a horizontal direction from the horizontal position of a receiving antenna at one end of the third antenna group (the leftmost antenna Rx #1 or the rightmost antenna Rx #3. In the example shown in FIG. 13A, the rightmost antenna Rx #3).

Further, in FIG. 13A, the vertical position of the fourth antenna (Rx #4) is a position that is at a spacing $D_{RV}$ from the vertical position of the third antenna group (Rx #1 to Rx #3).

Meanwhile, in FIG. 13A, the transmitting antennas Tx #1 and Tx #2 constitute a first antenna group of transmitting antennas that are identical in vertical position and different in horizontal position. Further, in FIG. 13A, the transmitting antennas Tx #3 and Tx #4 constitute a second antenna group placed in a position different from both the horizontal and vertical positions in which the first antenna group is placed.

Specifically, in FIG. 13A, the horizontal interelement spacing $D_{TH}$ between the transmitting antennas Tx #1 and Tx #2 of the first antenna group is a spacing ($D_Z$+$D_{RH}$) obtained by adding the spacing $D_{RH}$ to the horizontal antenna aperture length $D_Z$ of the third antenna group (Rx #1, Rx #2, and Rx #3). For example, in the interelement spacing $D_{TH}$ of the first antenna group, the spacing $D_{RH}$ that is added to the antenna aperture length $D_Z$ is equal to the aforementioned horizontal spacing (in FIG. 13A, $D_{RH}$) between the third antenna group and the fourth antenna.

Further, in FIG. 13A, the horizontal positions of the transmitting antennas Tx #3 and Tx #4 of the second antenna group are positions displaced by spacings $D_{T2H1}$ and $D_{T2H2}$, respectively, inward in a horizontal direction within the range of horizontal aperture of the first antenna group (in FIG. 13A, within the range inside the horizontal positions of the end-point antennas Tx #1 and Tx #2) from the horizontal position of either antenna of the first antenna group (Tx #1 and Tx #2).

For example, as shown in FIG. 13A, in a case where the horizontal position of the fourth antenna (Rx #4) is on the outer side (right side) of the horizontal position of the rightmost antenna Rx #3 of the third antenna group, the interelement spacing between antennas in the third antenna group based on the leftmost antenna Rx #1 of the third antenna group (in the case of FIG. 13A, the spacing $D_{RH}$ between Rx #1 and Rx #2 or the spacing $2D_{RH}$ between Rx #1 and Rx #3) may be used as the spacing $D_{T2H1}$ or $D_{T2H2}$ from the horizontal position of the rightmost antenna Tx #2 of the first antenna group.

Further, in a case (not illustrated) where the horizontal position of the fourth antenna (Rx #4) is on the outer side (left side) of the horizontal position of the leftmost antenna Rx #1 of the third antenna group, the interelement spacing between antennas in the third antenna group based on the rightmost antenna Rx #3 of the third antenna group (for example, in the case of the third antenna group shown in FIG. 13A, the spacing $D_{RH}$ between Rx #3 and Rx #2 or the spacing $2D_{RH}$ between Rx #3 and Rx #1) may be used as the spacing $D_{T2H1}$ or $D_{T2H2}$ from the horizontal position of the leftmost antenna Tx #1 of the first antenna group.

That is, the horizontal interelement spacing (in FIG. 13A, $D_{RH}$ or $2D_{RH}$) between a receiving antenna (in FIG. 13A, Rx #1) of the third antenna group (in FIG. 13A, Rx #1 to Rx #3) located at an end on a side opposite (second side; in FIG. 13A, the left side) to a side (first side; in FIG. 13A, the right side) close to the position in which the fourth antenna (Rx #4) is placed and each of the other antennas (in FIG. 13A, Rx #2 and Rx #3) of the third antenna group is identical to the horizontal interelement spacing (in FIG. 13A, $2D_{RH}$ or $D_{RH}$) between the transmitting antenna Tx #2, of the adjacent transmitting antennas Tx #1 and Tx #2 of the first antenna group, that is located on the same side (in FIG. 13A, the right side) as the first side and each of the transmitting antennas (Tx #3 and Tx #4) of the second antenna group.

In other words, the horizontal interelement spacing (in FIG. 13A, $D_{T2H1}$=$2D_{RH}$ Or $D_{T2H2}$=$D_{RH}$) between a transmitting antenna (in FIG. 13A, the rightmost antenna Tx #2), of the transmitting antennas (in FIG. 13A, Tx #1 and Tx #2) of the first antenna group, that is located on a first side (in FIG. 13A, the right side) and each of the transmitting antennas (Tx #3 and Tx #4) of the second antenna group is identical to the interelement spacing (in FIG. 13A, $D_{RH}$ or $2D_{RH}$) between a receiving antenna (in FIG. 13A, the leftmost antenna Rx #1) of the receiving array antenna located at an end on a side opposite (in FIG. 13A, the left side) to the first side of the first antenna group and each of the other receiving antennas (in FIG. 13A, Rx #2 and Rx #3).

Further, in FIG. 13A, the vertical positions of the transmitting antennas Tx #3 and Tx #4 of the second antenna group are positions that are at spacings $D_{TV1}$ and $D_{TV2}$, respectively, from the vertical position of the first antenna group (Tx #1 and Tx #2).

Note here that the spacings $D_{TV1}$ and $D_{TV2}$ are spacings that are different from the vertical spacing $D_{RV}$ between the third antenna group and the fourth antenna. In other words, the spacings $D_{TV1}$ and $D_{TV2}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of each of the transmitting antennas (Tx #3 and Tx #4) of the second antenna group, and the vertical position of the fourth antenna are different positions (i.e. do not overlap).

As shown in FIG. 13A, the arrangement of the transmitting antennas Tx #1 to Tx #4 that constitute the transmitting array antenna is an arrangement in which the antennas do not overlap in a vertical direction. For this reason, the vertical size of the transmitting antennas Tx #1 to Tx #4 that constitute the transmitting array antenna can be an arbitrary size. Similarly, as shown in FIG. 13A, the arrangement of the receiving antennas Rx #1 to Rx #4 that constitute the receiving array antenna is an arrangement in which the antennas do not overlap in a vertical direction. For this reason, the vertical size of the receiving antennas Rx #1 to Rx #4 that constitute the receiving array antenna can be an arbitrary size.

(2) Arrangement of Virtual Receiving Array

The arrangement of the virtual receiving array (virtual antennas VA #1 to VA #16) shown in FIG. 13B, which is constituted by the antenna arrangement shown in FIG. 13A described above, has the following characteristics.

The virtual receiving array shown in FIG. 13B is configured to include a horizontal virtual linear array antenna HLA composed of six virtual antennas (VA #1, VA #5, VA #9, VA

#2, VA #6, and VA #10 surrounded by dashed lines shown in FIG. 13B) arranged in a straight line at interelement spacings $D_{RH}$ (regular spacings) in a horizontal direction. The HLA shown in FIG. 13B is obtained from a horizontal positional relationship between the two transmitting antennas Tx #1 and TX #2 of the first antenna group placed at an interelement spacing $D_{TH}$ in a horizontal direction in FIG. 13A and the three receiving antennas Rx #1, Rx #2, and Rx #3 of the third antenna group placed at interelement spacings $D_{RH}$ in a horizontal direction in FIG. 13A. Specifically, the number of virtual antennas that are lined up in a straight line in a horizontal direction has such a relationship as to be the product (in FIG. 13B, 6) of the number of antennas (in FIG. 13A, 2) of the first antenna group and the number of antennas (in FIG. 13A, 3) of the third antenna group.

Further, in FIG. 13A, the interelement spacings $D_{RH}$ between the plurality of receiving antennas (Rx #1 to Rx #3) of the third antenna group are equal. Further, the interelement spacings ($D_{RH}$) between the plurality of receiving antennas of the third antenna group and the spacing ($D_{RH}$) between the third antenna group and the fourth antenna (Rx #4) in a horizontal direction are equal. This causes the six virtual antennas to be placed at regular spacings in a straight line in a horizontal direction in the HLA of the virtual receiving array shown in FIG. 13B.

Further, the virtual receiving array shown in FIG. 13B is configured to include a vertical virtual linear array antenna VLA composed of four virtual antennas (VA #2, VA #13, VA #8, and VA #11 surrounded by dashed lines shown in FIG. 13B) arranged in a straight line in a vertical direction. The number of virtual antennas that are lined up in a straight line in a vertical direction has such a relationship as to be "(Number of Antennas of Second Antenna Group)+ (Number of Antennas of Fourth Antenna)+1" (in FIG. 13B, 4).

The VLA has an arrangement of virtual antennas lined up in ascending order of $D_{TV1}$, $D_{TV2}$, and $D_{RV}$ from the vertical position of the first antenna group (Tx #1 and Tx #2). For example, in a case where $D_{TV1}>D_{TV2}>D_{RV}$, the interelement spacings between the virtual antennas within the VLA are $D_{RV}$, ($D_{TV2}-D_{RV}$), and ($D_{TV1}-D_{TV2}$). Further, in a case where $D_{TV2}>D_{TV1}>D_{RV}$, the interelement spacings between the virtual antennas within the VLA are $D_{RV}$, ($D_{TV1}-D_{RV}$), and ($D_{TV2}-D_{TV1}$).

Note here that when $D_{TV1}=2D_{RV}$ and $D_{TV2}=3D_{RV}$ or when $D_{TV1}=3D_{RV}$ and $D_{TV2}=2D_{RV}$, the VLA has an arrangement of virtual antennas lined up in a straight line in a vertical direction at regular spacings ($D_{RV}$). Further, when $D_{RV}=2D_{TV1}$ and $D_{TV2}=3D_{TV1}$, the VLA has an arrangement of virtual antennas lined up in a straight line in a vertical direction at regular spacings ($D_{TV1}$). Further, when $D_{RV}=2D_{TV2}$ and $D_{TV1}=3D_{TV2}$, the VLA has an arrangement of virtual antennas lined up in a straight line in a vertical direction at regular spacings ($D_{TV2}$).

FIG. 13B shows, as an example, an example where $D_{TV1}=3D_{RV}$ and $D_{TV1}=2D_{RV}$ (i.e. a case where $D_{TV1}>D_{TV2}>D_{RV}$). That is, in FIG. 13B, the VLA has an arrangement of VA #2, VA #13, VA #8, and VA #11 lined up in a straight line in a vertical direction at regular spacings ($D_{RV}$). This makes it possible to reduce a peak side lobe ratio in a vertical direction.

That is, in a case where it is assumed that the first antenna group and the third antenna group are identical in position in a vertical direction, the spacings between the first antenna group (Tx #1 and TX #2) (or the third antenna group (Rx #1 to Rx #3)), each of the transmitting antennas (Tx #3 and Tx #4) of the second antenna group, and the fourth antenna (Rx #4) may be equal spacings or unequal spacings.

For example, in a case where $D_{TV1}>D_{TV2}>D_{RV}$, placing the virtual antennas at interelement spacings $D_{RV}$, ($D_{TV2}-D_{RV}$)>$D_{RV}$, and ($D_{TV1}-D_{TV2}$)>$D_{RV}$ within the VLA causes the VLA to be an unequally-spaced array. Causing the VLA to be an unequally-spaced array allows the VLA to have an enlarged aperture length. This brings about a narrower main lobe and an effect of improving vertical angular separation performance.

Note here that, as shown in Eq. (4), Eq. (7), and FIG. 13B, with the position (vertical position, horizontal position) of VA #1 as the reference position (0, 0), the virtual antenna VA #2 of the VLA is obtained from a relationship between the receiving antenna Rx #1 and the transmitting antenna Tx #2, the virtual antenna VA #8 of the VLA is obtained from a relationship between the receiving antenna Rx #2 and the transmitting antenna Tx #4, the virtual antenna VA #11 of the VLA is obtained from a relationship between the receiving antenna Rx #3 and the transmitting antenna Tx #3, and the virtual antenna VA #13 of the VLA is obtained from a relationship between the receiving antenna Rx #4 and the transmitting antenna Tx #1.

At this point in time, as described in Embodiment 1, by making the interelement spacing $D_{TH}$ of the first antenna group equal to the sum of the aperture length $D_Z$ of the third antenna group and the spacing $D_{RH}$ between the third antenna group and the fourth antenna in a horizontal direction, i.e. the horizontal aperture length of the receiving array antenna, the virtual antennas VA #2 and VA #13 of the VLA are placed in an identical horizontal position and lined up side by side in a vertical direction.

Further, the interelement spacing $D_{T2H1}$ between the right end (in FIG. 13A, the rightmost antenna Tx #2) of the first antenna group and the transmitting antenna Tx #3 of the second antenna group in a horizontal direction is equal to the interelement spacing $2D_{RH}$ from the leftmost antenna Rx #1 of the third antenna group to another receiving antenna Rx #3 of the third antenna group. As a result, the horizontal position of the virtual antenna VA #2 obtained from the relationship between Rx #1 and Tx #2 and the horizontal position of the virtual antenna VA #11 obtained from the relationship between Rx #2 and Tx #3 become identical (in FIG. 13B, a position that is at a spacing $3D_{RH}$ from the reference position). Similarly, the interelement spacing $D_{T2H2}$ between the right end (in FIG. 13A, the rightmost antenna Tx #2) of the first antenna group and the transmitting antenna Tx #4 of the second antenna group in a horizontal direction is equal to the interelement spacing $D_{RH}$ from the leftmost antenna Rx #1 of the third antenna group to another receiving antenna Rx #2 of the third antenna group. As a result, the horizontal position of the virtual antenna VA #2 obtained from the relationship between Rx #1 and Tx #2 and the horizontal position of the virtual antenna VA #8 obtained from the relationship between Rx #2 and Tx #4 become identical (in FIG. 13B, a position that is at a spacing $3D_{RH}$ from the reference position).

Further, when the vertical position of the first and third antenna groups is a reference position, the vertical positions of the transmitting antennas Tx #3 and Tx #4 and the receiving antenna Rx #4 are different by $D_{TV1}$, $D_{TV2}$, and $D_{RV}$, respectively. Therefore, in the vertical receiving array, too, the vertical positions of VA #11, VA #8, and VA #13 are different by $D_{TV1}$, $D_{TV2}$, and $D_{RV}$, respectively, from the vertical position of VA #2.

Thus, VA #2, VA #13, VA #8, and VA #11, which constitute the VLA, are placed in an identical horizontal position and different vertical positions.

In this way, with the limited number Nt of transmitting antennas being 4 and the limited number Na of receiving antennas being 4, the arrangement of antennas that constitute a transmitting array antenna and a receiving array antenna shown in FIG. 13A allows the arrangement of the virtual receiving array (VA #1, . . . , VA #16) shown in FIG. 13B to be an arrangement of six antennas (HLA) in a straight line in a horizontal direction and four antennas (VLA) in a straight line in a vertical direction, thus making it possible to maximally enlarge the aperture lengths of the virtual receiving array.

The direction estimator 214 performs horizontal and vertical direction-of-arrival estimation processes in a manner similar to Embodiment 1 with use of signals received by a virtual receiving array (see FIG. 13B) obtained from the aforementioned arrangement of transmitting and receiving antennas (see FIG. 13A).

As noted above, using the array arrangement shown in FIG. 13A prevents antennas from overlapping in a vertical direction in the radar apparatus 10 (MIMO radar), thus making it possible to use sub-array antennas of an arbitrary size in a vertical direction. Further, using the array arrangement shown in FIG. 13A makes it possible to maximize an aperture plane constituted by the horizontal and vertical directions of the virtual receiving array shown in FIG. 13B.

Further, by including the plurality of transmitting antennas 106 in the second antenna group of the transmitting array antenna, Embodiment 2 can increase the number of virtual antennas within the VLA, i.e. the vertical aperture length, of the virtual receiving array in comparison with Embodiment 1.

Therefore, according to Embodiment 1, the radar apparatus 10 can maximally enlarge the vertical and horizontal aperture lengths of a virtual receiving array in performing two-dimensional vertical and horizontal beam scanning with use of a MIMO radar, thus allowing high-resolution angle measuring in vertical and horizontal directions. That is, Embodiment 1 makes it possible to maximally enlarge the vertical and horizontal aperture lengths of a virtual receiving array without deterioration in detection performance of a radar apparatus and improve angular resolution with a small number of antenna elements.

In FIG. 13A, the spacings between the transmitting antennas Tx #1 to Tx #4 and the receiving antennas Rx #1 to Rx #4 do not affect the arrangement of the virtual receiving array. Note, however, that since the proximity of the transmitting antennas Tx #1 to Tx #4 and the receiving antennas Rx #1 to Rx #4 enhances the degree of coupling between the transmitting and receiving antennas, it is preferable that they be arranged as far from one another as possible within the allowable antenna size. The same applies to the after-mentioned other antenna arrangements.

Further, although FIG. 13A (including the arrangements shown in FIGS. 14A, 15, 16, 17A, and 18A described below) has been described by taking, as an example, a case where the number Nt of transmitting antennas is 4 and the number Na of receiving antennas is 4, the number Nt of transmitting antennas and the number Na of receiving antennas are not limited to 4. For example, as long as the first antenna group includes at least two transmitting antennas and the third antenna group includes at least three receiving antennas, it is possible to bring about effects which are similar to those of Embodiment 2. Further, the first antenna group needs only include at least two transmitting antennas. That is, the minimum antenna configuration in Embodiment 2 is such that the number Nt of transmitting antennas is 4 and the number Na of receiving antennas is 4. Similarly, as for the after-mentioned other antenna arrangements, too, the minimum antenna configuration is such that the number Nt of transmitting antennas is 4 and the number Na of receiving antennas is 4.

For example, the number of virtual antennas that constitute the HLA in the virtual receiving array corresponds to the product of the number of transmitting antennas of the first antenna group and the number of receiving antennas of the third antenna group. Therefore, the larger the number of transmitting antennas of the first antenna group or the number of receiving antennas of the third antenna group becomes, the larger the number of virtual antennas that constitute the HLA becomes. This brings about a narrower horizontal main lobe and an effect of improving horizontal angular separation performance.

Similarly, the larger the number of transmitting antennas of the second antenna group becomes, the larger the number of virtual antennas that constitute the VLA becomes. This brings about a narrower vertical main lobe and an effect of improving vertical angular separation performance.

Variation 1 of Embodiment 2

FIG. 13A has shown a case where there is agreement between the direction (downward) in which the vertical position of the second antenna group is placed with respect to the vertical position of the first antenna group and the direction (downward) in which the vertical position of the fourth antenna is placed with respect to the vertical position of the third antenna group. However, there does not need to be agreement between the direction in which the vertical position of the second antenna group is placed with respect to the vertical position of the first antenna group and the direction in which the vertical position of the fourth antenna is placed with respect to the vertical position of the third antenna group. The same applies to the after-mentioned other antenna arrangements.

Figure 14A:
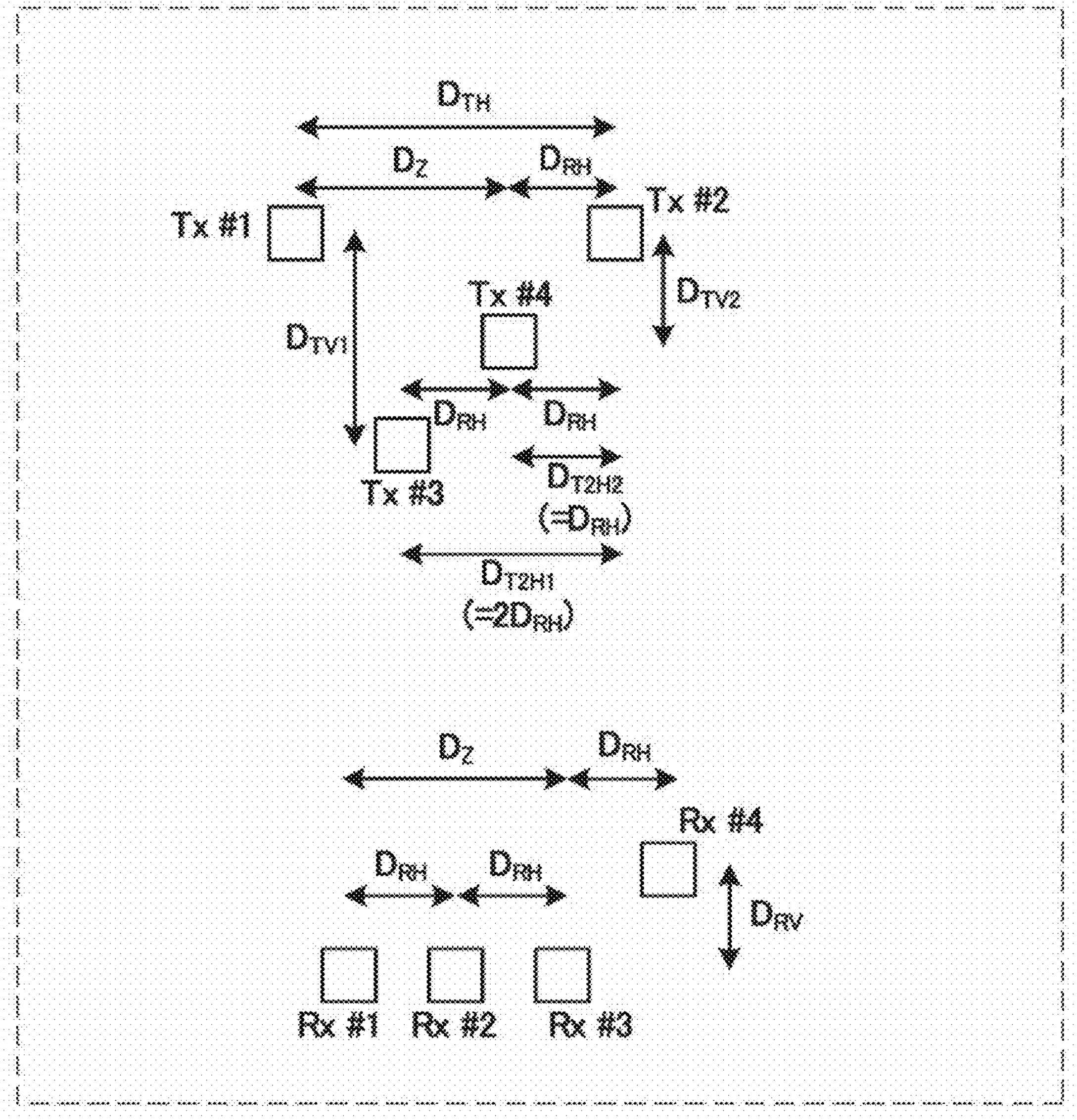
FIG. 14A is a diagram showing an example arrangement of transmitting and receiving antennas according to Variation 1 of Embodiment 2.
Figure 14B:
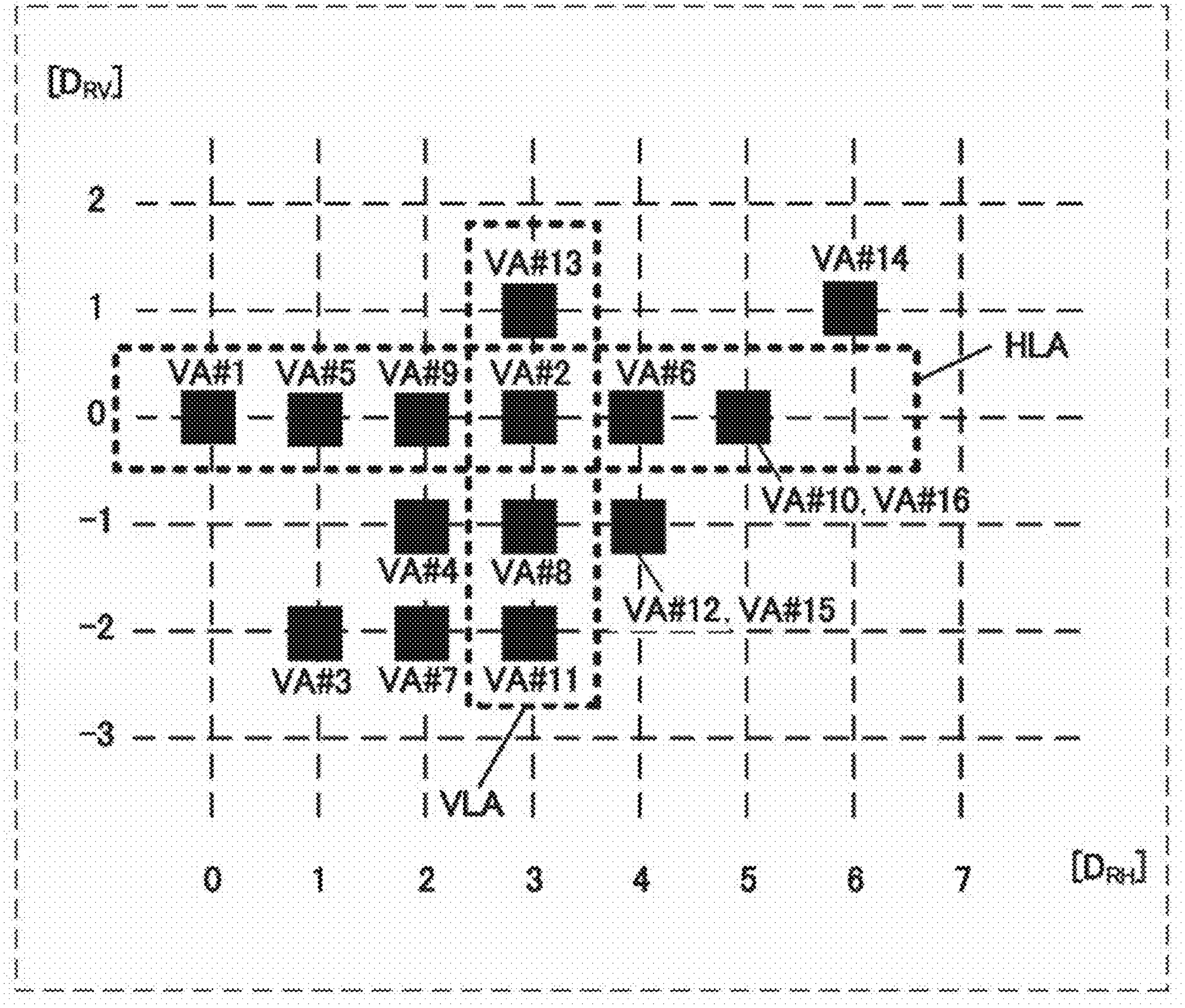
FIG. 14B is a diagram showing another example arrangement of a virtual receiving array according to Variation 1 of Embodiment 2.

FIG. 14A shows an example arrangement of transmitting antennas 106 and receiving antennas 202 according to Variation 1 of Embodiment 2. Further, FIG. 14B shows an arrangement of a virtual receiving array that is obtained by the antenna arrangement shown in FIG. 14A.

As with FIG. 13A, FIG. 14A assumes that the number Nt of transmitting antennas 106 is 4 and the number Na of receiving antennas 202 is 4. Further, the four transmitting antennas 106 are denoted by Tx #1 to Tx #4, and the four receiving antennas 202 are denoted by Rx #1 to Rx #4.

Further, in FIG. 14A, as in FIG. 13A, the horizontal interelement spacings $D_{RH}$ between the receiving antennas Rx #1 to Rx #3 of the third antenna group are constant (regular spacings), and the horizontal position of the receiving antenna Rx #4, which is the fourth antenna, is a position that is at a spacing $D_{RH}$ outward (rightward) in a horizontal direction from the horizontal position of a receiving antenna at one end of the third antenna group (the leftmost antenna Rx #1 or the rightmost antenna Rx #3. In the example shown in FIG. 14A, the rightmost antenna Rx #3).

Further, in FIG. 14A, as in FIG. 13A, the horizontal interelement spacing $D_{TH}$ between the transmitting antennas Tx #1 and Tx #2 of the first antenna group is a spacing ($D_Z$+$D_{RH}$) obtained by adding the spacing $D_{RH}$ to the horizontal antenna aperture length $D_Z$ of the third antenna group (Rx #1, Rx #2, and Rx #3), and the horizontal positions of the transmitting antenna Tx #3 and Tx #4 of the second antenna group are positions that are at spacings $D_{T2H1}$ (=$2D_{RH}$) and $D_{T2H2}$ (=$D_{RH}$), respectively, inward in a horizontal direction from the horizontal position of a transmitting antenna at one end of the first antenna group (Tx #1 or Tx #2. In the example shown in FIG. 14A, Tx #2).

Further, in FIG. 14A, the vertical positions of the second antenna group (Tx #3 and Tx #4) are positions that are at spacings $D_{TV1}$ and $D_{TV2}$, respectively, downward from the vertical position of the first antenna group (Tx #1 and Tx #2). Meanwhile, in FIG. 14A, the vertical position of the fourth antenna (Rx #4) is a position that is at a spacing $D_{RV}$ upward from the vertical position of the third antenna group (Rx #1, Rx #2, and Rx #3). That is, the direction in which the vertical positions of the second antenna group are placed with respect to the vertical position of the first antenna group and the direction in which the vertical position of the fourth antenna is placed with respect to the vertical position of the third antenna group are different.

For example, in FIG. 14A, $D_{TV1}=2D_{RV}$ and $D_{TV2}=D_{RV}$. Assume here that, in FIG. 14A, an upward direction and a downward direction from the vertical position of the first antenna group (Tx #1 and Tx #2) are a "positive direction" and a negative direction", respectively. Similarly, assume that, in FIG. 14A, an upward direction and a downward direction from the vertical position of the third antenna group (Rx #1 to Rx #3) are a "positive direction" and a negative direction", respectively. In this case, in FIG. 14A, the second antenna group (Tx #3 and Tx #4) are placed in positions that are at spacings $D_{TV1}$ and $D_{TV2}$, respectively, in the negative direction from the first antenna group, and the fourth antenna (Rx #4) is placed in a position that is at a spacing $D_{RV}$ in the positive direction from the third antenna group. That is, even if $D_{TV2}=D_{RV}$, the spacing $D_{TV2}$ and the spacing $D_{RV}$ are deemed as different spacings, as the positive direction and the negative direction are different.

Further, without being limited to $D_{TV1}=2D_{RV}$ or $D_{TV2}=D_{RV}$, the spacings $D_{TV1}$ and $D_{TV2}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of each of the transmitting antennas of the second antenna group, and the vertical position of the fourth antenna are different positions (i.e. do not overlap).

In this case, too, as in FIG. 13B, the virtual receiving array shown in FIG. 14B is configured to include an HLA composed of six virtual antennas (VA #1, VA #5, VA #9, VA #2, VA #6, and VA #10 (VA #16) surrounded by dashed lines shown in FIG. 14B) arranged in a straight line at interelement spacings $D_{RH}$ (regular spacings) in a horizontal direction.

Further, as in FIG. 13B, the virtual receiving array shown in FIG. 14B is configured to include a VLA composed of four virtual antennas (VA #13, VA #2, VA #8, and VA #11 surrounded by dashed lines shown in FIG. 14B) arranged in a straight line in a vertical direction.

As shown in FIGS. 14A and 14B, in a case where the vertical position of the second antenna group is placed at spacings downward from the vertical position of the first antenna group, the VLA includes virtual antennas placed in positions that are at spacings $D_{TV1}$ ($=2D_{RV}$) and $D_{TV2}$ ($=D_{RV}$), respectively, downward from the vertical position of the first antenna group. Further, as shown in FIGS. 14A and 14B, in a case where the vertical position of the fourth antenna is placed at a spacing upward from the vertical position of the third antenna group, the VLA includes virtual antennas placed in positions that are at a spacing $D_{RV}$ upward from the vertical position of the first antenna group.

Note here that when $D_{TV1}=2D_{RV}$ and $D_{TV2}=D_{RV}$, the VLA shown in FIG. 14B has an arrangement of virtual antennas lined up in a straight line in a vertical direction at regular spacings ($D_{RV}$).

It should be noted that, in a vertical direction, the vertical position in which each transmitting antenna 106 of the second antenna group is placed with respect to the vertical position of the first antenna group and the vertical position in which the fourth antenna is placed with respect to the vertical position of the third antenna group are not limited to the example shown in FIG. 14A.

Figure 15:
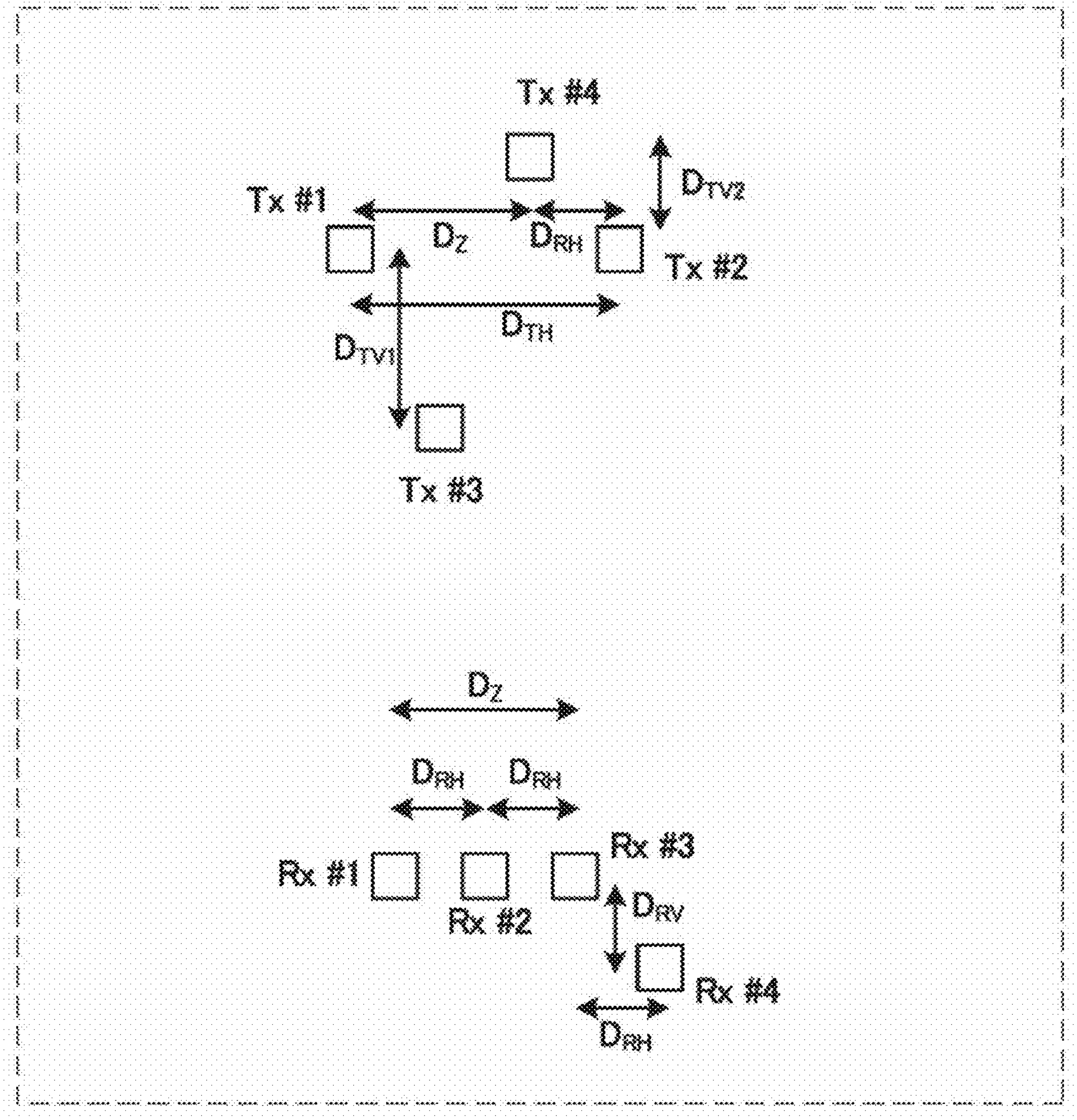
FIG. 15 is a diagram showing an example arrangement of transmitting and receiving antennas according to Variation 1 of Embodiment 2.

For example, in an antenna arrangement shown in FIG. 15, the vertical position of Tx #3 of the second antenna group (Tx #3 and Tx #4) is placed at a spacing $D_{TV1}$ downward (in the negative direction) from the vertical position of the first antenna group (Tx #1 and Tx #2), and the vertical position of Tx #4 of the second antenna group (Tx #3 and Tx #4) is placed at a spacing $D_{TV2}$ upward (in the positive direction) from the vertical position of the first antenna group (Tx #1 and Tx #2). Further, in FIG. 15, the vertical position of the fourth antenna (Rx #4) is placed at a spacing $D_{RV}$ downward (in the negative direction) from the vertical position of the third antenna group (Rx #1, Rx #2, and Rx #3). In this case, the VLA (not illustrated) of a virtual receiving array that is obtained from the antenna arrangement of FIG. 15 includes virtual antennas placed in positions that are at a spacing $D_{TV1}$ downward and a spacing $D_{TV2}$ upward, respectively, from the vertical position of the first antenna group and a virtual antenna placed in a position that is at a spacing $D_{RV}$ downward from the vertical position of the first antenna group. Further, for example, when $D_{TV1}=2D_{RV}$ and $D_{TV2}=D_{RV}$, the VLA of a virtual receiving array that is obtained from the antenna arrangement of FIG. 15 has an arrangement of virtual antennas lined up in a straight line in a vertical direction at regular spacings ($D_{RV}$) (not illustrated).

Figure 16:
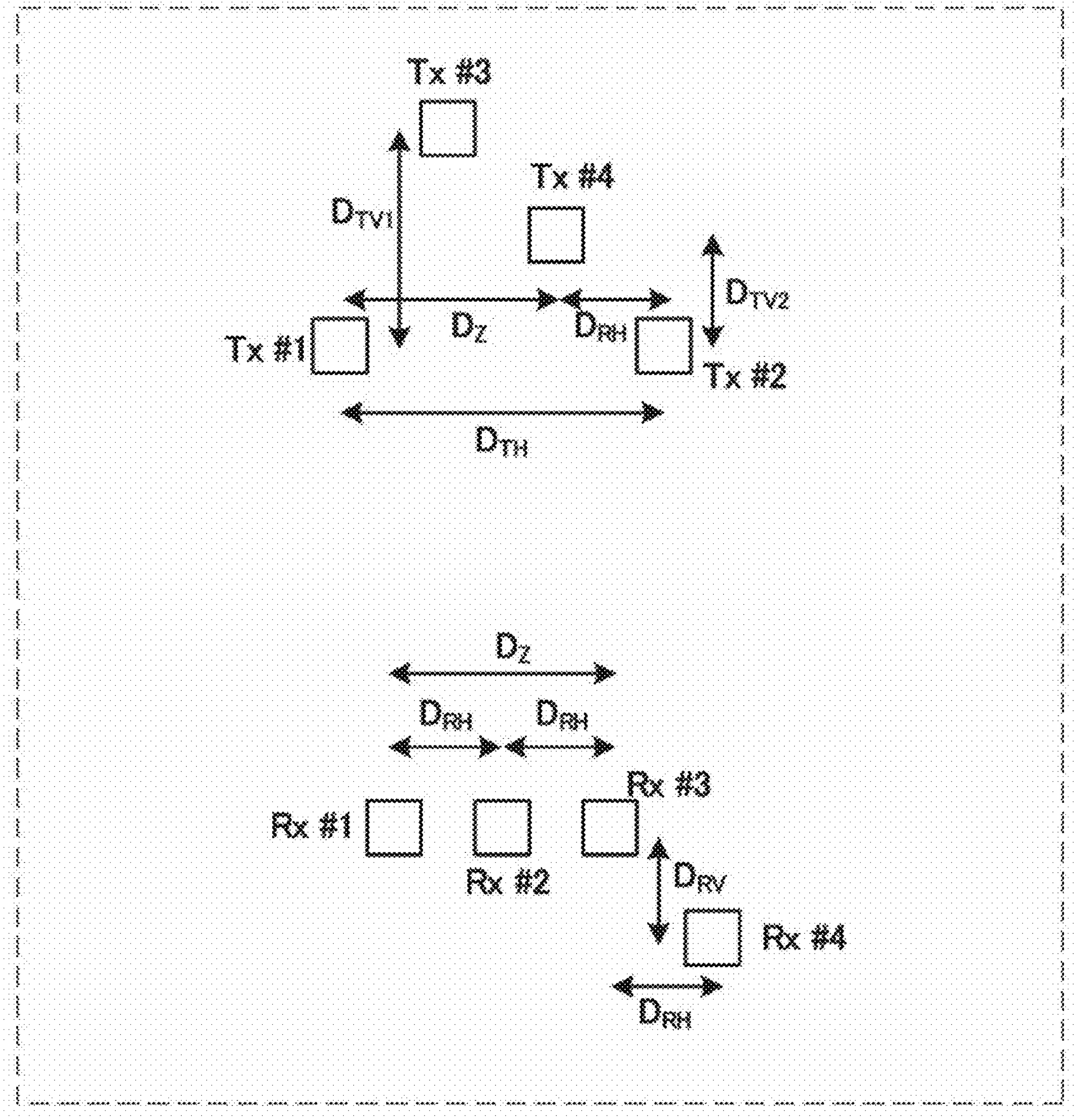
FIG. 16 is a diagram showing an example arrangement of transmitting and receiving antennas according to Variation 1 of Embodiment 2.

Alternatively, for example, in an antenna arrangement shown in FIG. 16, the vertical positions of the second antenna group (Tx #3 and Tx #4) may be placed at spacings $D_{TV1}$ and $D_{TV2}$, respectively, upward (in the positive direction) from the vertical position of the first antenna group, and the vertical position of the fourth antenna (Rx #4) may be placed at a spacing $D_{RV}$ downward (in the negative direction) from the vertical position of the third antenna group (Rx #1, Rx #2, and Rx #3). In this case, the VLA (not illustrated) of a virtual receiving array that is obtained from the antenna arrangement of FIG. 16 includes virtual antennas placed in positions that are at spacings $D_{TV1}$ and $D_{TV2}$, respectively upward from the vertical position of the first antenna group and a virtual antenna placed in a position that is at a spacing $D_{RV}$ downward from the vertical position of the first antenna group. Further, for example, when $D_{TV1}=2D_{RV}$ and $D_{TV2}=D_{RV}$, the VLA of a virtual receiving array that is obtained from the antenna arrangement of FIG. 16 has an arrangement of virtual antennas lined up in a straight line in a vertical direction at regular spacings ($D_{RV}$) (not illustrated).

Even such an antenna arrangement according to Variation 1 of Embodiment 2 can bring about effects which are similar to those of Embodiment 2.

Variation 2 of Embodiment 2

FIG. 13B has described a configuration including an HLA composed of six virtual antennas (VA #1, VA #5, VA #9, VA #2, VA #6, and VA #10) arranged in a straight line at interelement regular spacings ($D_{RH}$) in a horizontal direction. However, the HLA is not limited to a case of being composed of virtual antennas placed at regular spacings but may be composed of virtual antennas placed at irregular spacings.

Figure 17A:
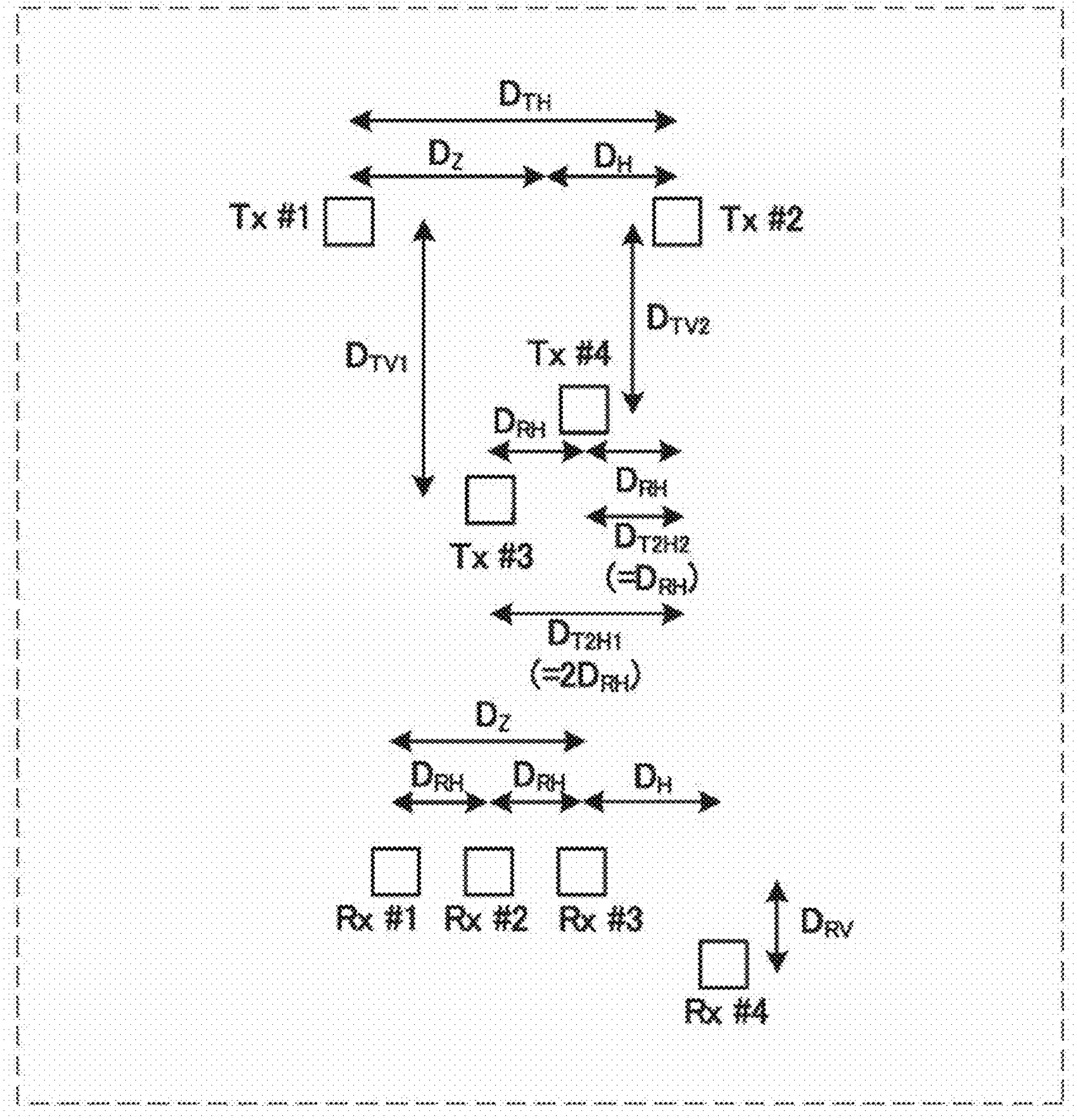
FIG. 17A is a diagram showing an example arrangement of transmitting and receiving antennas according to Variation 2 of Embodiment 2.
Figure 17B:
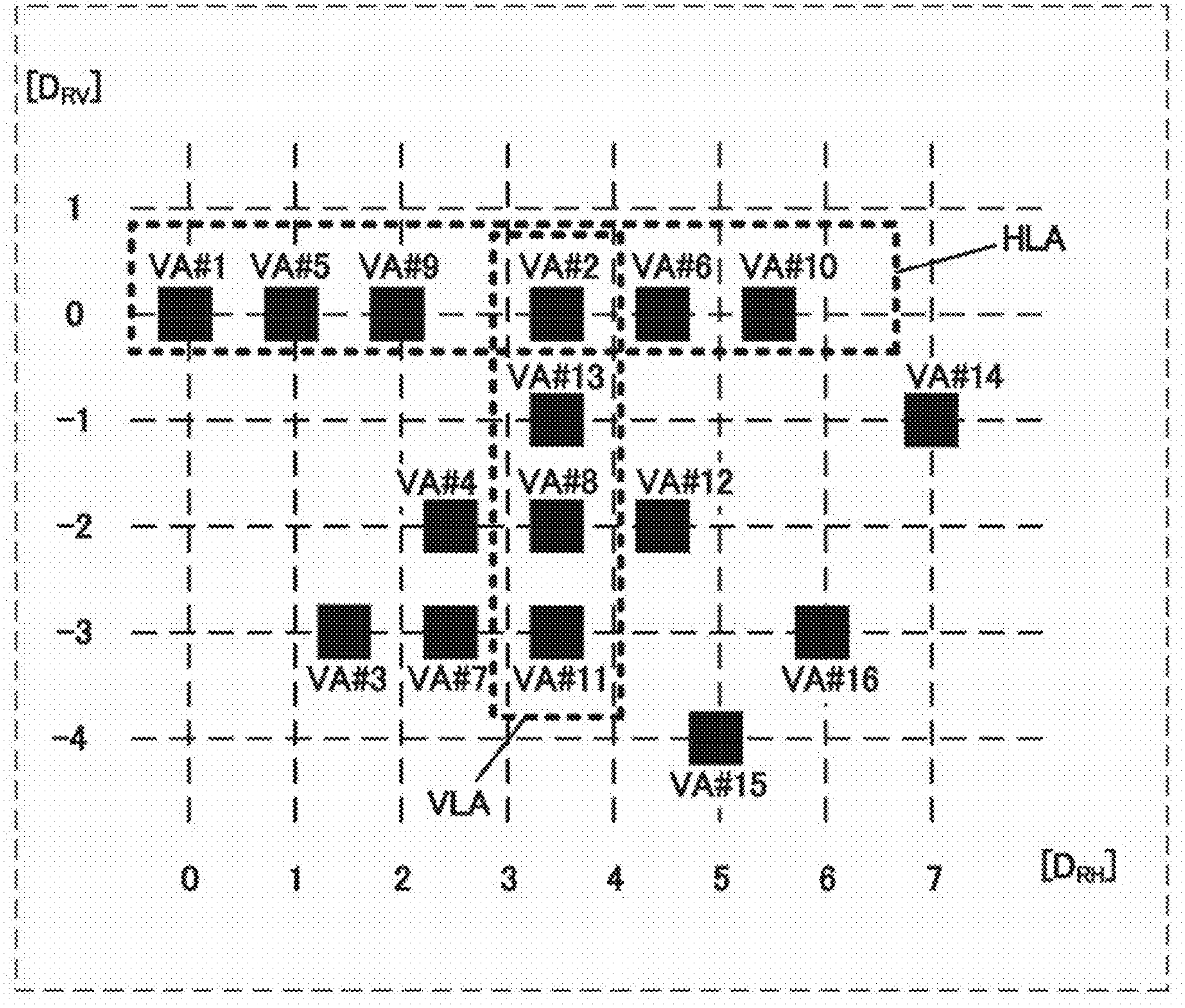
FIG. 17B is a diagram showing another example arrangement of a virtual receiving array according to Variation 2 of Embodiment 2.

FIG. 17A shows an example arrangement of transmitting antennas 106 and receiving antennas 202 according to Variation 2 of Embodiment 1. Further, FIG. 17B shows an arrangement of a virtual receiving array that is obtained by the antenna arrangement shown in FIG. 17A.

As with FIG. 13A, FIG. 17A assumes that the number Nt of transmitting antennas 106 is 4 and the number Na of receiving antennas 202 is 4. Further, the four transmitting antennas 106 are denoted by Tx #1 to Tx #4, and the four receiving antennas 202 are denoted by Rx #1 to Rx #4.

In FIG. 17A, as in FIG. 13A, the horizontal interelement spacings $D_{RH}$ between the receiving antennas Rx #1 to Rx #3 of the third antenna group are constant (regular spacings). Meanwhile, FIG. 17A assumes that the horizontal position of the receiving antenna Rx #4, which is the fourth antenna, is a position that is at a spacing $D_H$ outward (rightward) in a horizontal direction from the horizontal position of a receiving antenna at one end of the third antenna group (the leftmost antenna Rx #1 or the rightmost antenna Rx #3. In the example shown in FIG. 17A, the rightmost antenna Rx #3). Note here that the interelement spacing $D_H$ is a different value from the spacing $D_{RH}$.

Further, in FIG. 17A, as in FIG. 13A, the horizontal position of the transmitting antennas Tx #3 and Tx #4 of the second antenna group are positions displaced by spacings $D_{T2H1}$ and $D_{T2H2}$, respectively, inward in a horizontal direction within the range of horizontal aperture of the first antenna group (in FIG. 11A, within the range inside the horizontal positions of the end-point antennas Tx #1 and Tx #2) from the horizontal position of either antenna of the first antenna group (Tx #1 and Tx #2).

For example, as shown in FIG. 17A, in a case where the horizontal position of the fourth antenna (Rx #4) is on the outer side (right side) of the horizontal position of the rightmost antenna Rx #3 of the third antenna group, the interelement spacing between antennas in the third antenna group based on the leftmost antenna Rx #1 of the third antenna group (in the case of FIG. 17A, the spacing $D_{RH}$ between Rx #1 and Rx #2 or the spacing $2D_{RH}$ between Rx #1 and Rx #3) may be used as the spacing $D_{T2H1}$ or $D_{T2H2}$ from the horizontal position of the rightmost antenna Tx #2 of the first antenna group.

Further, in a case (not illustrated) where the horizontal position of the fourth antenna (Rx #4) is on the outer side (left side) of the horizontal position of the leftmost antenna Rx #1 of the third antenna group, the interelement spacing between antennas in the third antenna group based on the rightmost antenna Rx #3 of the third antenna group (for example, in the case of the third antenna group shown in FIG. 17A, the spacing $D_{RH}$ between Rx #3 and Rx #2 or the spacing $2D_{RH}$ between Rx #3 and Rx #1) may be used as the spacing $D_{T2H1}$ or $D_{T2H2}$ from the horizontal position of the leftmost antenna Tx #1 of the first antenna group.

Further, in FIG. 17A, the horizontal interelement spacing $D_{TH}$ between the transmitting antennas Tx #1 and Tx #2 of the first antenna group is a spacing ($D_Z$+$D_H$) obtained by adding the horizontal spacing ($D_H$) between the third antenna group and the fourth antenna to the horizontal antenna aperture length $D_Z$ of the third antenna group (Rx #1, Rx #2, and Rx #3).

Further, in FIG. 17A, the vertical position of the fourth antenna (Tx #4) is a position that is at a spacing $D_{RV}$ from the vertical position of the third antenna group (Rx #1 to Rx #3), and the vertical positions of the transmitting antennas (Tx #3 and Tx #4) of the second antenna group are positions that are at spacings $D_{TV1}$ and $D_{TV2}$, respectively, from the vertical position of the first antenna group (Tx #1 and Tx #2). Note here that, as mentioned above, the spacings $D_{TV1}$ and $D_{TV2}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of each of the transmitting antennas (Tx #3 and Tx #4) of the second antenna group, and the vertical position of the fourth antenna are different positions (i.e. do not overlap).

FIG. 17B shows, as an example, an arrangement of a virtual receiving array in which $D_H$=$1.5D_{RH}$, $D_{TV1}$=$3D_{RV}$, and $D_{TV2}$=$2D_{RV}$ in FIG. 17A. It should be noted that the relationship between $D_H$ and $D_{RH}$ and the relationship between $D_{TV1}$, $D_{TV2}$, and $D_{RV}$ are not limited to these.

In the virtual receiving array shown in FIG. 17B, the HLA has an arrangement of six virtual antennas (VA #1, VA #5, VA #9, VA #2, VA #6, and VA #10 surrounded by dashed lines shown in FIG. 17B) in a straight line at irregular spacings ($D_H$ and $D_{RH}$) in a horizontal direction. Further, as in FIG. 13B, the VLA shown in FIG. 17B has an arrangement of four virtual antennas (VA #2, VA #13, VA #8, and VA #11 surrounded by dashed lines shown in FIG. 17B) arranged in a straight line at regular spacings ($D_{RV}$) in a vertical direction.

Note here that in a case where $D_H$=$D_{RH}$, the HLA has its virtual antennas lined up at regular spacings ($D_{RH}$) as in FIG. 13B. This makes it possible to reduce the peak side lobe ratio.

Meanwhile, when $D_H$>$D_{RH}$, the HLA has an arrangement of virtual antennas lined up in a straight line at irregular spacings as shown in FIG. 17B, so that the HLA has an enlarged aperture length. For example, the HLA has an enlarged aperture length of $5.5D_{RH}$ in FIG. 17B, whereas the HLA has an aperture length of $5D_{RH}$ in FIG. 13B. This brings about a narrower horizontal main lobe and an effect of improving horizontal angular separation performance. It should be noted that enlarging the spacing $D_H$ brings about a trade-off between a narrower main lobe and an increased side lobe level.

Variation 3 of Embodiment 2

Although FIGS. 13A, 14A, 15, 16, and 17A have described cases where the horizontal interelement spacings between the receiving antennas (Rx #1, Rx #2, and Rx #3) of the third antenna group are constant ($D_{RH}$), the horizontal interelement spacings between the receiving antennas (Rx #1, Rx #2, and Rx #3) of the third antenna group may be irregular spacings. In this case, the HLA of the virtual receiving array is composed of virtual antennas placed at irregular spacings as in the case of Variation 2 of Embodiment 2.

Figure 18A:
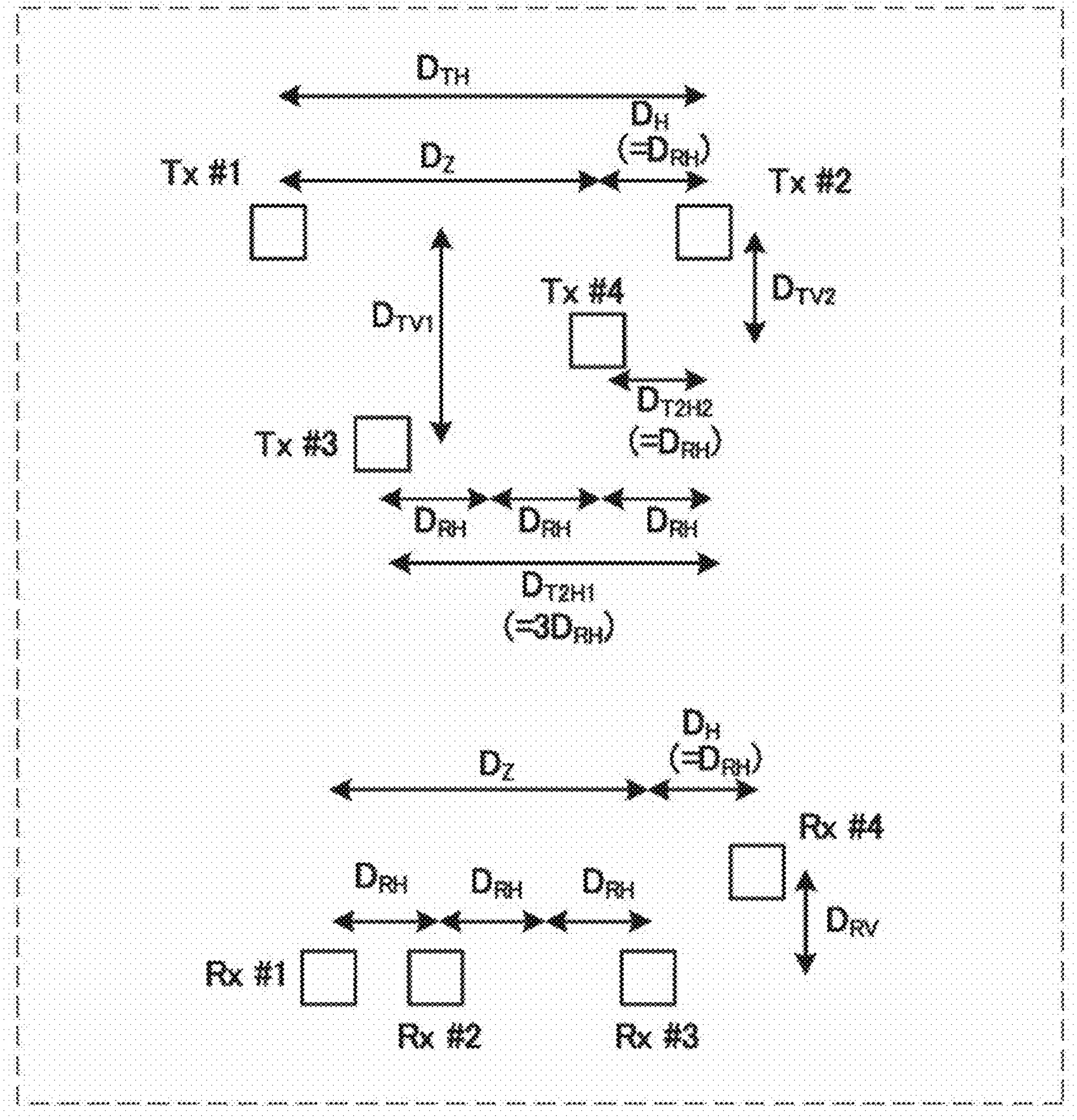
FIG. 18A is a diagram showing an example arrangement of transmitting and receiving antennas according to Variation 3 of Embodiment 2.
Figure 18B:
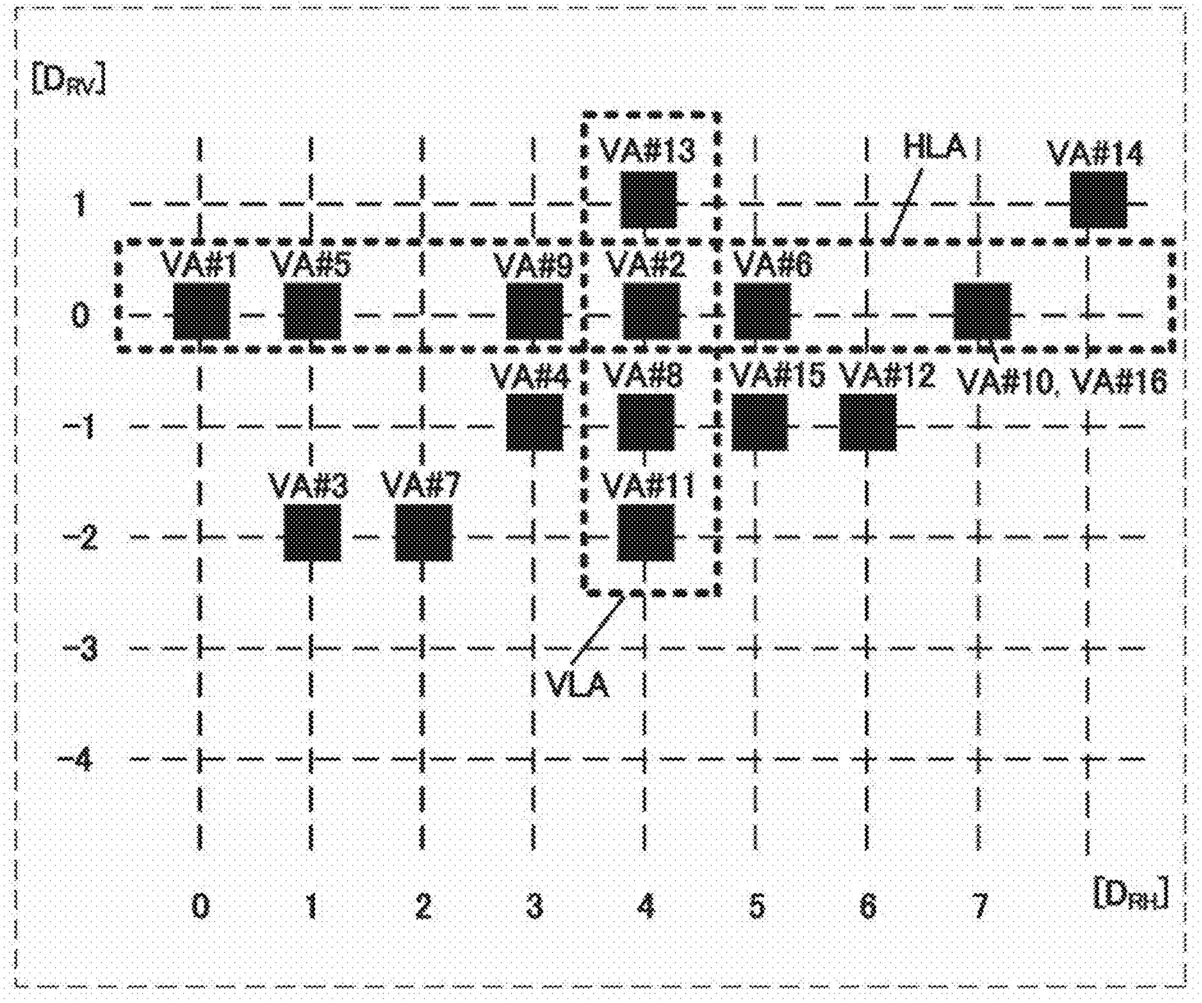
FIG. 18B is a diagram showing another example arrangement of a virtual receiving array according to Variation 3 of Embodiment 2.

FIG. 18A shows an example arrangement of transmitting antennas 106 and receiving antennas 202 according to Variation 3 of Embodiment 2. Further, FIG. 18B shows an arrangement of a virtual receiving array that is obtained by the antenna arrangement shown in FIG. 18A.

As with FIG. 13A, FIG. 18A assumes that the number Nt of transmitting antennas 106 is 4 and the number Na of receiving antennas 202 is 4. Further, the four transmitting antennas 106 are denoted by Tx #1 to Tx #4, and the four receiving antennas 202 are denoted by Rx #1 to Rx #4.

FIG. 18A assumes that $D_{RH}$ is the smallest value of the horizontal interelement spacings between the receiving antennas Rx #1 to Rx #3 of the third antenna group. In FIG. 18A, $D_{RH}$ is the interelement spacing between the receiving antennas Rx #1 and Rx #2, and $2D_{RH}$ is the interelement spacing between the receiving antennas Rx #2 and Rx #3. That is, the interelement spacings between the receiving antennas Rx #1 to Rx #3 of the third antenna group are different. It should be noted that the interelement spacings in the third antenna group are not limited to these.

Further, FIG. 18A assumes that the horizontal position of the receiving antenna Rx #4, which is the fourth antenna, is a position that is at a spacing $D_H$ outward (rightward) in a horizontal direction from the horizontal position of a receiving antenna at one end of the third antenna group (the leftmost antenna Rx #1 or the rightmost antenna Rx #3. In the example shown in FIG. 18A, the rightmost antenna Rx #3). Note here that the interelement spacing $D_H$ may be the same or a different value as or from the spacings ($D_{RH}$ and $2D_{RH}$) between the receiving antennas (Rx #1 to Rx #3) of the third antenna group.

Further, in FIG. 18A, the horizontal interelement spacing $D_{TH}$ between the transmitting antennas Tx #1 and Tx #2 of the first antenna group is a spacing ($D_Z+D_H$) obtained by adding the horizontal spacing $D_H$ (in FIG. 18A, $D_H=D_{RH}$) between the third antenna group and the fourth antenna to the horizontal antenna aperture length $D_Z$ of the third antenna group (Rx #1, Rx #2, and Rx #3).

Further, in FIG. 18A, as in FIG. 13A, the horizontal positions of the transmitting antennas Tx #3 and Tx #4 of the second antenna group are positions displaced by spacings $D_{T2H1}$ and $D_{T2H2}$, respectively, inward in a horizontal direction within the range of horizontal aperture of the first antenna group (in FIG. 18A, within the range inside the horizontal positions of the end-point antennas Tx #1 and Tx #2) from the horizontal position of either antenna of the first antenna group (Tx #1 and Tx #2).

For example, as shown in FIG. 18A, in a case where the horizontal position of the fourth antenna (Rx #4) is on the outer side (in FIG. 18A, the right side) of the horizontal position of the rightmost antenna Rx #3 of the third antenna group, the interelement spacing between antennas in the third antenna group based on the leftmost antenna Rx #1 of the third antenna group (in the case of FIG. 18A, the spacing $D_{RH}$ between Rx #1 and Rx #2 or the spacing $3D_{RH}$ between Rx #1 and Rx #3) may be used as the spacing $D_{T2H1}$ or $D_{T2H2}$ from the horizontal position of the rightmost antenna Tx #2 of the first antenna group.

Further, in a case (not illustrated) where the horizontal position of the fourth antenna (Rx #4) is on the outer side (in FIG. 18A, the left side) of the horizontal position of the leftmost antenna Rx #1 of the third antenna group, the interelement spacing between antennas in the third antenna group based on the rightmost antenna Rx #3 of the third antenna group (for example, in the case of the third antenna group shown in FIG. 18A, the spacing $2D_{RH}$ between Rx #3 and Rx #2 or the spacing $3D_{RH}$ between Rx #3 and Rx #1) may be used as the spacing $D_{T2H1}$ Or $D_{T2H2}$ from the horizontal position of the leftmost antenna Tx #1 of the first antenna group.

Further, assume that, in FIG. 18A, an upward direction and a downward direction from the vertical position of the first antenna group (Tx #1 and Tx #2) are a "positive direction" and a negative direction", respectively. Similarly, assume that, in FIG. 18A, an upward direction and a downward direction from the vertical position of the third antenna group (Rx #1 to Rx #3) are a "positive direction" and a negative direction", respectively. In this case, in FIG. 18A, the vertical position of the fourth antenna (Rx #4) is a position that is at a spacing $D_{RV}$ upward (in the positive direction) from the vertical position of the third antenna group (Rx #1 to Rx #3), and the vertical positions of the second antenna group (Tx #3 and Tx #4) are positions that are at spacings $D_{TV1}$ and $D_{TV2}$, respectively, downward (in the negative direction) from the vertical position of the first antenna group (Tx #1 and Tx #2). Note, however, that, as mentioned above, the spacings $D_{TV1}$ and $D_{TV2}$ and the spacing $D_{RV}$ need only be set so that in a case where the first antenna group (Tx #1 and Tx #2) and the third antenna group (Rx #1, Rx #2, and Rx #3) are identical (if made to agree) in vertical position with each other, the vertical position (reference position) of the first and third antenna groups, the vertical position of each of the transmitting antennas (Tx #3 and Tx #4) of the second antenna group, and the vertical position of the fourth antenna are different positions (i.e. do not overlap).

FIG. 18B shows, as an example, an arrangement of a virtual receiving array in which $D_H=1.5D_{RH}$, $D_{TV1}=2D_{RV}$, and $D_{TV2}=D_{RV}$ in FIG. 18A. It should be noted that the relationship between $D_H$ and $D_{RH}$ and the relationship between $D_{TV1}$, $D_{TV2}$, and $D_{RV}$ are not limited to these.

In the virtual receiving array shown in FIG. 18B, the HLA has an arrangement of six virtual antennas (VA #1, VA #5, VA #9, VA #2, VA #6, and VA #10 (VA #16) surrounded by dashed lines shown in FIG. 18B) in a straight line at irregular spacings ($D_H$ and $2D_{RH}$) in a horizontal direction. Further, as in FIG. 13B, the VLA shown in FIG. 18B has an arrangement of four virtual antennas (VA #13, VA #2, VA #8, and VA #11 surrounded by dashed lines shown in FIG. 18B) arranged in a straight line at regular spacings ($D_{RV}$) in a vertical direction.

The HLA shown in FIG. 18B has an arrangement of virtual antennas lined up in a straight line at irregular spacings, so that the HLA has an enlarged aperture length. For example, the HLA has an enlarged aperture length of $7D_{RH}$ in FIG. 18B, whereas the HLA has an aperture length of $5D_{RH}$ in FIG. 13B.

This brings about a narrower horizontal main lobe and an effect of improving horizontal angular separation performance. It should be noted that enlarging a spacing (in FIG. 18A, $2D_H$) in the third antenna group brings about a trade-off between a narrower main lobe and an increased side lobe level.

The foregoing has described Variations 1 to 3 of Embodiment 2.

It should be noted that even in a case where the transmitting antenna arrangement shown in any one of FIGS. 13A, 14A, 15, 16, 17A, and 18A is used as a receiving antenna arrangement and the receiving antenna arrangement shown in any one of FIGS. 13A, 14A, 15, 16, 17A, and 18A is used as a transmitting antenna arrangement, it is possible to achieve a configuration which is similar to that of the arrangement of the virtual receiving array shown in any one of FIGS. 13B, 14B, 17B, and 18B (Note, however, that a virtual receiving array corresponding to FIG. 15 or 16 is not illustrated) and bring about effects which are similar to those of the arrangement of the virtual receiving array shown in any one of FIGS. 13B, 14B, 17B, and 18B. The same applies to the after-mentioned other antenna arrangements. In this case, the number Nt of transmitting antennas is 4 or larger, and the number Na of receiving antennas is 4 or larger.

Further, although Embodiment 1 has described a case where transmitting antennas and receiving antennas are arranged so as not to overlap in a vertical direction, transmitting antennas and receiving antennas may be arranged so as not to overlap in a direction other than a vertical direction (e.g. in horizontal direction). For example, in FIGS. 13A, 14A, 15, 16, 17A, and 18A, the arrangement of the transmitting array antenna and the receiving array antenna may be rotated 90 degrees or −90 degrees. In this case, the arrangement of the antennas that constitute the transmitting array antenna and the receiving array antenna is an arrangement in which the antennas do not overlap in a horizontal direction. As a result, the horizontal size of the antennas that constitute the transmitting array antenna and the receiving array antenna can be an arbitrary size. Further, in this case, with the limited number Nt of transmitting antennas being 4 and the limited number Na of receiving antennas being 4, the virtual receiving array allows as many virtual antennas as (Number of Transmitting Antennas of Second Antenna Group+Number of Receiving Antennas of Fourth Antenna+1) to be lined up in a vertical direction and allows as many virtual antennas as the product of the number of transmitting antennas of the first antenna group and the number of receiving antennas of the third antenna group to be lined up in a straight line in a horizontal direction, thus making it possible to maximally enlarge the aperture lengths of the virtual receiving array.

The foregoing has described embodiments according to an aspect of the present disclosure.

It should be noted that a proper combination of actions according to the embodiments and variations may be carried out.

Other Embodiments (1) The number Nt of transmitting antennas is not limited to three elements or four elements, and the number Na of receiving antennas is not limited to three elements or four elements. For example, in a case where the number of transmitting antennas of the second antenna group is n (which is an integer of not less than 1), the number of receiving antennas of the third antenna group needs only be at least (n+1).

As an example, a description is given of a case where the number Nt of transmitting antennas is 5 and the number Na of receiving antennas is 5.

Figure 19A:
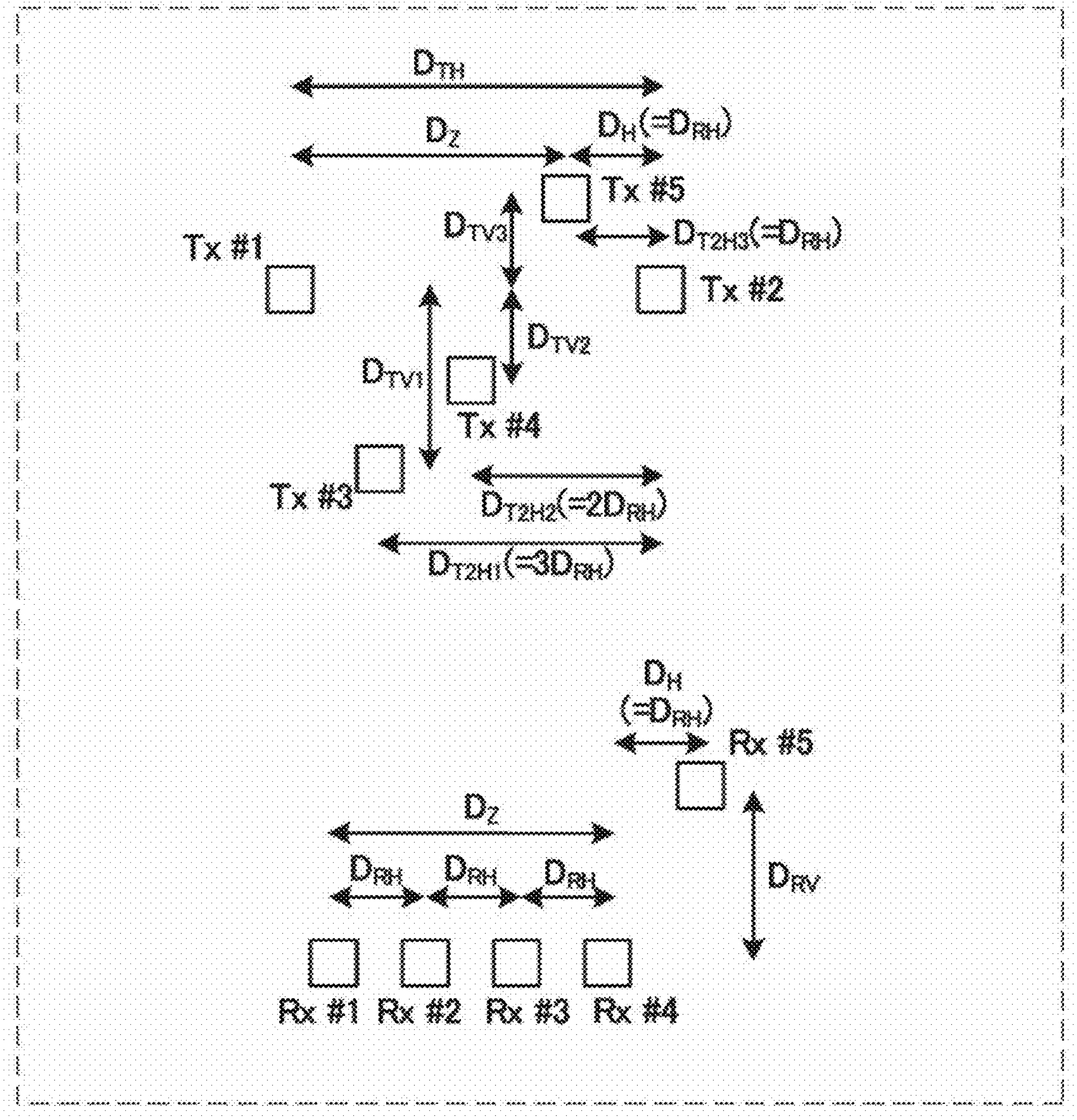
FIG. 19A is a diagram showing an example arrangement of transmitting and receiving antennas according to another embodiment.
Figure 19B:
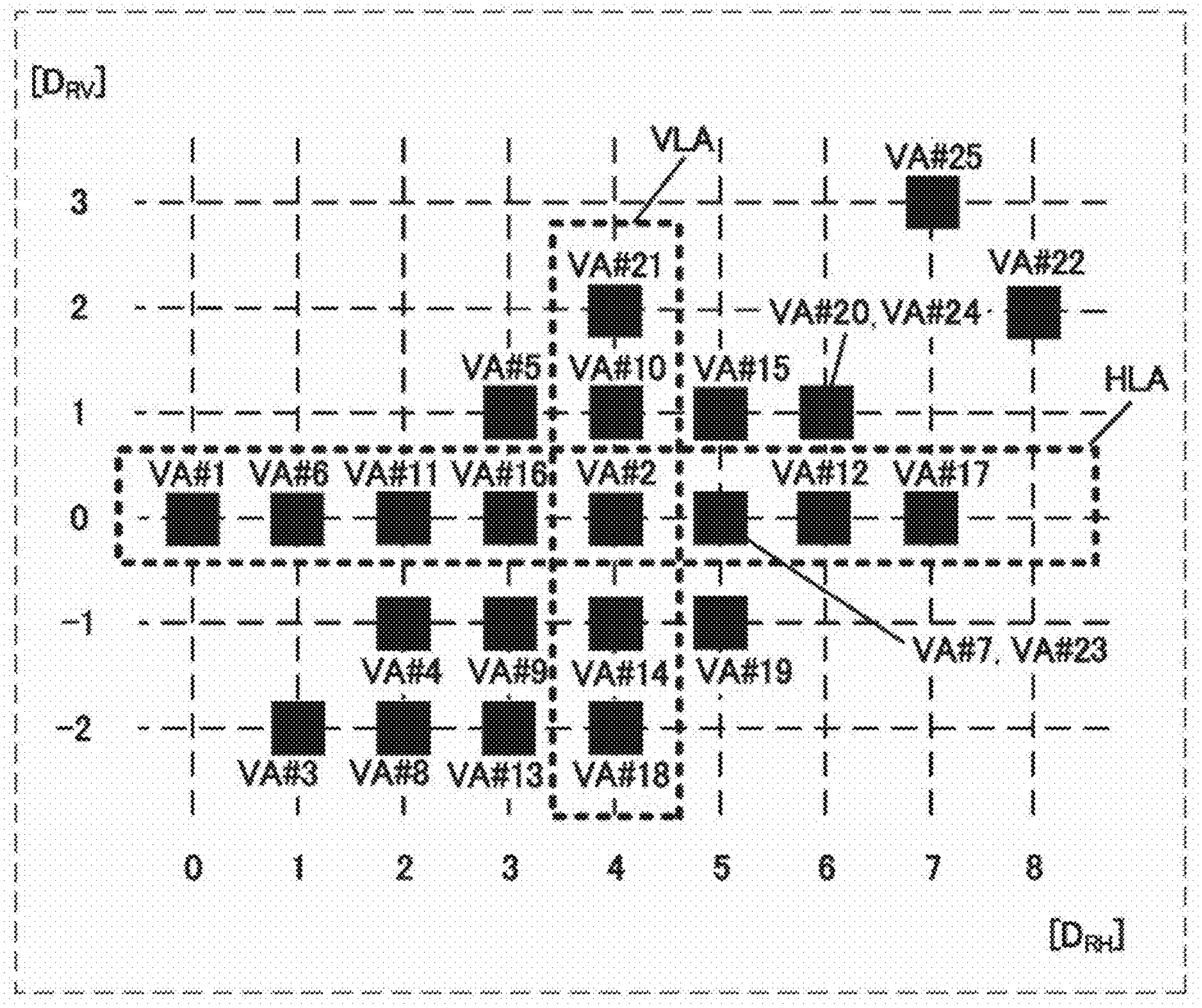
FIG. 19B is a diagram showing another example arrangement of a virtual receiving array according to another embodiment.

FIG. 19A shows an example antenna arrangement in which that the number Nt of transmitting antennas 106 is 5 and the number Na of receiving antennas 202 is 5. FIG. 19B shows an arrangement of a virtual receiving array that is obtained by the antenna arrangement shown in FIG. 19A. The five transmitting antennas 106 are denoted by Tx #1 to Tx #5, and the five receiving antennas 202 are denoted by Rx #1 to Rx #5.

In FIG. 19A, the receiving antennas Rx #1 to Rx #4 constitute a third antenna group of receiving antennas that are identical in vertical position and different in horizontal position. Specifically, in FIG. 19A, the horizontal interelement spacings $D_{RH}$ between the receiving antennas Rx #1 to Rx #4 of the third antenna group are constant (regular spacings).

Further, in FIG. 19A, the receiving antenna Rx #5 is a fourth antenna placed in a position different from both the horizontal and vertical positions in which the third antenna group is placed. Specifically, in FIG. 19A, the horizontal position of the receiving antenna Rx #5, which is the fourth antenna, is a position that is at a spacing $D_H$ outward (rightward) in a horizontal direction from the horizontal position of a receiving antenna at one end of the third antenna group (the leftmost antenna Rx #1 or the rightmost antenna Rx #4. In the example shown in FIG. 19A, the rightmost antenna Rx #4). Note here that the interelement spacing $D_H$ may be the same or a different value as or from the spacings ($D_{RH}$) between the receiving antennas (Rx #1 to Rx #4) of the third antenna group.

Further, in FIG. 19A, the vertical position of the fourth antenna (Tx #5) is a position that is at a spacing $D_{RV}$ from the vertical position of the third antenna group (Rx #1 to Rx #4).

Meanwhile, in FIG. 19A, the transmitting antennas Tx #1 and Tx #2 constitute a first antenna group of transmitting antennas that are identical in vertical position and different in horizontal position. Further, in FIG. 19A, the transmitting antennas Tx #3, Tx #4, and Tx #5 constitute a second antenna group placed in a position different from both the horizontal and vertical positions in which the first antenna group is placed.

Specifically, in FIG. 19A, the horizontal interelement spacing $D_{TH}$ between the transmitting antennas Tx #1 and Tx #2 of the first antenna group is a spacing ($D_Z+D_H$) obtained by adding the spacing $D_H$ to the horizontal antenna aperture length $D_Z$ of the third antenna group (Rx #1 to Rx #4). In FIG. 19A, in the interelement spacing $D_{TH}$ of the first antenna group, the spacing $D_H$ that is added to the antenna aperture length $D_Z$ is equal to the aforementioned horizontal spacing ($D_{RH}$) between the third antenna group and the fourth antenna.

Further, in FIG. 19A, the horizontal positions of the transmitting antennas Tx #3, Tx #4, and Tx #5 of the second antenna group are positions displaced by spacings $D_{T2H1}$, $D_{T2H2}$, and $D_{T2H3}$, respectively, inward in a horizontal direction within the range of horizontal aperture of the first antenna group (in FIG. 19A, within the range inside the horizontal positions of the end-point antennas Tx #1 and Tx #2) from the horizontal position of either antenna of the first antenna group (Tx #1 and Tx #2).

For example, as shown in FIG. 19A, in a case where the horizontal position of the fourth antenna (Rx #5) is on the outer side (in FIG. 19A, the right side) of the horizontal position of the rightmost antenna Rx #4 of the third antenna group, the interelement spacing between antennas in the third antenna group based on the leftmost antenna Rx #1 of the third antenna group (in the case of FIG. 19A, the spacing $D_{RH}$ between Rx #1 and Rx #2, the spacing $2D_{RH}$ between Rx #1 and Rx #3, or the spacing $3D_{RH}$ between Rx #1 and Rx #4) may be used as the spacing $D_{T2H1}$, $D_{T2H2}$, or $D_{T2H3}$ from the horizontal position of the rightmost antenna Tx #2 of the first antenna group.

Further, in a case (not illustrated) where the horizontal position of the fourth antenna (Rx #4) is on the outer side (in FIG. 19A, the left side) of the horizontal position of the leftmost antenna Rx #1 of the third antenna group, the interelement spacing between antennas in the third antenna group based on the rightmost antenna Rx #4 of the third antenna group (for example, in the case of the third antenna group shown in FIG. 19A, the spacing $D_{RH}$ between Rx #4 and Rx #3, the spacing $2D_{RH}$ between Rx #4 and Rx #2, or the spacing $3D_{RH}$ between Rx #4 and Rx #1) may be used as the spacing $D_{T2H1}$, $D_{T2H2}$, or $D_{T2H3}$ from the horizontal position of the leftmost antenna Tx #1 of the first antenna group.

Further, in FIG. 19A, the vertical positions of the transmitting antennas Tx #3, Tx #4, and Tx #5 of the second antenna group are positions that are at spacings $D_{TV1}$, $D_{TV2}$, and $D_{TV3}$, respectively, from the vertical position of the first antenna group (Tx #1 and Tx #2).

Note here that the spacings $D_{TV1}$, $D_{TV2}$, and $D_{TV3}$ are spacings that are different from the vertical spacing $D_{RV}$ between the third antenna group and the fourth antenna. In other words, the spacings $D_{TV1}$, $D_{TV2}$, and $D_{TV3}$ and the spacing $D_{RV}$ need only be set so that in a case where the first antenna group (Tx #1 and Tx #2) and the third antenna group (Rx #1 to Rx #4) are identical (if made to agree) in vertical position with each other, the vertical position (reference position) of the first and third antenna groups, the vertical position of each of the transmitting antennas (Tx #3 to Tx #5) of the second antenna group, and the vertical position of the fourth antenna are different positions (i.e. do not overlap).

As shown in FIG. 19A, the arrangement of the transmitting antennas Tx #1 to Tx #5 that constitute the transmitting array antenna is an arrangement in which the antennas do not overlap in a vertical direction, as in the embodiments described above. For this reason, the vertical size of the transmitting antennas Tx #1 to Tx #5 that constitute the transmitting array antenna can be an arbitrary size. Similarly, as shown in FIG. 19A, the arrangement of the receiving antennas Rx #1 to Rx #5 that constitute the receiving array antenna is an arrangement in which the antennas do not overlap in a vertical direction, as in the embodiments described above. For this reason, the vertical size of the receiving antennas Rx #1 to Rx #5 that constitute the receiving array antenna can be an arbitrary size.

The arrangement of the virtual receiving array (virtual antennas VA #1 to VA #25) shown in FIG. 19B, which is constituted by the antenna arrangement shown in FIG. 19A described above, has the following characteristics.

The virtual receiving array shown in FIG. 19B is configured to include a horizontal virtual linear array antenna HLA composed of eight virtual antennas (VA #1, VA #6, VA #11, VA #16, VA #2, VA #7 (VA #23), VA #12, and VA #17 surrounded by dashed lines shown in FIG. 19B) arranged in a straight line at interelement spacings $D_{RH}$ (regular spacings) in a horizontal direction. That is, the number of virtual antennas that are lined up in a straight line in a horizontal direction has such a relationship as to be the product (in FIG. 19A, 8) of the number of antennas (in FIG. 19A, 2) of the first antenna group and the number of antennas (in FIG. 19A, 4) of the third antenna group.

Further, the virtual receiving array shown in FIG. 19B is configured to include a vertical virtual linear array antenna VLA composed of five virtual antennas (VA #21, VA #10, VA #2, VA #14, and VA #18 surrounded by dashed lines shown in FIG. 19B) arranged in a straight line in a vertical direction. The number of virtual antennas that are lined up in a straight line in a vertical direction has such a relationship as to be "(Number of Antennas of Second Antenna Group)+ (Number of Antennas of Fourth Antenna)+1" (in FIG. 19B, 5).

In this way, with the limited number Nt of transmitting antennas being 5 and the limited number Na of receiving antennas being 5, the arrangement of antennas that constitute a transmitting array antenna and a receiving array antenna shown in FIG. 19A allows the arrangement of the virtual receiving array (VA #1, . . . , VA #25) shown in FIG. 19B to be an arrangement of eight antennas (HLA) in a straight line in a horizontal direction and five antennas (VLA) in a straight line in a vertical direction, thus making it possible to maximally enlarge the aperture lengths of the virtual receiving array.

(2) Although the foregoing embodiments have described cases where the number of transmitting antennas of the first antenna group of the transmitting array antenna is 2 (Tx #1 and Tx #2), the number of transmitting antennas of the first antenna group may be 3 or larger.

As an example, a description is given of a case where the number Nt of transmitting antennas is 5 and the number Na of receiving antennas is 4.

Figure 20A:
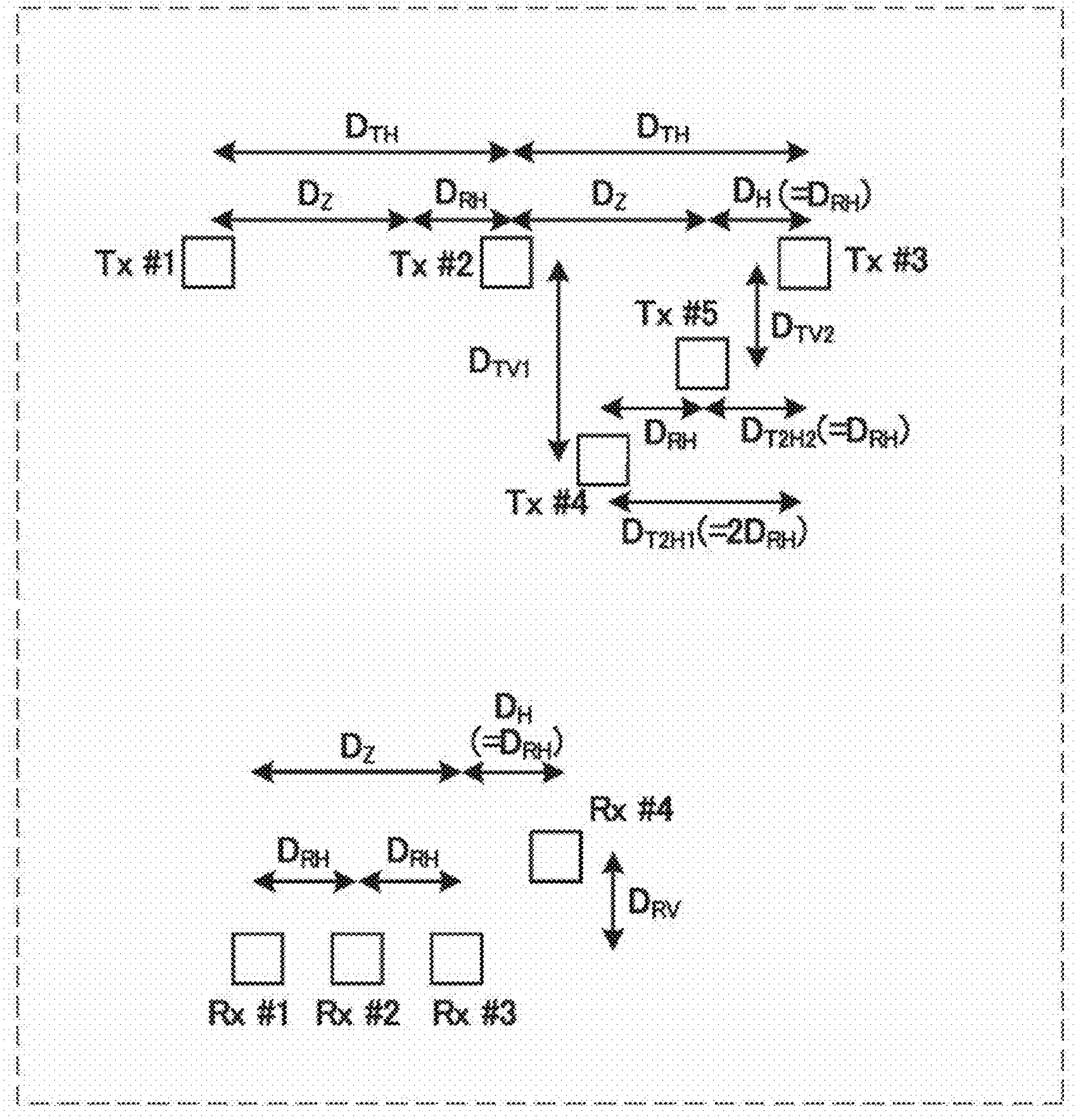
FIG. 20A is a diagram showing an example arrangement of transmitting and receiving antennas according to another embodiment.
Figure 20B:
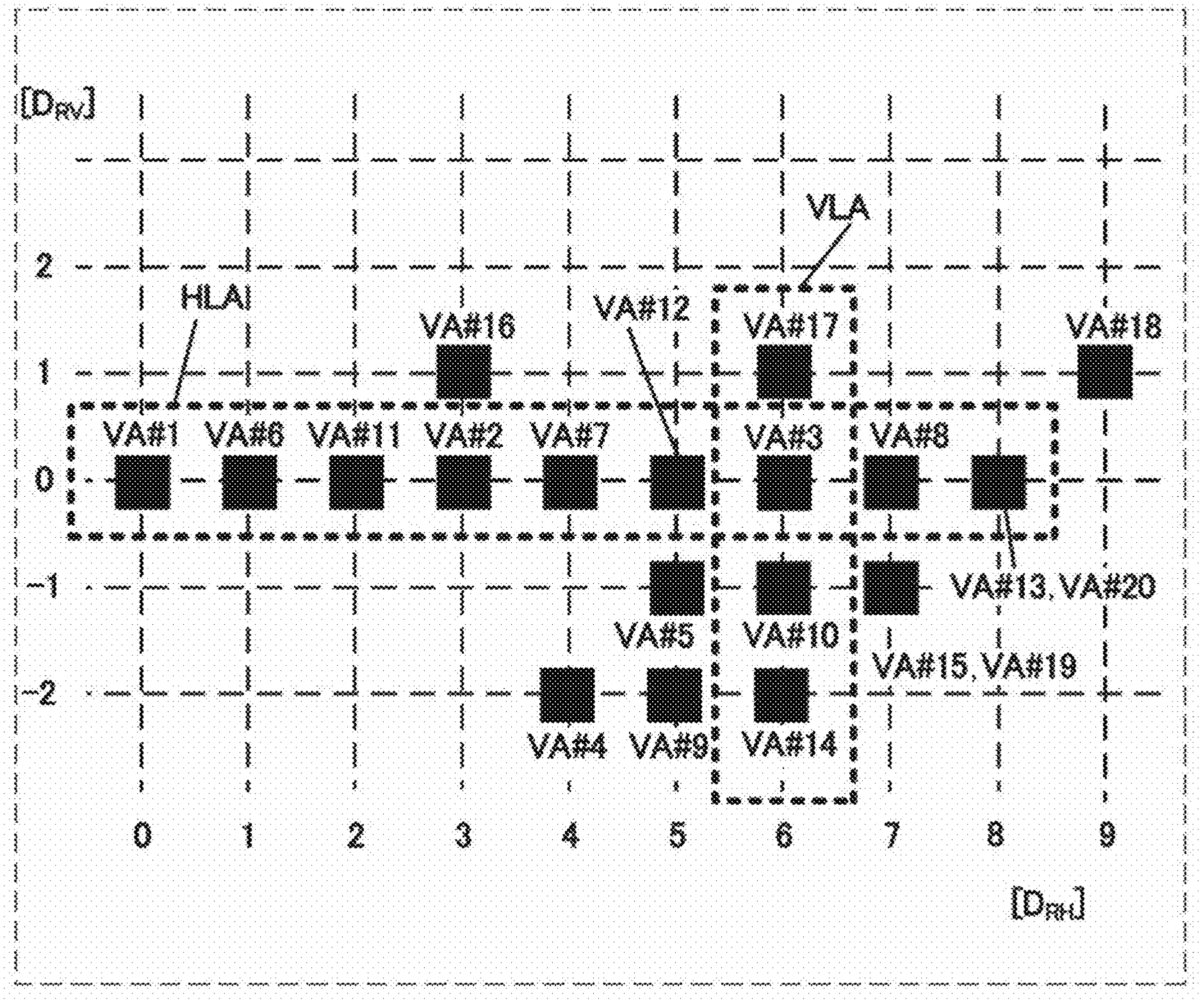
FIG. 20B is a diagram showing another example arrangement of a virtual receiving array according to another embodiment.

FIG. 20A shows an example antenna arrangement in which that the number Nt of transmitting antennas 106 is 5 and the number Na of receiving antennas 202 is 4. FIG. 20B shows an arrangement of a virtual receiving array that is obtained by the antenna arrangement shown in FIG. 20A. The five transmitting antennas 106 are denoted by Tx #1 to Tx #5, and the four receiving antennas 202 are denoted by Rx #1 to Rx #4.

In FIG. 20A, the receiving antennas Rx #1 to Rx #3 constitute a third antenna group of receiving antennas that are identical in vertical position and different in horizontal position. Specifically, in FIG. 20A, the horizontal interelement spacings $D_{RH}$ between the receiving antennas Rx #1 to Rx #3 of the third antenna group are constant (regular spacings). It should be noted that the interelement spacings in the third antenna group are not limited to these.

Further, in FIG. 20A, the receiving antenna Rx #4 is a fourth antenna placed in a position different from both the horizontal and vertical positions in which the third antenna group is placed. Specifically, in FIG. 20A, the horizontal position of the receiving antenna Rx #4, which is the fourth antenna, is a position that is at a spacing $D_H$ outward (rightward) in a horizontal direction from the horizontal position of a receiving antenna at one end of the third antenna group (the leftmost antenna Rx #1 or the rightmost antenna Rx #3. In the example shown in FIG. 20A, the rightmost antenna Rx #3). Note here that the interelement spacing $D_H$ may be the same or a different value as or from the spacings ($D_{RH}$) between the receiving antennas (Rx #1 to Rx #3) of the third antenna group. In FIG. 20A, $D_H$=$D_{RH}$.

Further, in FIG. 20A, the vertical position of the fourth antenna (Tx #4) is a position that is at a spacing $D_{RV}$ from the vertical position of the third antenna group (Rx #1 to Rx #3).

Meanwhile, in FIG. 20A, the transmitting antennas Tx #1, Tx #2, and Tx #4 constitute a first antenna group of transmitting antennas that are identical in vertical position and different in horizontal position. Further, in FIG. 20A, the transmitting antennas Tx #4 and Tx #5 constitute a second antenna group placed in a position different from both the horizontal and vertical positions in which the first antenna group is placed.

Specifically, in FIG. 20A, each of the horizontal interelement spacings $D_{TH}$ between the transmitting antennas Tx #1, Tx #2, and Tx #3 of the first antenna group is a spacing ($D_Z$+$D_H$) obtained by adding the spacing $D_H$ to the horizontal antenna aperture length $D_Z$ of the third antenna group (Rx #1 to Rx #3). Note here that the interelement spacing $D_H$ may be the same or a different value as or from the spacings ($D_{RH}$ and $2D_{RH}$) between the receiving antennas (Rx #1 to Rx #3) of the third antenna group. In FIG. 20A, $D_H$=$D_{RH}$. In the first antenna group, the interelement spacing between at least one pair of adjacent transmitting antennas 106 may be a spacing $D_{TH}$, and the interelement spacing between another pair of adjacent transmitting antennas 106 may be different from the spacing $D_{TH}$.

Further, in FIG. 20A, the horizontal positions of the transmitting antennas Tx #4 and Tx #5 of the second antenna group are positions displaced by spacings $D_{T2H1}$ and $D_{T2H2}$, respectively, inward in a horizontal direction within the range of horizontal aperture of the first antenna group (in FIG. 20A, within the range inside the horizontal positions of the end-point antennas Tx #1 and Tx #3) from the horizontal position of any antenna of the first antenna group (Tx #1, Tx #2, and Tx #3). In FIG. 20A, the transmitting antennas Tx #4 and Tx #5 of the second antenna group are placed in positions displaced by spacings $D_{T2H1}$ and $D_{T2H2}$, respectively, from the horizontal position of Tx #3.

For example, as shown in FIG. 20A, in a case where the horizontal position of the fourth antenna (Rx #4) is on the outer side (in FIG. 20A, the right side) of the horizontal position of the rightmost antenna Rx #3 of the third antenna group, the interelement spacing between antennas in the third antenna group based on the leftmost antenna Rx #1 of the third antenna group (in the case of FIG. 20A, the spacing $D_{RH}$ between Rx #1 and Rx #2 or the spacing $2D_{RH}$ between Rx #1 and Rx #3) may be used as the spacing $D_{T2H1}$ or $D_{T2H2}$ from the horizontal position of the rightmost antenna Tx #3 (or the antenna Tx #2, which is not an end point) of the first antenna group.

Further, in a case (not illustrated) where the horizontal position of the fourth antenna (Rx #4) is on the outer side (in FIG. 20A, the left side) of the horizontal position of the leftmost antenna Rx #1 of the third antenna group, the interelement spacing between antennas in the third antenna group based on the rightmost antenna Rx #3 of the third antenna group (for example, in the case of the third antenna group shown in FIG. 20A, the spacing $2D_{RH}$ between Rx #3 and Rx #2 or the spacing $2D_{RH}$ between Rx #3 and Rx #1) may be used as the spacing $D_{T2H1}$ Or $D_{T2H2}$ from the horizontal position of the leftmost antenna Tx #1 (or the antenna Tx #2, which is not an end point) of the first antenna group.

Further, in FIG. 20A, the vertical positions of the transmitting antennas Tx #4 and Tx #5 of the second antenna group are positions that are at spacings $D_{TV1}$ and $D_{TV2}$, respectively, from the vertical position of the first antenna group (Tx #1, Tx #2, and Tx #3).

Note here that the spacings $D_{TV1}$ and $D_{TV2}$ are spacings that are different from the vertical spacing $D_{RV}$ between the third antenna group and the fourth antenna. In other words, the spacings $D_{TV1}$ and $D_{TV2}$ and the spacing $D_{RV}$ need only be set so that in a case where the first antenna group (Tx #1, Tx #2, and Tx #3) and the third antenna group (Rx #1 to Rx #3) are identical (if made to agree) in vertical position with each other, the vertical position (reference position) of the first and third antenna groups, the vertical position of each of the transmitting antennas (Tx #4 and Tx #5) of the second antenna group, and the vertical position of the fourth antenna are different positions (i.e. do not overlap).

As shown in FIG. 20A, the arrangement of the transmitting antennas Tx #1 to Tx #5 that constitute the transmitting array antenna is an arrangement in which the antennas do not overlap in a vertical direction, as in the embodiments described above. For this reason, the vertical size of the transmitting antennas Tx #1 to Tx #5 that constitute the transmitting array antenna can be an arbitrary size. Similarly, as shown in FIG. 20A, the arrangement of the receiving antennas Rx #1 to Rx #4 that constitute the receiving array antenna is an arrangement in which the antennas do not overlap in a vertical direction, as in the embodiments described above. For this reason, the vertical size of the receiving antennas Rx #1 to Rx #4 that constitute the receiving array antenna can be an arbitrary size.

The arrangement of the virtual receiving array (virtual antennas VA #1 to VA #20) shown in FIG. 20B, which is constituted by the antenna arrangement shown in FIG. 20A described above, has the following characteristics.

The virtual receiving array shown in FIG. 20B is configured to include a horizontal virtual linear array antenna HLA composed of nine virtual antennas (VA #1, VA #6, VA #11, VA #2, VA #7, VA #12 (VA #20), VA #3, VA #8, and VA #13 (VA #20) surrounded by dashed lines shown in FIG. 20B) arranged in a straight line at interelement spacings $D_{RH}$ (regular spacings) in a horizontal direction. That is, the number of virtual antennas that are lined up in a straight line in a horizontal direction has such a relationship as to be the product (in FIG. 20A, 9) of the number of antennas (in FIG. 20A, 3) of the first antenna group and the number of antennas (in FIG. 20A, 3) of the third antenna group.

Further, the virtual receiving array shown in FIG. 20B is configured to include a vertical virtual linear array antenna VLA composed of four virtual antennas (VA #17, VA #3, VA #10, and VA #14 surrounded by dashed lines shown in FIG. 20B) arranged in a straight line in a vertical direction. The number of virtual antennas that are lined up in a straight line in a vertical direction has such a relationship as to be "(Number of Antennas of Second Antenna Group)+ (Number of Antennas of Fourth Antenna)+1" (in FIG. 20B, 4).

In this way, with the limited number Nt of transmitting antennas being 5 and the limited number Na of receiving antennas being 4, the arrangement of antennas that constitute a transmitting array antenna and a receiving array antenna shown in FIG. 20A allows the arrangement of the virtual receiving array (VA #1, . . . , VA #20) shown in FIG. 20B to be an arrangement of nine antennas (HLA) in a straight line in a horizontal direction and four antennas (VLA) in a straight line in a vertical direction, thus making it possible to maximally enlarge the aperture lengths of the virtual receiving array.

(3) Although the foregoing embodiments have described cases where a coded pulse radar is used, the present disclosure is also applicable to a radar system, such as a chirp pulse radar, that uses frequency-modulated pulse waves.

(4) In the radar apparatus 10 shown in FIG. 1, the radar transmitter 100 and the radar receiver 200 may be individually placed in physically separated places.

(5) Although not illustrated, the radar apparatus 10 includes, for example, a central processing unit (CPU), a storage medium (read-only memory (ROM)) having a control program stored thereon, and a working memory such as a RAM (random-access memory). In this case, the functions of the components described above are achieved by the CPU executing the control program. Note, however, that the radar apparatus 10 is not limited in hardware configuration to such an example. For example, the functional components of the radar apparatus 10 may be achieved as ICs (integrated circuits). These functional components may take the form of individual single chips or of a single chip including some or all of the functional components.

In the foregoing, various embodiments have been described with reference to the drawings. However, the present disclosure is of course not limited to such examples. It is apparent that persons skilled in the art can conceive of various changes and alterations within the scope of claims, and such changes and alterations are naturally understood as pertaining to the technical scope of the present disclosure. Each constituent element in the embodiments described above may be arbitrarily combined with the other without departing from the spirit of the disclosure.

Although each of the foregoing embodiments has been described by giving an example where the present disclosure is configured with hardware, the present disclosure may alternatively be achieved with software in cooperation with hardware.

Further, the functional blocks used in the description of each embodiment described above are typically achieved as LSIs, which are integrated circuits. The integrated circuits may control the functional blocks used in the description of the embodiments above and each include an input terminal and an output terminal. These LSIs may take the form of individual single chips or of a single chip including some or all of them. Depending on the degree of integration, the LSIs may alternatively be referred to as "ICs", "system LSIs", "super LSIs", or "ultra LSIs".

However, the technique of implementing an integrated circuit is not limited to the LSI and may be realized by using a dedicated circuit or a general-purpose processor. In addition, an FPGA (field-programmable gate array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

SUMMARY OF THE PRESENT DISCLOSURE

A radar apparatus of the present disclosure includes: a radar transmitter that transmits a radar signal through a transmitting array antenna; and a radar receiver that receives, through a receiving array antenna, a reflected-wave signal produced by the radar signal being reflected by a target. The transmitting array antenna is composed of a first antenna group including a plurality of transmitting antennas arranged in a first direction and a second antenna group including at least one transmitting antenna placed in a position inside at least one pair of adjacent transmitting antennas of the first antenna group in the first direction and a position different from the first antenna group in a second direction orthogonal to the first direction. The receiving array antenna is composed of a third antenna group including a plurality of receiving antennas arranged in the first direction and a fourth antenna that is one receiving antenna placed in a position outside an end of the third antenna group in the first direction and a position different from the third antenna group in the second direction. An interelement spacing between the adjacent transmitting antennas in the first direction is a sum of an aperture length of the third antenna group and a spacing between the third antenna group and the fourth antenna in the first direction. An interelement spacing in the first direction between a receiving antenna of the third antenna group located at an end on a second side opposite to a first side close to the position in which the fourth antenna is placed and each of the other antennas of the third antenna group is identical to an interelement spacing in the first direction between a transmitting antenna of the adjacent transmitting antennas located on the same side as the first side and each of the transmitting antennas of the second antenna group. In a case where the first antenna group and the third antenna group are identical in position in the second direction, a position of each of the transmitting antennas of the second antenna group in the second direction and a position of the fourth antenna in the second direction are different.

In the radar apparatus of the present disclosure, interelement spacings between the plurality of receiving antennas of the third antenna group are equal.

In the radar apparatus of the present disclosure, interelement spacings between the plurality of receiving antennas of the third antenna group and a spacing between the third antenna group and the fourth antenna in the first direction are equal.

In the radar apparatus of the present disclosure, interelement spacings between the plurality of receiving antennas of the third antenna group are different.

In the radar apparatus of the present disclosure, interelement spacings between the plurality of receiving antennas of the third antenna group and a spacing between the third antenna group and the fourth antenna in the first direction are different.

In the radar apparatus of the present disclosure, in a case where the first antenna group and the third antenna group are identical in position in the second direction, interelement spacings between adjacent antennas in the second direction among the first antenna group, each of the transmitting antennas of the second antenna group, and the fourth antenna are regular spacings.

In the radar apparatus of the present disclosure, in a case where the first antenna group and the third antenna group are identical in position in the second direction, interelement spacings between adjacent antennas in the second direction among the first antenna group, each of the transmitting antennas of the second antenna group, and the fourth antenna are irregular spacings.

In the radar apparatus of the present disclosure, the second antenna group includes n (an integer of not less than 1) transmitting antennas, and the third antenna group includes at least (n+1) receiving antennas.

In the radar apparatus of the present disclosure, at least one of the transmitting and receiving antennas is constituted by a plurality of sub-array elements arranged in the second direction.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, an FPGA (field-programmable gate array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure is applicable as a radar apparatus that performs detection in a wide angular range.

What is claimed is:

1. A radar apparatus comprising:

a radar transmitter that transmits a radar signal through a transmitting array antenna; and a radar receiver that receives, through a receiving array antenna, a reflected-wave signal produced by the radar signal being reflected by a target, wherein the transmitting array antenna consists of a plurality of first antennas and a second antenna, wherein the plurality of first antennas and the second antenna are arranged at different positions in a first direction, wherein the second antenna is arranged at a position separated from one adjacent antenna of the plurality of first antennas by a first distance in the first direction, wherein the plurality of first antennas include two adjacent antennas arranged at positions separated by a second distance in the first direction and two adjacent antennas arranged at positions separated by a third distance in the first direction, wherein the first distance is greater than the second distance and is smaller than the third distance, wherein the second antenna is arranged at a position separated by a fourth distance from each of the plurality of first antennas in a second direction orthogonal to the first direction, wherein the receiving array antenna consists of a plurality of third antennas and a fourth antenna, wherein the plurality of third antennas and the fourth antenna are arranged at different positions in the first direction, wherein the fourth antenna is arranged at a position separated from one adjacent antenna of the plurality of third antennas by the first distance in the first direction.

2. The radar apparatus according to claim 1, wherein the fourth antenna is arranged at a position separated by a fifth distance from each of the plurality of third antennas in the second direction, wherein the fifth distance is different from the fourth distance.

3. The radar apparatus according to claim 1, wherein antenna elements of the plurality of first antennas and the second antenna do not overlap with each other in the second direction.

4. The radar apparatus according to claim 1, wherein antenna elements of the plurality of third antennas and the fourth antenna do not overlap with each other in the second direction.

5. The radar apparatus according to claim 1, wherein at least one of the transmitting array antenna and the receiving array antenna is constituted by a plurality of sub-array elements arranged in the second direction.

6. A radar apparatus comprising:

a radar transmitter that transmits a radar signal through a transmitting array antenna; and a radar receiver that receives, through a receiving array antenna, a reflected-wave signal produced by the radar signal being reflected by a target, wherein the receiving array antenna consists of a plurality of first antennas and a second antenna, wherein the plurality of first antennas and the second antenna are arranged at different positions in a first direction, wherein the second antenna is arranged at a position separated from one adjacent antenna of the plurality of first antennas by a first distance in the first direction, wherein the plurality of first antennas include two adjacent antennas arranged at positions separated by a second distance in the first direction and two adjacent antennas arranged at positions separated by a third distance in the first direction, wherein the first distance is greater than the second distance and is smaller than the third distance, wherein the second antenna is arranged at a position separated by a fourth distance from each of the plurality of first antennas in a second direction orthogonal to the first direction, wherein the transmitting array antenna consists of a plurality of third antennas and a fourth antenna, wherein the plurality of third antennas and the fourth antenna are arranged at different positions in the first direction, wherein the fourth antenna is arranged at a position separated from one adjacent antenna of the plurality of third antennas by the first distance in the first direction.

7. The radar apparatus according to claim 6, wherein the fourth antenna is arranged at a position separated by a fifth distance from each of the plurality of third antennas in the second direction, wherein the fifth distance is different from the fourth distance.

8. The radar apparatus according to claim 6, wherein antenna elements of the plurality of first antennas and the second antenna do not overlap with each other in the second direction.

9. The radar apparatus according to claim 6, wherein antenna elements of the plurality of third antennas and the fourth antenna do not overlap with each other in the second direction.

10. The radar apparatus according to claim 6, wherein at least one of the transmitting array antenna and the receiving array antenna is constituted by a plurality of sub-array elements arranged in the second direction.

* * * * *